(12) United States Patent
Eberspach et al.

(10) Patent No.: US 10,948,567 B2
(45) Date of Patent: *Mar. 16, 2021

(54) DETECTOR FOR OPTICALLY DETECTING AT LEAST ONE OBJECT

(71) Applicant: Trinamix GmbH, Ludwigshafen am Rhein (DE)

(72) Inventors: Michael Eberspach, Ludwigshafen (DE); Christoph Lungenschmied, Ludwigshafen (DE); Robert Send, Ludwigshafen (DE); Thomas Ohmer, Ludwigshafen (DE); Stefan Hengen, Ludwigshafen (DE); Ingmar Bruder, Ludwigshafen (DE); Wilfried Hermes, Ludwigshafen (DE); Sebastian Valouch, Ludwigshafen (DE); Christian Lennartz, Ludwigshafen (DE); Peter Schillen, Ludwigshafen (DE); Patrick Schindler, Ludwigshafen (DE)

(73) Assignee: trinamiX GmbH

( * ) Notice: Subject to any disclaimer, the term of this patent is extended or adjusted under 35 U.S.C. 154(b) by 122 days.

This patent is subject to a terminal disclaimer.

(21) Appl. No.: 16/347,364

(22) PCT Filed: Nov. 17, 2017

(86) PCT No.: PCT/EP2017/079577
§ 371 (c)(1),
(2) Date: May 3, 2019

(87) PCT Pub. No.: WO2018/091649
PCT Pub. Date: May 24, 2018

(65) Prior Publication Data
US 2020/0183006 A1 Jun. 11, 2020

(30) Foreign Application Priority Data

Nov. 17, 2016 (EP) ..................................... 16199397
Nov. 17, 2016 (EP) ..................................... 16199398
(Continued)

(51) Int. Cl.
*G01J 1/42* (2006.01)
*G01S 17/46* (2006.01)
(Continued)

(52) U.S. Cl.
CPC ............... *G01S 5/16* (2013.01); *G01J 1/0411* (2013.01); *G01J 1/0422* (2013.01);
(Continued)

(58) Field of Classification Search
CPC ...... G01J 1/0411; G01J 1/0422; G01J 1/4228; G01S 11/12; G01S 17/32; G01S 17/36;
(Continued)

(56) References Cited

U.S. PATENT DOCUMENTS 3,035,176 A   5/1962  Kis et al.
3,112,197 A  11/1963  Neugebauer et al.
(Continued)

FOREIGN PATENT DOCUMENTS

CA   1065054  10/1979
CA   2119330   9/1995
(Continued)

OTHER PUBLICATIONS

Kurt Konolige et al., "A Low-Cost Laser Distance Sensor", *2008 IEEE International Conference on Robotics and Automation*, Pasadena, CA, May 19-23, 2008.
(Continued)

*Primary Examiner* — Hina F Ayub
(74) *Attorney, Agent, or Firm* — Armstrong Teasdale LLP

(57) ABSTRACT

A detector (110) for determining a position of at least one object (112) is disclosed. The detector (110) comprises: at
(Continued)

least one sensor element (118) having a matrix (120) of optical sensors (122), the optical sensors (122) each having a light-sensitive area (124), wherein each optical sensor (122) is configured to generate at least one sensor signal in response to an illumination of the light-sensitive area (124) by at least one light beam (116) propagating from the object (112) to the detector (110); at least one evaluation device (134) configured for evaluating the sensor signals, by a) determining at least one optical sensor (122) having the highest sensor signal and forming at least one center signal; b) evaluating the sensor signals of the optical sensors (122) of the matrix (120) and forming at least one sum signal; c) determining at least one combined signal by combining the center signal and the sum signal; and d) determining at least one longitudinal coordinate z of the object (112) by evaluating the combined signal.

18 Claims, 10 Drawing Sheets

(30) Foreign Application Priority Data

| Nov. 17, 2016 | (EP) | 16199399 |
|---|---|---|
| Mar. 16, 2017 | (EP) | 17161334 |
| Oct. 9, 2017 | (EP) | 17195398 |
| Oct. 9, 2017 | (EP) | 17195427 |

(51) Int. Cl.

| *G01S 7/48* | (2006.01) |
| *G01S 11/12* | (2006.01) |
| *G01J 1/04* | (2006.01) |
| *G01S 5/16* | (2006.01) |
| *G01S 7/481* | (2006.01) |
| *G01S 17/36* | (2006.01) |
| *G01S 7/493* | (2006.01) |
| *G01S 17/32* | (2020.01) |
| *G01S 17/50* | (2006.01) |
| *G01S 17/66* | (2006.01) |
| *G01S 17/89* | (2020.01) |

(52) U.S. Cl.
CPC .......... *G01J 1/4228* (2013.01); *G01S 7/4804* (2013.01); *G01S 7/4808* (2013.01); *G01S 7/4816* (2013.01); *G01S 7/493* (2013.01); *G01S 11/12* (2013.01); *G01S 17/32* (2013.01); *G01S 17/36* (2013.01); *G01S 17/46* (2013.01); *G01S 17/50* (2013.01); *G01S 17/66* (2013.01); *G01S 17/89* (2013.01)

(58) Field of Classification Search
CPC .......... G01S 17/46; G01S 17/50; G01S 17/66; G01S 17/89; G01S 3/783; G01S 5/16; G01S 7/4804; G01S 7/4808; G01S 7/4814; G01S 7/4816; G01S 7/493
See application file for complete search history.

(56) References Cited

U.S. PATENT DOCUMENTS

| 3,384,752 | A | 5/1968 | Giovanni Odone |
| 3,562,785 | A | 2/1971 | Craig |
| 3,564,268 | A | 2/1971 | Bayne et al. |
| 3,873,823 | A | 3/1975 | Northrup et al. |
| 3,937,950 | A | 2/1976 | Hosoe et al. |
| 3,954,340 | A | 5/1976 | Blomqvist et al. |
| 4,023,033 | A | 5/1977 | Bricot et al. |
| 4,053,240 | A | 10/1977 | Aizawa et al. |
| 4,079,247 | A | 3/1978 | Briscot et al. |
| 4,256,513 | A | 3/1981 | Yoshida |
| 4,286,035 | A | 8/1981 | Nishizima et al. |
| 4,346,293 | A | 8/1982 | Fetzer |
| 4,469,945 | A | 9/1984 | Hoeberechts et al. |
| 4,524,276 | A | 6/1985 | Ohtombe |
| 4,565,761 | A | 1/1986 | Katagiri et al. |
| 4,584,704 | A | 4/1986 | Ferren |
| 4,593,187 | A | 6/1986 | Grotts et al. |
| 4,602,158 | A | 7/1986 | Barrett |
| 4,603,258 | A | 7/1986 | Sher et al. |
| 4,647,193 | A | 3/1987 | Rosenfeld |
| 4,653,905 | A | 3/1987 | Farrar et al. |
| 4,675,535 | A | 6/1987 | Tsunekawa et al. |
| 4,694,172 | A | 9/1987 | Powell et al. |
| 4,760,004 | A | 7/1988 | Rochat et al. |
| 4,760,151 | A | 7/1988 | Rochat et al. |
| 4,767,211 | A | 8/1988 | Munakata et al. |
| 4,773,751 | A | 9/1988 | Matsuda et al. |
| 4,927,721 | A | 5/1990 | Gratzel et al. |
| 4,952,472 | A | 8/1990 | Baranyi et al. |
| 5,082,363 | A | 1/1992 | Nakanishi et al. |
| 5,216,476 | A | 6/1993 | Lanckton |
| 5,227,985 | A | 7/1993 | Dementhon et al. |
| 5,235,377 | A | 8/1993 | Ide et al. |
| 5,291,066 | A | 3/1994 | Neugebauer et al. |
| 5,343,291 | A | 8/1994 | Ohwada et al. |
| 5,350,644 | A | 9/1994 | Graetzel et al. |
| 5,355,241 | A | 10/1994 | Kelley |
| 5,375,008 | A | 12/1994 | Guerreri |
| 5,512,997 | A | 4/1996 | Ogawa |
| 5,576,975 | A | 11/1996 | Sasaki et al. |
| 5,581,094 | A | 12/1996 | Hara et al. |
| 5,589,928 | A | 12/1996 | Babbitt et al. |
| 5,856,844 | A | 1/1999 | Batterman et al. |
| 6,061,122 | A | 5/2000 | Hoshino et al. |
| 6,118,119 | A | 9/2000 | Ruschin |
| 6,163,371 | A | 12/2000 | Kato et al. |
| 6,191,881 | B1 | 2/2001 | Tajima |
| 6,229,913 | B1 | 5/2001 | Nayar et al. |
| 6,266,142 | B1 | 7/2001 | Junkins et al. |
| 6,359,211 | B1 | 3/2002 | Spitler et al. |
| 6,417,836 | B1 | 7/2002 | Kumar et al. |
| 6,507,392 | B1 | 1/2003 | Richards et al. |
| 6,512,233 | B1 | 1/2003 | Sato et al. |
| 6,785,028 | B1 | 8/2004 | Atsuumi et al. |
| 6,930,297 | B1 | 8/2005 | Nakamura |
| 6,947,459 | B2 | 9/2005 | Kurtz et al. |
| 6,995,445 | B2 | 2/2006 | Forrest et al. |
| 7,022,966 | B2 | 4/2006 | Gonzo et al. |
| 7,049,601 | B2 | 5/2006 | Agano |
| 7,196,317 | B1 | 3/2007 | Meissner et al. |
| 7,247,851 | B2 | 7/2007 | Okada et al. |
| 7,301,608 | B1 | 11/2007 | Mendenhall et al. |
| 7,417,716 | B2 | 8/2008 | Nagasaka et al. |
| 7,626,569 | B2 | 12/2009 | Lanier |
| 7,677,742 | B2 | 3/2010 | Hillmer et al. |
| 7,768,498 | B2 | 8/2010 | Wey |
| 7,773,070 | B2 | 8/2010 | Trisnadi et al. |
| 7,855,778 | B2 | 12/2010 | Yung et al. |
| 7,939,932 | B2 | 5/2011 | Martin |
| 8,013,901 | B2 | 9/2011 | Fukuhara et al. |
| 8,019,166 | B2 | 9/2011 | Cheng et al. |
| 8,107,056 | B1 | 1/2012 | Riza |
| 8,144,173 | B2 | 3/2012 | Baba |
| 8,228,299 | B1 | 7/2012 | Maloney et al. |
| 8,231,809 | B2 | 7/2012 | Pschirer et al. |
| 8,345,003 | B1 | 1/2013 | Trisnadi et al. |
| 8,363,526 | B2 | 1/2013 | Hotta et al. |
| 8,390,793 | B2 | 3/2013 | Yamaguchi et al. |
| 8,411,289 | B2 | 4/2013 | Takahashi |
| 8,477,580 | B2 | 7/2013 | Yamamoto et al. |
| 8,563,855 | B2 | 10/2013 | Pschirer et al. |
| 8,593,565 | B2 | 11/2013 | Shuster |
| 8,902,354 | B2 | 12/2014 | Shuster |
| 8,908,157 | B2 | 12/2014 | Eisele et al. |
| 9,104,910 | B2 | 8/2015 | Huang |
| 9,385,326 | B2 | 7/2016 | Wonneberger et al. |
| 9,389,315 | B2 | 7/2016 | Bruder et al. |

(56) References Cited

U.S. PATENT DOCUMENTS

| | | |
|---|---|---|
| 9,428,518 B2 | 8/2016 | Wonneberger et al. |
| 9,557,856 B2 | 1/2017 | Send et al. |
| 9,646,365 B1 | 5/2017 | Hinkel et al. |
| 9,665,182 B2 | 5/2017 | Send et al. |
| 9,741,954 B2 | 8/2017 | Bruder et al. |
| 9,787,899 B1 | 10/2017 | Hinkel et al. |
| 9,829,564 B2 | 11/2017 | Bruder et al. |
| 9,919,999 B2 | 3/2018 | Koenemann et al. |
| 9,958,535 B2 | 5/2018 | Send et al. |
| 9,989,623 B2 | 6/2018 | Send et al. |
| 10,012,532 B2 | 7/2018 | Send et al. |
| 10,094,927 B2 | 10/2018 | Send et al. |
| 10,120,078 B2 | 11/2018 | Bruder et al. |
| 10,290,817 B2 | 5/2019 | Battagliarin et al. |
| 10,412,283 B2 | 9/2019 | Send et al. |
| 2001/0025938 A1 | 10/2001 | Imai |
| 2002/0011576 A1 | 1/2002 | Cho et al. |
| 2002/0075471 A1 | 6/2002 | Holec |
| 2003/0017360 A1 | 1/2003 | Tai et al. |
| 2003/0094607 A1 | 5/2003 | Guenther et al. |
| 2003/0128351 A1 | 7/2003 | Schmidt |
| 2003/0132391 A1 | 7/2003 | Agano |
| 2003/0227635 A1 | 12/2003 | Muller |
| 2004/0178325 A1 | 9/2004 | Forrest et al. |
| 2004/0190117 A1 | 9/2004 | Kubaink |
| 2004/0216625 A1 | 11/2004 | Birnstock et al. |
| 2005/0052120 A1 | 3/2005 | Gupta et al. |
| 2005/0061957 A1 | 3/2005 | Kase |
| 2005/0122308 A1 | 6/2005 | Bell et al. |
| 2005/0184301 A1 | 8/2005 | Nagasaka et al. |
| 2005/0217720 A1 | 10/2005 | Rey-Mermet et al. |
| 2005/0227390 A1 | 10/2005 | Shtein et al. |
| 2005/0227406 A1 | 10/2005 | Shtein et al. |
| 2005/0268957 A1 | 12/2005 | Enomoto et al. |
| 2005/0269616 A1 | 12/2005 | Andriessen |
| 2006/0044546 A1 | 3/2006 | Lewin et al. |
| 2006/0049397 A1 | 3/2006 | Pfeiffer et al. |
| 2006/0065833 A1 | 3/2006 | Craig et al. |
| 2006/0075585 A1 | 4/2006 | Krieger et al. |
| 2006/0082546 A1 | 4/2006 | Wey |
| 2007/0008515 A1 | 1/2007 | Otani et al. |
| 2007/0010924 A1 | 1/2007 | Otani et al. |
| 2007/0046625 A1 | 3/2007 | Yee |
| 2007/0080925 A1 | 4/2007 | Radivojevic et al. |
| 2007/0109558 A1 | 5/2007 | Harding |
| 2007/0122927 A1 | 5/2007 | Li et al. |
| 2007/0176165 A1 | 8/2007 | Forrest et al. |
| 2007/0183047 A1 | 8/2007 | Phillips et al. |
| 2007/0206181 A1 | 9/2007 | Arenberg et al. |
| 2008/0013005 A1 | 1/2008 | Deane |
| 2008/0080789 A1 | 4/2008 | Marks |
| 2008/0106746 A1 | 5/2008 | Shpunt et al. |
| 2008/0118143 A1 | 5/2008 | Gordon et al. |
| 2008/0130005 A1 | 6/2008 | Waslowski et al. |
| 2008/0157965 A1 | 7/2008 | Shahar |
| 2008/0170750 A1 | 7/2008 | Gordon |
| 2008/0240502 A1 | 10/2008 | Freedman et al. |
| 2008/0259310 A1 | 10/2008 | Wada |
| 2008/0269482 A1 | 10/2008 | Pschirer et al. |
| 2008/0284925 A1 | 11/2008 | Han |
| 2008/0297487 A1 | 12/2008 | Hotelling et al. |
| 2009/0009747 A1 | 1/2009 | Wolf |
| 2009/0046543 A1 | 2/2009 | De Hoog et al. |
| 2009/0066929 A1 | 3/2009 | Tropf |
| 2009/0097010 A1 | 4/2009 | Yamaguchi |
| 2009/0153841 A1 | 6/2009 | Ophey et al. |
| 2009/0185158 A1 | 7/2009 | Wolf |
| 2009/0188547 A1 | 7/2009 | Hayashi et al. |
| 2009/0225319 A1 | 9/2009 | Lee |
| 2009/0231582 A1 | 9/2009 | Aebischer |
| 2009/0322677 A1 | 12/2009 | Lee et al. |
| 2010/0073462 A1 | 3/2010 | Lee et al. |
| 2010/0091263 A1 | 4/2010 | Kumagai et al. |
| 2010/0118123 A1 | 5/2010 | Freedman et al. |
| 2010/0141927 A1 | 6/2010 | Hashimoto et al. |
| 2010/0141964 A1 | 6/2010 | Horsch |
| 2010/0194942 A1 | 8/2010 | Wada |
| 2010/0231513 A1 | 9/2010 | Deliwala |
| 2010/0258179 A1 | 10/2010 | Wieting |
| 2010/0279458 A1 | 11/2010 | Yeh |
| 2010/0282309 A1 | 11/2010 | Pschirer et al. |
| 2010/0283868 A1 | 11/2010 | Clark et al. |
| 2010/0297405 A1 | 11/2010 | Flores et al. |
| 2011/0032365 A1 | 2/2011 | Yett |
| 2011/0055846 A1 | 3/2011 | Perez et al. |
| 2011/0096319 A1 | 4/2011 | Otani et al. |
| 2011/0099105 A1 | 4/2011 | Mennie et al. |
| 2011/0103215 A1 | 5/2011 | Hotta et al. |
| 2011/0122287 A1 | 5/2011 | Kunishige et al. |
| 2011/0123188 A1 | 5/2011 | Cardwell et al. |
| 2011/0127788 A1 | 6/2011 | Nakanishi |
| 2011/0181553 A1 | 7/2011 | Brown et al. |
| 2011/0194097 A1 | 8/2011 | Yamaguchi et al. |
| 2011/0248151 A1 | 10/2011 | Holcombe et al. |
| 2011/0284756 A1 | 11/2011 | Miko et al. |
| 2011/0286661 A1 | 11/2011 | Lee et al. |
| 2011/0297235 A1 | 12/2011 | Bergmann |
| 2011/0306413 A1 | 12/2011 | Bickerstaff et al. |
| 2011/0317146 A1 | 12/2011 | Gu et al. |
| 2012/0013885 A1 | 1/2012 | Yang et al. |
| 2012/0061587 A1 | 3/2012 | Wu |
| 2012/0062517 A1 | 3/2012 | Lai et al. |
| 2012/0063287 A1 | 3/2012 | Yamamoto et al. |
| 2012/0105690 A1 | 5/2012 | Waqas et al. |
| 2012/0160298 A1 | 6/2012 | Kanamoto et al. |
| 2012/0162410 A1 | 6/2012 | Vaillant |
| 2012/0206336 A1 | 8/2012 | Bruder |
| 2012/0242867 A1 | 9/2012 | Shuster |
| 2012/0249998 A1 | 10/2012 | Eisele et al. |
| 2012/0250137 A1 | 10/2012 | Maxik et al. |
| 2012/0262365 A1 | 10/2012 | Mallinson |
| 2012/0262696 A1 | 10/2012 | Eisele et al. |
| 2012/0289672 A1 | 11/2012 | Kastler et al. |
| 2012/0293651 A1 | 11/2012 | Kawamata et al. |
| 2012/0320160 A1 | 12/2012 | Drazic |
| 2012/0328906 A1 | 12/2012 | Kwon et al. |
| 2013/0033579 A1 | 2/2013 | Wajs |
| 2013/0076695 A1 | 3/2013 | Gomez et al. |
| 2013/0135604 A1 | 5/2013 | Gogolla et al. |
| 2013/0201492 A1 | 8/2013 | Takahashi |
| 2013/0222551 A1 | 8/2013 | Shamir et al. |
| 2013/0235390 A1 | 9/2013 | Holzapfel et al. |
| 2013/0242283 A1 | 9/2013 | Bailey et al. |
| 2013/0266210 A1 | 10/2013 | Morgan-Mar et al. |
| 2013/0271818 A1 | 10/2013 | Maxik et al. |
| 2013/0320302 A1 | 12/2013 | Park et al. |
| 2014/0015242 A1 | 1/2014 | Forrest |
| 2014/0043610 A1 | 2/2014 | Engel et al. |
| 2014/0066656 A1 | 3/2014 | Bruder et al. |
| 2014/0078376 A1 | 3/2014 | Shuster |
| 2014/0124782 A1 | 5/2014 | Jung et al. |
| 2014/0132724 A1 | 5/2014 | Choi et al. |
| 2014/0209789 A1 | 7/2014 | Hu |
| 2014/0211295 A1 | 7/2014 | Maxik et al. |
| 2014/0217329 A1 | 8/2014 | Hayoz et al. |
| 2014/0233028 A1 | 8/2014 | Englund |
| 2014/0291480 A1 | 10/2014 | Bruder et al. |
| 2014/0347442 A1 | 11/2014 | Wang et al. |
| 2014/0368726 A1 | 12/2014 | Gladnick |
| 2015/0029326 A1 | 1/2015 | Backman et al. |
| 2015/0085166 A1 | 3/2015 | Shuster |
| 2015/0111337 A1 | 4/2015 | Welker et al. |
| 2015/0124241 A1 | 5/2015 | Eisele et al. |
| 2015/0124268 A1 | 5/2015 | Bruder et al. |
| 2015/0132887 A1 | 5/2015 | Welker et al. |
| 2015/0170400 A1 | 6/2015 | Seitz et al. |
| 2015/0286340 A1 | 10/2015 | Send et al. |
| 2015/0346911 A1 | 12/2015 | Christiansson |
| 2015/0372046 A1 | 12/2015 | Kim et al. |
| 2016/0084650 A1 | 3/2016 | Hsu et al. |
| 2016/0099429 A1 | 4/2016 | Bruder et al. |
| 2016/0124074 A1 | 5/2016 | Wonneberger et al. |
| 2016/0127664 A1 | 5/2016 | Bruder et al. |
| 2016/0139243 A1 | 5/2016 | Send et al. |

(56) References Cited

U.S. PATENT DOCUMENTS

| | | |
|---|---|---|
| 2016/0140786 A1 | 5/2016 | Wang |
| 2016/0155575 A1 | 6/2016 | Yamato et al. |
| 2016/0177177 A1 | 6/2016 | Koenemann et al. |
| 2016/0211464 A1 | 7/2016 | Tanabe et al. |
| 2016/0218302 A1 | 7/2016 | Hermes et al. |
| 2016/0224110 A1 | 8/2016 | Massonneau et al. |
| 2016/0248021 A1 | 8/2016 | Sundarraj et al. |
| 2016/0255323 A1 | 9/2016 | Wajs |
| 2016/0266257 A1 | 9/2016 | Bruder et al. |
| 2016/0286199 A1 | 9/2016 | Wajs et al. |
| 2016/0320489 A1 | 11/2016 | Send et al. |
| 2016/0364015 A1 | 12/2016 | Send et al. |
| 2016/0377417 A1 | 12/2016 | Jovanovski et al. |
| 2017/0039793 A1 | 2/2017 | Send et al. |
| 2017/0074652 A1 | 3/2017 | Send et al. |
| 2017/0082426 A1 | 3/2017 | Bruder et al. |
| 2017/0082486 A1 | 3/2017 | Send et al. |
| 2017/0123593 A1 | 5/2017 | Send et al. |
| 2017/0183295 A1 | 6/2017 | Koenemann et al. |
| 2017/0205230 A1 | 7/2017 | Send et al. |
| 2017/0219694 A1 | 8/2017 | Send et al. |
| 2017/0219709 A1 | 8/2017 | Send et al. |
| 2017/0237926 A1 | 8/2017 | Bruder et al. |
| 2017/0250334 A1 | 8/2017 | Hermes et al. |
| 2017/0263868 A1 | 9/2017 | Tanabe et al. |
| 2017/0309828 A1 | 10/2017 | Tanabe et al. |
| 2017/0363465 A1 | 12/2017 | Send et al. |
| 2017/0363741 A1 | 12/2017 | Send et al. |
| 2018/0003993 A1 | 1/2018 | Send et al. |
| 2018/0007343 A1 | 1/2018 | Send et al. |
| 2018/0017679 A1 | 1/2018 | Valouch et al. |
| 2018/0031672 A1 | 2/2018 | Bruder et al. |
| 2018/0044357 A1 | 2/2018 | Spielmann et al. |
| 2018/0067213 A1 | 3/2018 | Send et al. |
| 2018/0136319 A1 | 5/2018 | Send et al. |
| 2018/0182980 A1 | 6/2018 | Lennartz et al. |
| 2018/0210064 A1 | 7/2018 | Send et al. |
| 2018/0231376 A1 | 8/2018 | Send et al. |
| 2018/0238993 A1 | 8/2018 | Send et al. |
| 2018/0243045 A1 | 8/2018 | Franjic et al. |
| 2018/0249051 A1 | 8/2018 | Send et al. |
| 2018/0276843 A1 | 9/2018 | Send et al. |
| 2018/0329024 A1 | 11/2018 | Send et al. |
| 2018/0356501 A1 | 12/2018 | Send et al. |
| 2019/0129035 A1 | 5/2019 | Valouch et al. |
| 2019/0129036 A1 | 5/2019 | Valouch et al. |
| 2019/0140129 A1 | 5/2019 | Valouch et al. |
| 2019/0157470 A1 | 5/2019 | Send et al. |
| 2019/0170849 A1 | 6/2019 | Hermes et al. |
| 2019/0172964 A1 | 6/2019 | Hermes et al. |
| 2019/0198206 A1 | 6/2019 | Ter Maat et al. |
| 2019/0277703 A1 | 9/2019 | Valouch et al. |
| 2019/0339356 A1 | 11/2019 | Schildknecht et al. |
| 2019/0353767 A1* | 11/2019 | Eberspach ............ G01S 3/783 |
| 2020/0011995 A1 | 1/2020 | Send et al. |

FOREIGN PATENT DOCUMENTS

| | | |
|---|---|---|
| CA | 2196563 | 12/1996 |
| CN | 1270706 | 10/2000 |
| CN | 1677053 A | 10/2005 |
| CN | 1723564 A | 1/2006 |
| CN | 1777859 | 5/2006 |
| CN | 1809801 A | 7/2006 |
| CN | 1894976 | 1/2007 |
| CN | 1896686 A | 1/2007 |
| CN | 101129074 | 2/2008 |
| CN | 101290348 A | 10/2008 |
| CN | 101449181 | 6/2009 |
| CN | 101650173 A | 2/2010 |
| CN | 101655350 | 2/2010 |
| CN | 101859439 A | 10/2010 |
| CN | 102096962 | 6/2011 |
| CN | 201897828 | 7/2011 |
| CN | 102435136 | 5/2012 |
| CN | 102506754 A | 6/2012 |
| CN | 102549380 | 7/2012 |
| CN | 102549381 A | 7/2012 |
| CN | 102737435 | 10/2012 |
| CN | 102833569 | 12/2012 |
| CN | 103106411 A | 5/2013 |
| CN | 103322910 A | 9/2013 |
| CN | 103403494 | 11/2013 |
| CN | 103492835 | 1/2014 |
| CN | 103649677 | 3/2014 |
| CN | 103650478 | 3/2014 |
| DE | 2 417 854 | 10/1974 |
| DE | 25 01 124 A1 | 8/1975 |
| DE | 32 03 613 | 8/1982 |
| DE | 32 25 372 A1 | 2/1983 |
| DE | 42 11 875 | 10/1993 |
| DE | 196 04 856 | 8/1997 |
| DE | 10146752 | 4/2002 |
| DE | 10 2005 043 627 A1 | 3/2007 |
| DE | 10 2005 053 995 | 5/2007 |
| DE | 10 2007 037 875 A1 | 2/2009 |
| DE | 10 2010 042 278 | 4/2012 |
| DE | 20 2012 009 070 | 1/2013 |
| DE | 10 2014 108 353 A1 | 12/2014 |
| EP | 0 112 169 A2 | 6/1984 |
| EP | 0 185 450 A2 | 6/1986 |
| EP | 0 309 631 | 4/1989 |
| EP | 0 754 930 A2 | 1/1997 |
| EP | 1 176 646 A1 | 1/2002 |
| EP | 1 191 819 | 3/2002 |
| EP | 1 330 117 | 7/2003 |
| EP | 1 373 272 | 1/2004 |
| EP | 1 667 246 A1 | 6/2006 |
| EP | 1 832 910 | 9/2007 |
| EP | 1 947 477 | 7/2008 |
| EP | 2 205 657 A1 | 7/2010 |
| EP | 2 220 141 A1 | 8/2010 |
| EP | 2 507 286 A2 | 10/2012 |
| EP | 2 527 866 A1 | 11/2012 |
| EP | 2 725 617 A1 | 4/2014 |
| EP | 2 735 542 | 5/2014 |
| EP | 2 781 931 | 9/2014 |
| EP | 2 813 324 | 12/2014 |
| EP | 2 818 493 A1 | 12/2014 |
| EP | 15 153 215 | 1/2015 |
| EP | 2 831 180 | 2/2015 |
| EP | 15 157 363 | 3/2015 |
| EP | 15 164 653 | 4/2015 |
| EP | 2 884 303 A1 | 6/2015 |
| EP | 15 177 275 | 7/2015 |
| EP | 15 180 353 | 8/2015 |
| EP | 15 180 354 | 8/2015 |
| EP | 15 185 005 | 9/2015 |
| EP | 15 191 960 | 10/2015 |
| EP | 15 196 238 | 11/2015 |
| EP | 15 196 239 | 11/2015 |
| EP | 15 197 744 | 12/2015 |
| EP | 15 155 835 | 2/2016 |
| EP | 16 155 834 | 2/2016 |
| EP | 16 155 845 | 2/2016 |
| EP | 3 008 421 | 4/2016 |
| EP | 3 008 757 | 4/2016 |
| EP | 3 036 503 | 6/2016 |
| EP | 3 045 935 | 7/2016 |
| GB | 2 432 723 | 5/2007 |
| JP | S59-50579 | 3/1984 |
| JP | 59-79805 | 5/1984 |
| JP | 61-89501 | 5/1986 |
| JP | S61-135280 | 6/1986 |
| JP | 61-186804 | 8/1986 |
| JP | 64-17485 | 1/1989 |
| JP | H02-170004 | 6/1990 |
| JP | 04-240817 | 8/1992 |
| JP | 5-48833 A | 2/1993 |
| JP | 05-240640 | 9/1993 |
| JP | 6-133321 | 5/1994 |
| JP | 7-146113 | 6/1995 |
| JP | 7-318630 | 12/1995 |
| JP | 8-159714 | 6/1996 |

(56) References Cited

FOREIGN PATENT DOCUMENTS

| | | |
|---|---|---|
| JP | 8-292586 A | 11/1996 |
| JP | 10-26513 A | 1/1998 |
| JP | 10-221064 | 8/1998 |
| JP | H11-230860 | 8/1999 |
| JP | 11-257917 | 9/1999 |
| JP | 11-325825 | 11/1999 |
| JP | 3110095 | 11/2000 |
| JP | 2001-516150 | 9/2001 |
| JP | 2002-176191 | 6/2002 |
| JP | 2003-307407 | 10/2003 |
| JP | 2004-508691 | 3/2004 |
| JP | 2005-509909 | 4/2005 |
| JP | 2005-189087 | 7/2005 |
| JP | 2005-241340 A | 9/2005 |
| JP | 2005-296268 | 10/2005 |
| JP | 2006-514366 | 4/2006 |
| JP | 2006-337254 | 12/2006 |
| JP | 2007-521559 | 8/2007 |
| JP | 2007-530978 | 11/2007 |
| JP | 2008-522418 | 6/2008 |
| JP | 2008-164538 | 7/2008 |
| JP | 2009-257890 | 11/2009 |
| JP | 2010-081002 | 4/2010 |
| JP | 2010-218770 | 9/2010 |
| JP | 2010-531520 | 9/2010 |
| JP | 2011-503673 | 1/2011 |
| JP | 2011-027707 | 2/2011 |
| JP | 2012-522248 | 9/2012 |
| JP | 2012-229964 | 11/2012 |
| JP | 2012-231154 | 11/2012 |
| JP | 2013-051674 | 3/2013 |
| TW | 2011-40111 A | 11/2011 |
| WO | 99-09603 | 2/1999 |
| WO | WO 01/29576 A1 | 4/2001 |
| WO | WO 02/076988 | 10/2002 |
| WO | WO 02/101838 A1 | 12/2002 |
| WO | 03/012371 A1 | 2/2003 |
| WO | WO 03/098617 | 11/2003 |
| WO | WO 2004/072909 | 8/2004 |
| WO | WO 2004/114112 A1 | 12/2004 |
| WO | WO 2005/106965 A1 | 11/2005 |
| WO | WO 2007/006717 | 1/2007 |
| WO | WO 2007/054470 A1 | 5/2007 |
| WO | WO 2008/122531 | 10/2008 |
| WO | WO 2008/145172 | 12/2008 |
| WO | WO 2009/013282 A1 | 1/2009 |
| WO | WO 2009/021859 | 2/2009 |
| WO | WO 2009/053291 A1 | 4/2009 |
| WO | WO 2009/058115 A1 | 5/2009 |
| WO | WO 2009/105801 | 9/2009 |
| WO | WO 2010-063521 | 6/2010 |
| WO | WO 2010/088032 A2 | 8/2010 |
| WO | WO 2010/094636 A1 | 8/2010 |
| WO | WO 2010/118409 | 10/2010 |
| WO | WO 2010/118450 | 10/2010 |
| WO | WO 2011/067192 A2 | 6/2011 |
| WO | WO 2011/083722 | 7/2011 |
| WO | WO 2011/091967 A2 | 8/2011 |
| WO | WO 2012/001628 A1 | 1/2012 |
| WO | WO 2012/046181 A1 | 4/2012 |
| WO | WO 2012/049038 A1 | 4/2012 |
| WO | WO 2012/085803 A1 | 6/2012 |
| WO | WO 2012/091814 | 7/2012 |
| WO | WO 2012/110924 A1 | 8/2012 |
| WO | WO 2012/115593 | 8/2012 |
| WO | WO 2012/139354 | 10/2012 |
| WO | 2012/152812 A1 | 11/2012 |
| WO | 2012/168395 A1 | 12/2012 |
| WO | WO 2006/134370 | 12/2012 |
| WO | WO 2013/009676 | 1/2013 |
| WO | WO 2013/090960 | 6/2013 |
| WO | WO 2013/091016 A1 | 6/2013 |
| WO | 2013/118037 A1 | 8/2013 |
| WO | WO 2013/116883 | 8/2013 |
| WO | WO 2013/144177 A1 | 10/2013 |
| WO | WO 2013/156101 A1 | 10/2013 |
| WO | 2013/170982 A1 | 11/2013 |
| WO | 2014/086722 A1 | 6/2014 |
| WO | 2014/097489 A1 | 6/2014 |
| WO | WO 2014/097181 A1 | 6/2014 |
| WO | WO 2014/123522 | 8/2014 |
| WO | 2014/178923 A2 | 11/2014 |
| WO | 2014/198623 A1 | 12/2014 |
| WO | 2014/198625 A1 | 12/2014 |
| WO | 2014/198626 A1 | 12/2014 |
| WO | 2014/198629 A1 | 12/2014 |
| WO | 2015/024871 A1 | 2/2015 |
| WO | WO 2015/081362 | 6/2015 |
| WO | WO 2015/091607 | 6/2015 |
| WO | WO 2015/150989 | 10/2015 |
| WO | WO 2015/159192 | 10/2015 |
| WO | WO 2015/161989 | 10/2015 |
| WO | WO 2015/162528 | 10/2015 |
| WO | WO 2015/176981 | 11/2015 |
| WO | WO 2015/177784 A2 | 11/2015 |
| WO | 2015/193804 A2 | 12/2015 |
| WO | 2016/005893 A1 | 1/2016 |
| WO | WO 2016/012274 | 1/2016 |
| WO | 2016/051323 A1 | 4/2016 |
| WO | WO 2016/066494 | 5/2016 |
| WO | 2016/092449 A1 | 6/2016 |
| WO | 2016/092454 A1 | 6/2016 |
| WO | WO 2016/083914 | 6/2016 |
| WO | WO 2016/120392 | 8/2016 |
| WO | WO 2016/146725 | 9/2016 |
| WO | WO 2017/089553 | 6/2017 |
| WO | WO 2017/144401 | 8/2017 |
| WO | WO 2018/096083 | 5/2018 |
| WO | WO 2018/115073 | 6/2018 |
| WO | WO 2018/146138 | 8/2018 |
| WO | WO 2018/146146 | 8/2018 |
| WO | WO 2018/167215 | 9/2018 |
| WO | WO 2018/193045 | 10/2018 |
| WO | WO 2019/002199 | 1/2019 |
| WO | WO 2019/011803 | 1/2019 |
| WO | WO 2019/038354 | 2/2019 |
| WO | WO 2019/042956 | 3/2019 |
| WO | WO 2019/042959 | 3/2019 |
| WO | WO 2019/072965 | 4/2019 |
| WO | WO 2019/096986 | 5/2019 |
| WO | WO 2019/115594 | 6/2019 |
| WO | WO 2019/115595 | 6/2019 |
| WO | WO 2019/115596 | 6/2019 |

OTHER PUBLICATIONS

X. Jiang et al., Dreidimensionales Computersehen, Chapter 2, Springer, Berlin Heidelberg (1997).
U.S. Appl. No. 16/484,369, filed Aug. 7, 2019, Lungenschmied, et al.
U.S. Appl. No. 16/478,907, filed Jul. 18, 2019, Valouch, et al.
U.S. Appl. No. 16/483,231, filed Aug. 2, 2019, Send, et al.
Extended Search Report dated Aug. 23, 2011 in Europe Application No. 11154531.5 (With English Translation of Category of Cited Documents).
Erwin Bacher, et al., "Synthesis and Characterization of Photo-Cross-Linkable Hole-Conducting Polymers", Macromolecules, vol. 38, 2005, pp. 1640-1647.
H. Bruce Goodbrand, et al., "Ligand-Accelerated Catalysis of the Ullmann Condensation: Application to Hole Conducting Triarylamines", J. Org. Chem., vol. 64, 1999, pp. 670-674.
Felix E. Goodson, et al., "Palladium-Catalyzed Synthesis of Pure, Regiodefined Polymeric Triarylamines", J. Am. Chem. Soc., vol. 121, 1999, pp. 7527-7539.
John F. Hartwig, "Transition Metal Catalyzed Synthesis of Arylamines and Aryl Ethers from Aryl Halides and Triflates: Scope and Mechanism", Angew. Chem. Int. Ed., vol. 37, 1998, pp. 2046-2067.
Sheila I. Hauck, et al., "Tetraazacyclophanes by Palladium-Catalyzed Aromatic Amination. Geometrically Defined, Stable, High-Spin Diradicals", Organic Letters, vol. 1, No. 13, 1999, pp. 2057-2060.

(56) References Cited

OTHER PUBLICATIONS

Ping-Hsin Huang, et al., "Synthesis and Characterization of new fluorescent two-photon absorption chromophores", J. Mater. Chem., vol. 16, 2006, pp. 850-857.

Qinglan Huang, et al., "Molecularly 'Engineered' Anode Adsorbates for Probing OLED Interfacial Structure-Charge Injection/Luminance Relationships: Large, Structure-Dependent Effects", J. Am. Chem. Soc., vol. 125, 2003, pp. 14704-14705.

A. Balionyte, et al., "Carbazolyl-substituted triphenyldiamine derivatives as novel photoconductive amorphous molecular materials", Journal of Photochemistry and Photobiology A: Chemistry, vol. 162, 2004, pp. 249-252.

G. R. A. Kumara, et al., "Fabrication of Dye-Sensitized Solar Cells Using Triethylamine Hydrothiocyanate as a CuI Crystal Growth Inhibitor", Langmuir, vol. 18, 2002, pp. 10493-10495.

Lukas Schmidt-Mende, et al., "Organic Dye for Highly Efficient Solid-State Dye-Sensitized Solar Cells", Adv. Mater., vol. 17, No. 7, 2005, pp. 813-815.

James Lindley, "Copper Assisted Nucleophilic Substitution of Aryl Halogen", Tetrahedron, vol. 40, No. 9, 1984, pp. 1433-1456.

Yunqi Liu, et al., "Synthesis and characterization of a novel bipolar polymer for light-emitting diodes", Chem. Commun., vol. 24, 1998, pp. 2747-2748.

Narukuni Hirata, et al., "Interface engineering for solid-state dye-sensitised nanocrystalline solar cells: the use of an organic redox cascade", Chem. Commun., vol. 5, 2006, pp. 535-537.

Qingjiang Yu, et al., "High-Efficiency Dye-Sensitized Solar Cells: The Influence of Lithium Ions on Exciton Dissociation, Charge Recombination, and Surface States", ACS Nano, vol. 4, No. 10, 2010, pp. 6032-6038.

Bin Peng, et al., "Systematic investigation of the role of compact $TiO_2$ solar cells", Coordination Chemistry Reviews, vol. 248, 2004, pp. 1479-1489.

Jiun Yi Shen, et al., "High $T_g$ blue emitting materials for electroluminescent devices", J. Mater. Chem., vol. 15, 2005, pp. 2455-2463.

Tobat P. I. Saragi, et al., "Comparison of Charge-Carrier Transport in Thin Films of Spiro-Linked Compounds and Their Corresponding Parent Compounds", Adv. Funct. Mater., vol. 16, 2006, pp. 966-974.

V. P. S. Perera, et al., "Dye-Sensitized Solid-State Photovoltaic Cells Based on Dye Multilayer-Semiconductor Nanostructures", J. Phys. Chem. B, vol. 107, 2003, pp. 13758-13761.

U. Bach, et al., "Solid-state dye-sensitized mesoporous $TiO_2$ solar cells with high photon-to-electron conversion efficiencies", Nature, vol. 395, 1998, pp. 583-585.

John P. Wolfe, et al., "Rational Development of Practical Catalysts for Aromatic Carbon-Nitrogen Bond Formation", Acc. Chem. Res. vol. 31, 1998, pp. 805-818.

Bryant H. Yang, et al., "Palladium-Catalyzed amination of aryl halides and sulfonates", Journal of Organometallic Chemistry, vol. 576, 1999, pp. 125-146,.

Zhong Hui Li, et al., "Synthesis and Functional Properties of Strongly Luminescent Diphenylamino End-Capped Oligophenylenes", J. Org. Chem., vol. 69, 2004, pp. 921-927.

Brian O'Regan, et al., "A low-cost, high-efficiency solar cell based on dye-sensitized colloidal $TiO_2$ films", Letters to Nature, vol. 353, 1991, pp. 737-740.

International Search Report dated Sep. 24, 2014 in PCT/EP2014/061682,.

International Preliminary Report on Patentability and Written Opinion dated Dec. 15, 2015 in PCT/EP2014/061682.

International Preliminary Report on Patentability and Written Opinion dated Dec. 23, 2015 in PCT/EP2014/061695.

International Search Report and Written Opinion dated May 31, 2012 in PCT/IB2012/050592 filed on Feb. 9, 2012.

Supplementary European Search Report dated Nov. 19, 2014, issued in corresponding European Patent Application No. EP 12 74 6808.

Volker Viereck, et al., Large-area applications of optical MEMS: micromirror arrays guide daylight, optimize indoor illumination, Optical Components, Photonik International 2, 2009, pp. 48-49.

C.U. Murade, et al., "High speed adaptive liquid microlens array", Optics Express, vol. 20, No. 16, Jul. 30, 2012, pp. 18180-18187.

Jason Heikenfeld, et al., "Recent Progress in Arrayed Electrowetting Optics", Optics & Photonics News, vol. 20, No. 1, Jan. 1, 2009, pp. 20-26.

Tao Peng, "Algorithms and models for 3-D shape measurement using digital fringe projections", Dissertation, University of Maryland (College Park, Md.), Jan. 16, 2007, 268 pages (http://drum.lib.umd.edu//handle/1903/6654;http://en.wikipedia.org/wiki/Gray_code; http://en.wikipedia.org/wiki/Structured-light_3D_scanner).

Jie-Ci Yang et al., "An Intelligent Automated Door Control System Based on a Smart", Sensors, 2013, 13(5), pp. 5923-5936; doi: 10.3390/s130505923 www.mdpi.com/journal/sensors.

Tomas Leijtens, et al., "Hole Transport Materials with Low Glass Transition Temperatures and High Solubility for Application in Solid-State Dye-Sensitized Solar Cells", ACS Nano, vol. 6, No. 2, 2012, pp. 1455-1462 www.acsnano.org.

International Search Report and Written Opinion dated Oct. 31, 2014 in PCT/EP2014/067466 filed Aug. 15, 2014.

Paul Pargas, "Phenomena of Image Sharpness Recognition of CdS and CdSe Photoconductors" Journal of the Optical Society of America, vol. 54, No. 4, Apr. 1964, pp. 516-519.

Paul Pargas, "A Lens Measuring Method Using Photoconductive Cells" Journal of the SMPTE, vol. 74, Jun. 1965, pp. 501-504.

Jack T. Billings, "An Improved Method for Critical Focus of Motion-Picture Optical Printers" Journal of the SMPTE, vol. 80, Aug. 1971, pp. 624-628.

International Search Report dated Sep. 9, 2014 in PCT/EP2014/061688 filed Jun. 5, 2014.

Written Opinion of the International Searching Authority dated Sep. 9, 2014 in PCT/EP2014/061688 filed Jun. 5, 2014.

International Search Report and Written Opinion of the International Searching Authority dated Mar. 12, 2015 in PCT/EP2014/078155 Filed Dec. 17, 2014.

International Search Report and Written Opinion of the International Searching Authority dated May 16, 2014 in PCT/IB2013/061095.

Seigo Ito, et al., "High-Efficiency Organic-Dye-Sensitized Solar Cells Controlled by Nanocrystalline-$TiO_2$ Electrode Thickness", Adv. Mater., vol. 18, 2006, pp. 1202-1205.

Atte Haapalinna, et al., "Measurement of the Absolute Linearity of Photodetectors with a Diode Laser," Meas. Sci. Technol., 10, (1999) 1075-1078.

M. R. Andersen, et al., "Kinect Depth Sensor Evaluation for Computer Vision Applications",Electrical and Computer Engineering, Technical Report ECE-TR-6, Aarhus University, 2012, 39 pages.

Takumi Kinoshita, et al., "Wideband dye-sensitized solar cells employing a phosphine-coordinated ruthenium sensitizer", Nature Photonics, vol. 7, 2013, pp. 535-239.

Office Action dated Apr. 22, 2015 in Chinese Patent Application No. 201280018328.5 (submitting English translation only).

International Search Report and Written Opinion dated Sep. 3, 2014 in PCT/EP2014/061691.

International Preliminary Report on Patentability dated Sep. 25, 2015 in PCT/EP2014/061691.

Kuthirumal, S., et al., "Flexible Depth of Field Photography," IEEE Transactions on Pattern Analysis and Machine Intelligence, vol. 33, No. 1 (2011), pp. 58-71.

Hiura Shinsaku et al., "Depth Measurement by the Multi-Focus Camera," Computer Vision and Pattern Recognition, 1998. Proceedings. 1998 IEEE Computer Society Conference on Santa Barbara, CA, USA, Jun. 23-25, 1998, pp. 953-959.

International Preliminary Report on Patentability and Written Opinion dated Dec. 23, 2015 in PCT/EP2014/061688.

Denis Klimentjew, et al., "Multi Sensor Fusion of Camera and 3D Laser Range Finder for Object Recognition" 2010 IEEE International Conference on Multisensor Fusion and Integration for Intelligent Systems, 2010, pp. 236-241.

International Search Report and Written Opinion dated Nov. 21, 2014 in PCT/EP2014/067465.

"So funktioniert die DLP-Technologie" DLP-Technologie- www.dlp.com/de/technology/how-dlp-works, 2014, 2 Pages.

(56) References Cited

OTHER PUBLICATIONS

"New-Ultra-Compact Pockels Cells with Brewster Polarizer and Waveplate for Laser Q-Switching" Leysop Ltd, Manfacturers and Suppliers of Electro-Optic Components- http://www.leysop.com/integrated_pockels_cell.htm, Aug. 4, 2013, 2 Pages.
D. Scaramuzza, et al., "Extrinsic Self Calibration of a Camera and a 3D Laser Range Finder from Natural Scenes" 2007 IEEE/RSJ International Conference on Intelligent Robots and Systems, 2007, (4164-4169) 8 pages.
International Search Report dated Aug. 28, 2015, in PCT/IB2015/052769, filed Apr. 16, 2015.
International Search Report and Written Opinion dated Jun. 30, 2015 in PCT/IB15/052233 Filed Mar. 26, 2015.
International Search Report dated Sep. 22, 2015, in Application No. PCT/IB2015/052785, filed on Apr. 16, 2015.
International Search Report dated Nov. 27, 2015, in PCT/IB2015/055121, filed Jul. 7, 2015.
International Search Report and Written Opinion dated Mar. 29, 2016, in PCT/IB2015/054536, filed Jun. 16, 2015.
International Search Report and Written Opinion dated Jan. 18, 2016 in PCT/IB2015/057412 filed Sep. 28, 2015.
Wang, Feng-Peng et al., "Distance Measurement using Digital Cameras Based on Laser Spot Detection", published on Jun. 30, 2011, School of Physics and Electronic Information, Gannan Normal University, Ganzhou 341000, China (with English Abstract).
Bahaa E. A. Saleh, et al., "Fundamentals of Photonics" John Wiley & Sons, Inc., Chapter 3, 1991, pp. 80-107 (with Cover Page).
International Search Report dated Mar. 21, 2016, in PCT/IB2015/059406.
International Search Report and Written Opinion in PCT/IB2015/059411 dated Mar. 16, 2016 filed Dec. 7, 2015.
Nam-Trung Nguyen, "Micro-optofluidic Lenses: A review", Biomicrofluidics, 2010, vol. 4, 031501-15.
Uriel Levy et al., "Tunable optofluidic devices", Microfluid Nanofluid, 2008, vol. 4, pp. 97-105.
International Search Report dated Mar. 22, 2016 in PCT/IB2015/059408 filed Dec. 7, 2015.
International Search Report dated Mar. 15, 2016 in PCT/IB2015/059404 filed Dec. 7, 2015.
International Search Report and Written Opinion dated Mar. 21, 2016, in PCT/IB2015/059403, filed Dec. 7, 2015.
International Preliminary Report and Written Opinion dated Mar. 10, 2016, in PCT/IB2015/059404.
International Search Report and Written Opinion dated May 27, 2016, in PCT/EP2016/051817, filed Jan. 28, 2016.
International Search Report dated May 20, 2016, in PCT/EP2016/054532.
International Preliminary Report on Patentability dated Aug. 1, 2017, in PCT/EP2016/051817.
Linyi Bian, et al., "Recent Progress in the Design of Narrow Bandgap Conjugated Polymers for High-Efficiency Organic Solar Cells", Progress in Polymer Science, vol. 37, 2012, pp. 1292-1331.
Antonio Facchetti, "Polymer donor-polymer acceptor (all-polymer) solar cells", Materials Today, vol. 16 No. 4, Apr. 2013, pp. 123-132.
Graham H. Carey, et al., "Colloidal Quantum Dot Solar Cells", Chemical Reviews, vol. 115 No. 23, 2015, pp. 12732-12763.
Jason P. Clifford, et al., "Fast, Sensitive and Spectrally Tunable Colloidal Quantum-Dot Pholodetectors", Nature Nanotechnology, Jan. 2009, pp. 1-5.
Kotaro Fukushima, et al., "Crystal Structures and Photocarrier Generation of Thioindigo Derivatives", Journal of Physical Chemistry B, vol. 102 No. 31, 1998, pp. 5985-5990.
Serap Günes, et al., "Hybrid Solar Cells", Inorganica Chimica Acta, vol. 361, 2008, pp. 581-588.
R. S. Mane, et al., "Chemical Deposition Method for Metal Chalcogenide Thin Films", Materials Chemistry and Physics, vol. 65, 2000, pp. 1-31.
Wilfried Hermes, "Emerging Thin-Film Photovoltaic Technologies", Chemie Ingenieur Technik, 2015, vol. 87 No. 4, pp. 376-389.
Paul H. Keck, "Photoconductivity in Vacuum Coated Selenium Films", Journal Optical Society of America, vol. 42 No. 4, Apr. 1952, pp. 221-225, with cover page.
Frank H. Moser, et al., "Phthalocyanine Compounds", Reinhold Publishing Corporation, 1963, p. 69-76 with cover pages.
M. Popescu, "Disordered Chalcogenide Optoelectronic Materials: Phenomena and Applications", Journal of Optoelectronics and Advanced Materials, vol. 7 No. 4, Aug. 2005, pp. 2189-2210.
Friedrich Andreas Sperlich, "Electron Paramagnetic Resonance Spectroscopy of Conjugated Polymers and Fullerenes for Organic Photovoltaics", Julius-Maximilians-Universität Würzburg, 2013, pp. 1- 127.
F. Stöckmann, "Superlinear Photoconductivity", Physica Status Solidi, vol. 34, 1969, pp. 751-757.
Evangelos Theocharous, "Absolute Linearity Measurements on a PbS Detector in the Infrared", Applied Optics, vol. 45 No. 11, Apr. 10, 2006, pp. 2381-2386.
Evangelos Theocharous, et al., "Absolute Linearity Measurements on HgCdTe Detectors in the Infrared Region", Applied Optics, vol. 43 No. 21, Jul. 20, 2004, pp. 4182-4188.
Arthur L.Thomas, "Phthalocyanine Research and Applications", CRC Press, 1990, pp. 253-271 with cover pages.
International Search Report and Written Opinion dated Jul. 19, 2016 in PCT/EP2016/058487 filed Apr. 18, 2016.
International Preliminary Report on Patentability and Written Opinion dated Feb. 1, 2018, in PCT/EP2016/066783.
http://www.plenoptic.info/pages/refocusing.html.
C. Hahne, A. Aggoun, S. Haxha, V. Velisavljevic, and J. Fernández, "Light field geometry of a standard plenoptic camera," Opt. Express 22, 26659-26673 (2014).
C. Hahne, A. Aggoun, S. Haxha, V. Velisavljevic, and J. Fernández, "Baseline of virtual cameras acquired by a standard plenoptic camera setup," in 3D-TV-Conference: The True Vision—Capture, Transmission and Display of 3D Video (3DTV-CON), Jul. 2-4, 2014.
C. Hahne, A. Aggoun, and V. Velisavljevic, "The refocusing distance of a standard plenoptic photograph," in 3D-TV-Conference: The True Vision—Capture, Transmission and Display of 3D Video (3DTV-CON), Jul. 8-10, 2015.
C. Hahne and A. Aggoun, "Embedded FIR filter design for real-time refocusing using a standard plenoptic video camera," Proc. SPIE 9023, in Digital Photography X, 902305 (Mar. 7, 2014).
Baeg et al., "Organic Light Detectors: Photodiodes and Phototransistors", Advanced Materials, vol. 25, No. 31, Mar. 11, 2013, pp. 4267-4295.
Office Action dated Jan. 3, 2018, in Chinese Patent Application No. 201610552144.7 parallel to U.S. Appl. No. 15/364,680.
International Preliminary Report on Patentability and Written Opinion dated Feb. 22, 2018 in PCT/EP2016/069049).
Office Action dated Mar. 5, 2018, in corresponding Chinese Patent Application No. 201480056299.0.
R. M. Schaffert, "A New High-Sensitivity Organic Photoconductor for Electrophotography", IBM J. Res. Develop., 1971, p. 75-89.
P. Gregory, Ed., Chemistry and Technology of printing and imaging systems, Chapman & Hall, 1996, Chap. 4, R.S. Gairns, Electrophotography, p. 76-112.
International Search Report and Written Opinion dated Nov. 17, 2016, in PCT/EP2016/071628, filed Sep. 14, 2016.
"Telezentrisches Objektiv" Retrieved from the Internet: https://de.wikipedia.org/wiki/Telezentrisches_Objektiv. Date of retrieval: Sep. 11, 2015, 3 Pages.
Benjamin F. Grewe, et al., "Fast Two-Layer Two-Photon Imaging of Neuronal Cell Populations Using an Electrically Tunable Lens," Biomedical Optics Express, vol. 2, No. 7, Jul. 1, 2011 (pp. 2035-2046).
Petr Bartu et al, "Conformable Large-AreaPposition-Sensitive Photodetectors Based on Luminescence-Collecting Silicone Waveguides," Journal of Applied Physics, 107, 123101 (2010).
Roland Stolarski, "Fluorescent Naphthalimide Dyes for Polyester Fibres," Fibres & Textiles in Eastern Europe, vol. 17, No. 2 (73) pp. 91-95 (2009).

(56) References Cited

OTHER PUBLICATIONS

Ayse Aktas et al., "Synthesis, Characterization, Electrochemical and Spectroelectrochemical Properties of Peripherally Tetra-Substituted Metal-Free and Metallophthalocyanines," *Dyes and Pigments*, 99, (2013) 613-619.
Hairong Li, et al., "Syntheses and Properties of Octa-, Tetra-, and Di-Hydroxy-Substituted Phthalocyanines," *Tetrahedron*, 65 (2009) 3357-3363.
"Methine Dyes and Pigments," *Ullmann's Encyclopedia of Industrial Chemistry*, vol. 23 (2012).
Jing Liu, et al., "Sulfone-Rhodamines: A New Class of Near-Infrared Fluorescent Dyes for Bioimagin," *ACS Applied Materials & Interfaces*, 8, 22953-22962 (2016).
E. Noelting et al., "Berichte der deutschen chemischen Gesellschaft", *Band*, 38, S. 3516-3527 (1905).
T. Nedelcev et al., "Preparation and Characterization of a New Derivative of Rhodamine B with an Alkoxysilane Moiety," *Dyes and Pigments*, 76 (2008), 550-556.
Aurore Loudet et al., "BODIPY Dyes and Their Derivatives: Syntheses and Spectroscopic Properties," *Chem.Rev.*, 107 (2007) 4981-4932.
Weili Zhao, et al., "Conformationally Restricted Aza-Bodipy: A Highly fluorescent, Stable, Near-Infrared-Absorbing Dye", *Angew. Chem. Int. Ed.*, 44 (2005) 1677-1679.
Georg M. Fischer, et al., "Near-Infrared Dyes and Fluorophores Based on Diketopyrrolopyrroles," *Angew. Chem. Int. Ed.* 46 (2007) 3750-3753.
Amaresh Mishra et al., "Small Molecule Organic Semiconductors on the Move: Promises for Future Solar Energy Technology," *Angew. Chem. Int. Ed.*, 51, (2012), 2020-2067.
G. Seybold et al., "New Perylene and Violanthrone Dyestuffs for Fluorescent Collectors," *Dyes and Pigments*, 11 (1989) 303-317.
Nam-Trung Nguyen, "Micro-Optofluidic Lenses: A Review", *Biomicrofluidics*, 4, (2010) 031501.
Uriel Levy et al., "Tunable Optofluidic Devices," *Microfluid Nanofluid* (2008) 4: 97-105.
Robert Koeppe et al., "Video-Speed Detection of the Absolute Position of a Light Point on a Large-Area Photodetector Based on Luminescent Waveguides," *Optics Express*, vol. 18, No. 3, (Feb. 1, 2010), 2209.
Office Action dated Jul. 9, 2018, in Japanese Patent Application No. 2017-007544.
Xing Lin, et al., "Coded focal stack photography", Computational Photography (ICCP), 2013 IEEE International Conference On, Apr. 19, 2013, XP032424246, pp. 1-9.
Nabeel a. Riza, et al., "Noncontact distance sensor using spatial signal processing", Optics Letters, Optical Society of America, vol. 34, No. 4, Feb. 15, 2009, XP001522006, pp. 434-436.
Nabeel A. Riza, et al., "Smart agile lens remote optical sensor for three-dimensional object shape measurements", Applied Optics, Optical Society of America, vol. 49, No. 7, Mar. 1, 2010, XP001552714, pp. 1139-1150.
International Search Report dated Nov. 7, 2017, in corresponding PCT/EP2017/057867.
International Search Report dated Jul. 7, 2017, in corresponding PCT/EP2017/057825.
Street (Ed.): Technology and Applications of Amorphous Silicon, Springer-Verlag Heidelberg, 2010, pp. 346-349.
International Search Report dated Aug. 17, 2017, in corresponding PCT/EP2017/060057.
International Search Report dated Aug. 1, 2017, in corresponding PCT/EP2017/060058.
Walter Fuhs, "Hydrogenated Amorphous Silicon—Material Properties and Device Applications", in S. Baranovski, Charge Transport in Disordered Solids, Wiley, p. 97-147, 2006.
Office Action dated Dec. 18, 2018, in Japanese Patent Application No. 2016-518930.
A.G. Pattantyus-Abraham, I.J. Kramer, A.R. Barkhouse, X. Wang, G. Konstantatos, R. Debnath, L. Levina, I. Raabe, M.K. Nazeerud-din, M. Grätzel, and E.H. Sargent, *Depleted-Heterojunction Colloidal Quantum Dot Solar Cells*, ACS NANO 4 (6), May 24, 2010.
R. Martins and E. Fortunato, *Thin Film Position Sensitive Detectors: from 1D to 3D Applications*, Chap. 8 in R. A. Street (Ed.), *Technology and Applications of Amorphous Silicon*, Springer, 2010.
International Search Report dated Oct. 20, 2017 in PCT/EP2017/068956 filed on Jul. 27, 2017.
Leskela, M. et al., "Preparation of lead sulfide thin films by the atomic layer epitaxy process," Pergamon Press plc, Vacuum/vol. 41/Nos. 4-6, pp. 1457-1459 (1990).
Dasgupta, N. et al., "Fabrication and Characterization of Lead Sulfide Thin Films by Atomic Layer Deposition," The Electrochemical Society, ECS Transactions, 16 (4) 29-36 (2008), Total 8 pages.
Dasgupta, N. et al., "Design of an atomic layer deposition reactor for hydrogen sulfide compatibility," Review of Scientific Instruments 81, 044102 (2010), Total 6 pages.
Xu, J. et al., "Atomic layer deposition of absorbing thin films on nanostructured electrodes for short-wavelength infrared photosensing," AIP Publishing, Applied Physics Letters 107, 153105 (2015), Total 5 pages.
Blount, G., et al., "Photoconductive properties of chemically deposited PbS with dielectric overcoatings," AIP Publishing, Journal of Applied Physics 46, 3489 (1975), Total 12 pages.
Groner, M. et al., "Low-Temperature $Al_2O_3$ Atomic Layer Deposition," American Chemical Society, Chem. Mater., vol. 16, No. 4, 2004, pp. 639-645.
Yoon, W. et al., "Electrical Measurement Under Atmospheric Conditions of PbSe Nanocrystal Thin Films Passivated by Remote Plasma Atomic Layer Deposition of $Al_2O_3$," IEEE Transactions on Nanotechnology, vol. 12, No. 2, Mar. 2013, pp. 146-151.
Hu, C., et al., "Air-stable short-wave infrared PbS colloidal quantum dot photoconductors passivated with Al2O3 atomic layer deposition," AIP Publishing, Applied Physics Letters 105, 171110 (2014), Total 5 pages.
Liu, Y., et al., "Robust, Functional Nanocrystal Solids by Infilling with Atomic Layer Deposition," ACS Publications, American Chemical Society, Nano Letters 2011, 11, pp. 5349-5355.
Liu, Y., et al., "PbSe Quantum Dot Field-Effect Transistors with Air-Stable Electron Mobilities above 7 $cm^2\ v^{-1}\ s^{-1}$," ACS Publications, American Chemical Society, Nano Letters 2013, 13, pp. 1578-1587.
George, S., "Atomic Layer Deposition: An Overview," American Chemical Society, Chem. Rev. 2010, 110, pp. 111-131.
Konstantatos, G., et al., "Engineering the Temporal Response of Photoconductive Photodetectors via Selective Introduction of Surface Trap States," American Chemical Society, Nano Letters 2008, vol. 8, No. 5, pp. 1446-1450.
Soci, C., et al., "ZnO Nanowire UV Photodetectors with High Internal Gain," American Chemical Society, Nano Letters 2007, vol. 7, No. 4, pp. 1003-1009.
List of integrated circuit packaging types (Wikipedia article, downloaded Jan. 15, 2019 from https://en.wikipedia.org/wiki/List_of_integrated_circuit_packaging_types).
List of integrated circuit packaging types, Dimension Reference (Wikipedia article, downloaded Jan. 15, 2019 from https://en.wikipedia.org/wiki/List_of_integrated_circuit_packaging_types#PIN-PITCH)
*Wikipedia*, Article denoted, "Thermocouple", retrieved Jul. 20, 2016.
Chinese Office Action dated Jan. 29, 2019, in Chinese Patent Application No. 201580036919.9.
Pekkola et al., "Focus-Induced Photoresponse: a novel way to measure distances with photodetectors", *Scientific Reports* (2018) 8:9208, 8 pages.
L. Pintilie, et al., "Field-effect-assisted photoconductivity in PbS films deposited on silicon dioxide", *J. Appl. Phys.* 91, p. 5782, 2002.
International Preliminary Report on Patentability and Written Opinion dated Aug. 22, 2019 in PCT/EP2018/053057.
U.S. Appl. No. 13/357,206, filed Jan. 24, 2012, now U.S. Pat. No. 9,001,029, Bruder, et al.
U.S. Appl. No. 14/132,570, filed Dec. 18, 2013, now U.S. Pat. No. 9,389,315, Bruder, et al.

(56) References Cited

OTHER PUBLICATIONS

U.S. Appl. No. 14/460,529, filed Aug. 15, 2014, now U.S. Pat. No. 9,665,182, Send, et al.
U.S. Appl. No. 14/460,540, filed Jan. 31, 2017, now U.S. Pat. No. 9,557,856, Send, et al.
U.S. Appl. No. 15/598,432, filed Jan. 16, 2015, now US 2015-0124268, Bruder, et al.
U.S. Appl. No. 14/787,909, filed Oct. 29, 2015, now U.S. Pat. No. 9,741,954, Bruder, et al.
U.S. Appl. No. 14/897,981, filed Dec. 11, 2015, US 2016-0124074, Wonneberger, et al.
U.S. Appl. No. 14/897,467, filed Dec. 10, 2015, now U.S. Pat. No. 9,989,623, Send, et al.
U.S. Appl. No. 14/896,958, filed Dec. 9, 2015, now U.S. Pat. No. 9,829,564, Bruder, et al.
U.S. Appl. No. 15/099,717, filed Apr. 15, 2016, now U.S. Pat. No. 10,120,078, Bruder, et al.
U.S. Appl. No. 15/105,489, filed Jun. 16, 2016, US 2016-0320489, Send, et al.
U.S. Appl. No. 15/301,112, filed Sep. 30, 2016, US 2017-0140786, Send, et al.
U.S. Appl. No. 15/304,328, filed Oct. 14, 2016, US 2017-0039793, Send, et al.
U.S. Appl. No. 15/305,379, filed Oct. 20, 2016, US 2017-0074652, Send, et al.
U.S. Appl. No. 15/319,156, filed Dec. 15, 2016, US 2017-0123593, Send, et al.
U.S. Appl. No. 15/364,680, filed Nov. 30, 2016, US 2017-0082426, Bruder, et al.
U.S. Appl. No. 15/367,213, filed Dec. 2, 2016, now U.S. Pat. No. 10,012,532, Send, et al.
U.S. Appl. No. 15/324,223, filed Jan. 5, 2017, US 2017-0205230, Send, et al.
U.S. Appl. No. 15/514,830, filed Mar. 28, 2017, U.S. Pat. No. 10,094,927, Send, et al.
U.S. Appl. No. 15/492,007, filed Apr. 20, 2017, U.S. Pat. No. 9,958,535, Send, et al.
U.S. Pat. No. 15/534,335, filed Jun. 8, 2017, US 2017-0363465, Send, et al.
U.S. Appl. No. 15/534,294, filed Jun. 8, 2017, US 2018-0276843, Send, et al.
U.S. Appl. No. 15/533,572, filed Jun. 6, 2017, US 2018-0003993, Send, et al.
U.S. Appl. No. 15/534,343, filed Jun. 8, 2017, US 2018-0007343, Send, et al.
U.S. Appl. No. 15/587,420, filed May 5, 2017, US 2017-0237926, Bruder, et al.
U.S. Appl. No. 15/534,041, filed Jun. 8, 2017, US 2017-0363741, Send, et al.
U.S. Appl. No. 15/547,664, filed Jul. 31, 2017, US 2018-0017679, Valouch, et al.
U.S. Appl. No. 15/554,496, filed Aug. 30, 2017, US 2018-0067213, Send, et al.
U.S. Appl. No. 15/727,733, filed Oct. 9, 2017, US 2018-0031672, Bruder, et al.
U.S. Appl. No. 15/567,885, filed Oct. 19, 2017, US 2018-0136319, Send, et al.
U.S. Appl. No. 15/744,334, filed Jan. 12, 2018, US 2018-0210064, Send, et al.
U.S. Appl. No. 15/751,283, filed Feb. 8, 2018, US 2018-0231376, Send, et al.
U.S. Appl. No. 15/758,135, filed Mar. 7, 2018, US 2018-0249051, Send, et al.
U.S. Appl. No. 15/775,424, filed May 11, 2018, US 2018-0329024, Send, et al.
U.S. Appl. No. 15/778,454, filed May 23, 2018, US 2018-0356501, Send, et al.
U.S. Appl. No. 15/960,581, filed Apr. 24, 2018, US 2018-0238993, Send, et al.
U.S. Appl. No. 16/090,990, filed Oct. 3, 2018, US 2019-0140129, Valouch, et al.
U.S. Appl. No. 16/091,409, filed Oct. 4, 2018, Send, et al.
U.S. Appl. No. 16/094,402, filed Oct. 17, 2018, US 2019-0129036, Valouch, et al.
U.S. Appl. No. 16/095,846, filed Oct. 23, 2018, Valouch, et al.
U.S. Appl. No. 16/096,361, filed Oct. 25, 2018, US 2019-0129035, Valouch, et al.
U.S. Appl. No. 16/321,143, filed Jan. 28, 2019, Hermes, et al.
U.S. Appl. No. 16/321,054, filed Jan. 28, 2019, Hermes, et al.
U.S. Appl. No. 16/344,538, filed Apr. 24, 2019, Valouch, et al.
U.S. Appl. No. 16/344,511, filed Apr. 24, 2019, Valouch, et al.
U.S. Appl. No. 16/461,654, filed May 16, 2019, Schildknecht, et al.
U.S. Appl. No. 15/309,631, filed Nov. 8, 2016, now U.S. Pat. No. 9,919,999, Koenemann, et al.
U.S. Appl. No. 14/908,740, filed Jan. 29, 2016, now U.S. Pat. No. 10,290,817, Battagliarin et al.
U.S. Appl. No. 15/512,1160, filed Mar. 17, 2017, US 2017-0250334, Hermes, et al.
U.S. Appl. No. 16/328,912, filed Feb. 27, 2019, Ter Maat, et al.
Ikeoka, et al., "Real-Time Depth Estimation with Wide Detectable Range Using Horizontal Planes of Sharp Focus Proceedings", ACIVS 2011: Advanced Concepts for Intelligent Vision Systems, pp. 669-680 (with English Abstract) (https://link.springer.com/chapter/10.1007/978-3-642-23687-7_60).
U.S. Appl. No. 16/636,148, filed Feb. 3, 2020, Schindler, et al.
U.S. Appl. No. 16/638,946, filed Feb. 13, 2020, Schindler, et al.
J. Robertson, "High Dielectric Constant Oxides", *European Physical Journal Applied Physics*, vol. 28, No. 3, pp. 265-291, 2004.
J.A. Kittl et al., "High-k Dielectrics for Future Generation Memory Devices", *Microelectronic Engineering*, vol. 86 (2009) 1789-1795.
Serap Günes, et al., "Hybrid Solar Cells", *Inorganica Chimica Acta* 361, (2008), p. 581-583.
John E. Anthony, et al., "n-Type Organic Semiconductors in Organic Electronics", *Adv. Mater.* 2010, 22, pp. 3876-3892.
Tian-yi Li, et al., "Small Molecule Near-Infrared Boron Dipyrromethene Donors for Organic Tandem Solar Cells", *J. Am. Chem. Soc.* 2017, 139, 13636-13639.
Christian Ulrich et al., "Organic Thin-Film Photovoltaic Cells Based on Oligothlophenes with Reduced Bandgap", *Adv. Funct. Mater.* 2007, 17, pp. 2991-2999.
Ronald Gresser, et al., "Synthesis and Characterization of Near-Infrared Absorbing Benzannulated Aza-BODIPY Dyes", *Chem. Eur. J.* 2011, 17, pp. 2939-2947.
Amaresh Mishra, et al., "Small Molecule Organic Semiconductors on the Move: Promises for Future Solar Energy Technology", *Angew. Chem. Int. Ed.* 2012, 51, 2020-2067.
Huifeng Yao, et al., "Molecular Design of Benzodithiophene-Based Organic Photovoltaic Materials", *Chem. Rev.* 2016, 116, 7397-7457.
Moritz Riede, et al., "Efficient Organic Tandem Solar Cells based on Small Molecules", *Adv. Funct. Mater.* 2011, 21, pp. 3019-3028.
Rico Schueppel, et al., "Controlled Current Matching in Small Molecule Organic Tandem Solar Cells Using Doped Spacer Layers", *J. Appl. Phys.* 107, 044503, 2010.
Jan Meiss et al., "Fluorinated Zinc Phthalocyanine as Donor for Efficient Vacuum-Deposited Organic Solar Cells," *Adv. Funct. Mater.* 2012, 22, pp. 405-414.

\* cited by examiner

DETECTOR FOR OPTICALLY DETECTING AT LEAST ONE OBJECT

FIELD OF THE INVENTION

The invention relates to a detector, a detector system and a method for determining a position of at least one object. The invention further relates to a human-machine interface for exchanging at least one item of information between a user and a machine, an entertainment device, a tracking system, a camera, a scanning system and various uses of the detector device. The devices, systems, methods and uses according to the present invention specifically may be employed for example in various areas of daily life, gaming, traffic technology, production technology, security technology, photography such as digital photography or video photography for arts, documentation or technical purposes, medical technology or in the sciences. Further, the invention specifically may be used for scanning one or more objects and/or for scanning a scenery, such as for generating a depth profile of an object or of a scenery, e.g. in the field of architecture, metrology, archaeology, arts, medicine, engineering or manufacturing. However, other applications are also possible.

PRIOR ART

A large number of optical sensors and photovoltaic devices are known from the prior art. While photovoltaic devices are generally used to convert electromagnetic radiation, for example, ultraviolet, visible or infrared light, into electrical signals or electrical energy, optical detectors are generally used for picking up image information and/or for detecting at least one optical parameter, for example, a brightness.

A large number of optical sensors which can be based generally on the use of inorganic and/or organic sensor materials are known from the prior art. Examples of such sensors are disclosed in US 2007/0176165 A1, U.S. Pat. No. 6,995,445 B2, DE 2501124 A1, DE 3225372 A1 or else in numerous other prior art documents. To an increasing extent, in particular for cost reasons and for reasons of large-area processing, sensors comprising at least one organic sensor material are being used, as described for example in US 2007/0176165 A1. In particular, so-called dye solar cells are increasingly of importance here, which are described generally, for example in WO 2009/013282 A1.

A large number of detectors for detecting at least one object are known on the basis of such optical sensors. Such detectors can be embodied in diverse ways, depending on the respective purpose of use. Examples of such detectors are imaging devices, for example, cameras and/or microscopes. High-resolution confocal microscopes are known, for example, which can be used in particular in the field of medical technology and biology in order to examine biological samples with high optical resolution. Further examples of detectors for optically detecting at least one object are distance measuring devices based, for example, on propagation time methods of corresponding optical signals, for example laser pulses. Further examples of detectors for optically detecting objects are triangulation systems, by means of which distance measurements can likewise be carried out. Kurt Konolige et al., A Low-Cost Laser Distance Sensor, 2008 IEEE International Conference on Robotics and Automation, Pasadena, Calif., USA, May 19-23, 2008, discuss competing technologies using triangulation for planar laser distance sensor (LDS). Structured line devices use a light stripe laser and offset camera to determine range to a set of points. Because the laser energy is spread over a line, it is difficult to achieve accurate range, especially in the presence of ambient light, or with darker objects. Point scan devices for 3D scanning of small objects typically use a scanning mirror to direct a point laser beam and redirect the laser return to an optical receiver. Such devices cannot be miniaturized, and their cost and mechanical fragility will remain high. Centroid point modules typically use position-sensitive devices (PSD). These devices measure the centroid of all light impinging on their surface. Although modulation techniques can be used to offset some of the effects of ambient light, PSDs do not perform well unless the laser spot has a very strong reflection, limiting their use to ranges of a meter or less. Pixel-based point modules search the pixel with maximum signal intensity to determine the position of the light spot on the sensor. Typically CMOS line arrays are used for detection. Konolige et al. introduce a low-cost version of a Pixel-based point module.

U.S. Pat. No. 5,235,377 A describes a measuring apparatus for a camera, wherein light is projected to an object from a projection section. Light reflected on the object is received at a first light receiving section and a second light receiving section arranged to be adjacent to each other. In the first light receiving section, a first and second signals relating to a light receiving position and a quantity of received light are output, and in the second light receiving section, a third signal relating to a quantity of light of the reflected light is output. In a discriminating and calculating section, if it is discriminated that the reflected light is positioned at a place, which is nearer than a predetermined distance, a measuring distance can be calculated from an output ratio of the first signal to the second signal by a measuring calculation circuit. On the other hand, if it is discriminated that the reflected light is positioned at a place, which is farther than the predetermined distance, a measuring distance can be calculated from the output ratio of the sum of the first and second signals to the third signal by the measuring calculation circuit.

U.S. Pat. No. 5,512,997 A describes a distance measuring device having an infrared light-emitting diode by which an infrared light is emitted towards a subject, and first and second linear line sensors on which an image corresponding to light reflected from the subject is formed. The first and second linear line sensors are disposed adjacently and in parallel to each other, and offset by an amount corresponding to half of the predetermined ND converting step. Analog distance data outputted from the linear line sensors are converted to digital distance data using the predetermined ND converting step, and then, the digital distance data are added together to obtain a subject distance with a high accuracy.

DE 42 11 875 A1 describes an optical rangefinder with electronic correction for spot eccentricity. The optical rangefinder has an evaluation circuit, which determines if an output distance measurement value is valid or erroneous due to e.g. inclination of object surface. The distance signal is determined by evaluation a position a light spot on a first detector. A second control signal, which characterizes inclination of the object surface, is determined by evaluating eccentricity of a light spot on a second detector, arranged in a different plane.

WO 2016/051323 A1 describes a detector and a method for optically determining a position of at least one object. The detector comprises at least one optical sensor for determining a position of at least one light beam and at least one evaluation device for generating at least one item of information on a transversal position of the object and at least one item of information on a longitudinal position of the object. The sensor has at least a first electrode and a second electrode. At least one photovoltaic material is embedded in between the first electrode and the second electrode. The first electrode or the second electrode is a split electrode having at least three partial electrodes. The detector and the method can determine three-dimensional coordinates of an object in a fast and efficient way.

In WO 2012/110924 A1, the content of which is herewith included by reference, a detector for optically detecting at least one object is proposed. The detector comprises at least one optical sensor. The optical sensor has at least one sensor region. The optical sensor is designed to generate at least one sensor signal in a manner dependent on an illumination of the sensor region. The sensor signal, given the same total power of the illumination, is dependent on a geometry of the illumination, in particular on a beam cross section of the illumination on the sensor area. The detector furthermore has at least one evaluation device. The evaluation device is designed to generate at least one item of geometrical information from the sensor signal, in particular at least one item of geometrical information about the illumination and/or the object.

WO 2014/097181 A1, the full content of which is herewith included by reference, discloses a method and a detector for determining a position of at least one object, by using at least one transversal optical sensor and at least one optical sensor. Specifically, the use of sensor stacks is disclosed, in order to determine a longitudinal position of the object with a high degree of accuracy and without ambiguity.

WO 2015/024871 A1 and US 2015/286340 A1, the full content of which is herewith included by reference, discloses an optical detector, comprising:
- at least one spatial light modulator being adapted to modify at least one property of a light beam in a spatially resolved fashion, having a matrix of pixels, each pixel being controllable to individually modify the at least one optical property of a portion of the light beam passing the pixel;
- at least one optical sensor adapted to detect the light beam after passing the matrix of pixels of the spatial light modulator and to generate at least one sensor signal;
- at least one modulator device adapted for periodically controlling at least two of the pixels with different modulation frequencies; and
- at least one evaluation device adapted for performing a frequency analysis in order to determine signal components of the sensor signal for the modulation frequencies.

U.S. Pat. No. 4,767,211 discloses an apparatus for and a method of measuring a boundary surface of a sample in which a ratio of the light quantity of a part of reflected light from a sample which travels in the vicinity of the optical axis of the reflected light, to the light quantity of another part of the reflected light which is directed to a position deviating from the optical axis by a predetermined distance is used to accurately measure a boundary surface of a sample. Since the accuracy of measurement is increased by using the above ratio, light capable of passing through the sample can be used as incident light. Thus, a deep hole in the surface of the sample and a void such as an air bubble in a living being sample, which cannot be measured by the prior art, can be measured very accurately.

WO 2014/198629 A1, the full content of which is herewith included by reference, discloses a detector for determining a position of at least one object, comprising:
- at least one optical sensor, the optical sensor being adapted to detect a light beam propagating from the object towards the detector, the optical sensor having at least one matrix of pixels; and
- at least one evaluation device, the evaluation device being adapted to determine a number N of pixels of the optical sensor which are illuminated by the light beam, the evaluation device further being adapted to determine at least one longitudinal coordinate of the object by using the number N of pixels which are illuminated by the light beam.

Further, generally, for various other detector concepts, reference may be made to WO 2014/198626 A1, WO 2014/198629 A1 and WO 2014/198625 A1, the full content of which is herewith included by reference. Further, referring to potential materials and optical sensors which may also be employed in the context of the present invention, reference may be made to European patent applications EP 15 153 215.7, filed on Jan. 30, 2015, EP 15 157 363.1, filed on Mar. 3, 2015, EP 15 164 653.6, filed on Apr. 22, 2015, EP 15177275.3, filed on Jul. 17, 2015, EP 15180354.1 and EP 15180353.3, both filed on Aug. 10, 2015, and EP 15 185 005.4, filed on Sep. 14, 2015, EP 15 196 238.8 and EP 15 196 239.6, both filed on Nov. 25, 2015, EP 15 197 744.4, filed on Dec. 3, 2015, the full content of all of which is herewith also included by reference.

US 2006/044546 A1 describes a ranging apparatus capable of ranging simultaneously to a three dimensional scene. An illumination means illuminates a scene with a two dimensional array of spots. A detector is located near to the illumination means and arranged to look toward the scene. A processor responds to the output from the detector and, from the location of a spot in the image of the scene, determines the range to that spot.

US 2008/13005 A1 describes driving schemes in which rows are selected one at a time and column data voltages are inverted to provide inversion schemes for display devices comprising pixels arranged in rows and columns. The order in which rows are selected is such that a first group of first polarity rows is selected in a first order, a first group of second polarity rows is selected in a second order, a second group of first polarity rows is selected in the second order, and a second group of second polarity rows is selected in the first order, the first order being one of ascending or descending row number order, and the second order being the other of ascending or descending row number order.

Despite the advantages implied by the above-mentioned devices and detectors, several technical challenges remain. Thus, generally, a need exists for detectors for detecting a position of an object in space which is both reliable and may be manufactured at low cost. Specifically, a need exists for 3D-sensing concepts. Various known concepts are at least partially based on using so-called FiP sensors, such as several of the above-mentioned concepts. Therein, as an example, large area sensors may be used, in which the individual sensor pixels are significantly larger than the light spot and which are fixed to a specific size. Still, large area sensors in many cases are inherently limited in the use of the FiP measurement principle, specifically in case more than one light spot is to be investigated simultaneously.

A further challenge using FiP detectors is the detector area or active area. Typically, for distance measurements, a large active area of the detector is used or even is required. This area, however, may cause noise problems, specifically when the tetralateral conductivity concept is employed to build a PSD. This often results in poor signal-to-noise-ratios and slow detector response times due to the large capacitance in conjunction with the series resistance of the detector. A further challenge using FiP detectors is cost of manufacturing. Thus, in many cases, typical FiP sensors are expensive, as compared to e.g. conventional Si-based photodiodes. Further, the evaluation of the measurement results of measurements using FiP-sensors remains an issue, specifically in case the total power of a light beam is unknown. In case a plurality of FiP-sensors is used, located at different positions along an axis of propagation of the light beam, a range of measurement typically is limited to the range in between the two positions of the sensors. Further, many FiP-detectors show a luminance dependency which renders the evaluation of the measurement result more difficult, and, additionally, FiP-measurements in many cases are dependent on a target spot size.

Problem Addressed by the Invention

It is therefore an object of the present invention to provide devices and methods facing the above-mentioned technical challenges of known devices and methods. Specifically, it is an object of the present invention to provide devices and methods which reliably may determine a position of an object in space, preferably with a low technical effort and with low requirements in terms of technical resources and cost.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention, a detector for determining a position of at least one object is disclosed. As used herein, the term "position" refers to at least one item of information regarding a location and/or orientation of the object and/or at least one part of the object in space. Thus, the at least one item of information may imply at least one distance between at least one point of the object and the at least one detector. As will be outlined in further detail below, the distance may be a longitudinal coordinate or may contribute to determining a longitudinal coordinate of the point of the object. Additionally or alternatively, one or more other items of information regarding the location and/or orientation of the object and/or at least one part of the object may be determined. As an example, additionally, at least one transversal coordinate of the object and/or at least one part of the object may be determined. Thus, the position of the object may imply at least one longitudinal coordinate of the object and/or at least one part of the object. Additionally or alternatively, the position of the object may imply at least one transversal coordinate of the object and/or at least one part of the object. Additionally or alternatively, the position of the object may imply at least one orientation information of the object, indicating an orientation of the object in space.

The detector comprises:
at least one sensor element having a matrix of optical sensors, the optical sensors each having a light-sensitive area, wherein each optical sensor is configured to generate at least one sensor signal in response to an illumination of the light-sensitive area by at least one light beam propagating from the object to the detector;
at least one evaluation device configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices.

As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

As further used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the object, such that a light beam propagating from the object to the detector may generate a light spot on the common plane. As will further be outlined in detail below, each optical sensor, preferably, may be embodied such that precisely one light-sensitive area is present in the respective optical sensor, such as by providing precisely one light-sensitive area which may be illuminated, in response to which illumination precisely one uniform sensor signal is created for the whole optical sensor. Thus, preferably, each optical sensor is a single area optical sensor rather than a pixelated optical sensor like e.g. a sensor matrix. Other embodiments, however, are feasible. The use of the single area optical sensors, however, renders the setup of the detector specifically simple and efficient. Thus, as an example, commercially available photosensors, such as commercially available silicon photodiodes, each having precisely one sensitive area, may be used in the setup, one with a small light-sensitive area and one with a larger light-sensitive area, as will be explained in further detail below.

As further used herein, a "sensor signal" generally refers to a signal generated by an optical sensor in response to the illumination by the light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like. The sensor signal may comprise at least one information of at least one beam profile of the light beam. The beam profile may be selected from the group consisting of a trapezoid beam profile; a triangle beam profile; a conical beam profile and a linear combination of Gaussian beam profiles.

The light-sensitive areas specifically may be oriented towards the object. As used herein, the term "is oriented towards the object" generally refers to the situation that the respective surfaces of the light-sensitive areas are fully or partially visible from the object. Specifically, at least one interconnecting line between at least one point of the object and at least one point of the respective light-sensitive area may form an angle with a surface element of the light-sensitive area which is different from 0°, such as an angle in the range of 20° to 90°, preferably 80 to 90° such as 90°. Thus, when the object is located on the optical axis or close to the optical axis, the light beam propagating from the object towards the detector may be essentially parallel to the optical axis. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less.

The present invention may implement a general idea for determining the at least one longitudinal coordinate of the object, which might be characterized as follows. Thus, as explained in more detail in one or more of the above-mentioned prior art documents, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the detector. Without wishing to be bound by this theory, the light spot, may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the detector. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the object may be generated. The comparing of the center signal and the sum signal, as an example, may be done by forming a combined signal Q out of the center signal and the sum signal and by using a predetermined or determinable relationship between the longitudinal coordinate and the combined signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the object. By using a matrix of optical sensors, the detector according to the present invention may adapt to these changes in conditions and, thus, may determine the center of the light spot simply by comparing the sensor signals. Consequently, the detector according to the present invention may, by itself, choose the center signal and determine the sum signal and, from these two signals, derive a combined signal which contains information on the longitudinal coordinate of the object. By evaluating the combined signal, the longitudinal coordinate of the object may, thus, be determined. The use of the matrix of optical sensors, thus, provides a significant flexibility in terms of the position of the object, specifically in terms of a transversal position of the object.

The transversal position of the light spot on the matrix of optical sensors, such as the transversal position of the at least one optical sensor generating the sensor signal, may even be used as an additional item of information, from which at least one item of information on a transversal position of the object may be derived, as e.g. disclosed in WO 2014/198629 A1. Additionally or alternatively, as will be outlined in further detail below, the detector according to the present invention may contain at least one additional transversal detector for, in addition to the at least one longitudinal coordinate, detecting at least one transversal coordinate of the object.

Consequently, in accordance with the present invention, the term "center signal" generally refers to the at least one sensor signal of the at least one optical sensor having the highest sensor signal out of the plurality of sensor signals generated by the optical sensors of the entire matrix or of a region of interest within the matrix, wherein the region of interest may be predetermined or determinable within an image generated by the optical sensors of the matrix. As used herein, the term "highest sensor signal" refers to one or both of a local maximum or a maximum in a region of interest. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

Similarly, the term "sum signal" generally refers to a signal derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating of signals of the entire matrix, of the region of interest within the matrix. For example, the beam profile may be a trapezoid beam profile and the evaluation device may be adapted to determine an integral of the entire trapezoid. Further, when trapezoid beam profiles may be assumed, the determination of sum and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of the center signal or sum signal from at least one slice or cut of the light spot. Slices or cuts may be realized for example by using one or more specific rows and/or columns. For improved accuracy, several slices or cuts through the light spot may be used and averaged. In case of an elliptical spot profile, averaging over several slices or cuts may result in an improved distance information.

Similarly, the term "combined signal", as used herein, generally refers to a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The light beam propagating from the object to the detector specifically may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the light beam propagating from the object to the detector specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination of an article, an area or object by a light beam.

The light beam may propagate from the object towards the detector. As will be outlined in further detail below, the light beam may originate from the object, such as by the object and/or at least one illumination source integrated or attached to the object emitting the light beam, or may originate from a different illumination source, such as from an illumination source directly or indirectly illuminating the object, wherein the light beam is reflected or scattered by the object and, thereby, is at least partially directed towards the detector. The illumination source, as an example, may be or may comprise one or more of an external illumination source, and illumination source integrated into the detector or an illumination source integrated into a beacon device being one or more of attached to the object, integrated into the object or held by the object.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. As used herein, the term "beam profile" generally refers to a transverse intensity profile of the light beam. In particular, the term "beam profile" relates to a spatial distribution, in particular in at least one plane perpendicular to the propagation of the light beam, of an intensity of the light beam. The light beam specifically may be a Gaussian light beam or a linear combination of Gaussian light beams, as will be outlined in further detail below. Other embodiments are feasible, however. The detector may comprise at least one transfer device which may be configured for one or more of adjusting, defining and determining the beam profile, in particular a shape of the beam profile.

The optical sensors of the sensor element may be sensitive in one or more of the ultraviolet, the visible or the infrared spectral range. The optical sensors, specifically, may be sensitive in the infrared spectral range, specifically in the range of 780 nm to 3.0 micrometers, and/or in the visible spectral range, specifically, in the range of 380 nm to 780 nm. Specifically, the optical sensors may be sensitive in the part of the near infrared region where silicon photodiodes are applicable specifically in the range of 700 nm to 1000 nm.

Specifically, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. As will be outlined in further detail below, the photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

Specifically, as will be outlined in further detail below, the evaluation device may be configured to determine the at least one longitudinal coordinate z of the object by using at least one known, determinable or predetermined relationship between the combined signal and/or any secondary signal derived thereof and the longitudinal coordinate. The combined signal, specifically, as will be outlined in further detail below, may be a quotient signal.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

As outlined above, raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the detector, such as the evaluation device, may be configured for transforming the sensor signals of the optical sensor, thereby generating secondary optical sensor signals, wherein the evaluation device is configured for performing steps a)-d) by using the secondary optical sensor signals. The transformation of the sensor signals specifically may comprise at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or maybe determined automatically, such as by recognizing an object within an image generated by the optical sensors. As an example, a vehicle, a person or another type of predetermined object may be determined by automatic image recognition within an image, i.e. within the totality of sensor signals generated by the optical sensors, and the region of interest may be chosen such that the object is located within the region of interest. In this case, the evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented into the detector. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more combined signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa; forming a quotient of a first linear combination of the center signal and the sum signal and a second linear combination of the center signal and the sum signal. Other options, however, exist. The evaluation device may be configured for forming the one or more quotient signals. The evaluation device may further be configured for determining the at least one longitudinal coordinate by evaluating the at least one combined signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the object and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the detector decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the quotient Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the detector, and the detector itself, i.e. dependent on the longitudinal coordinate of the object, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

The evaluation device may be configured for deriving the combined signal Q by one or more of dividing the sum signal and the center signal, dividing multiples of the sum signal and the center signal, dividing linear combinations of the sum signal and the center signal. For example, the evaluation device may be configured for deriving the combined signal Q by $$Q(z_O) = \frac{\iint_{A_1} E(x, y; z_O) dx dy}{\iint_{A_2} E(x, y; z_O) dx dy}$$

wherein x and y are transversal coordinates, A1 and A2 are areas of at least one beam profile at the position of the sensor element, and $E(x,y,z_o)$ denotes the beam profile given at the object distance $z_o$. Area A1 and area A2 may differ. In particular, A1 and A2 are not congruent. Thus, A1 and A2 may differ in one or more of the shape or content. The center signal may be a sensor signal comprising essentially center information of the beam profile. The sum signal may be a signal comprising essentially edge information of the beam profile. The beam profile may be a cross section of the light beam. The beam profile may be selected from the group consisting of a trapezoid beam profile; a triangle beam profile; a conical beam profile and a linear combination of Gaussian beam profiles.

Each of the center signal and the sum signal may comprise at least one information of at least one area of the beam profile of the light beam. As used herein, the term "area of the beam profile" generally refers to an arbitrary region of the beam profile at the position of the sensor element used for determining the combined signal Q. The light-sensitive regions may be arranged such that the sum signal signal comprises information of a first area of the beam profile and the center signal comprises information of a second area of the beam profile. The first area of the beam profile and second area of the beam profile may be one or both of adjacent or overlapping regions. The first area of the beam profile and the second area of the beam profile may be not congruent in area.

The evaluation device may be configured to determine and/or to select the first area of the beam profile and the second area of the beam profile. The first area of the beam profile may comprise essentially edge information of the beam profile and the second area of the beam profile may comprise essentially center information of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, the center signal may be a signal corresponding to a rectangular stripe comprising the center of the light spot. The evaluation device may be adapted to form a quotient of a first linear combination of the center signal and the sum signal and a second linear combination of the center signal and the sum signal. In particular, in case of a two-dimensional beam profile, the beam profile may be divided in a left part and a right part, wherein the first area may comprise essentially areas of the left part of the beam profile and the second area may comprise essentially areas of the right part of the beam profile. The first and the second area, as an example, may be adjacent, with a minimum separation from one another. However, the separation between adjacent areas may also be varied such as enlarged to improve the dynamic range of the quotient signal. As an example, the separation between two adjacent areas may be increased by not evaluating the area between the first and the second area. This may reduce the light on one of the areas relative and/or absolute as compared to the adjacent area which will may increase a quotient of the signal of the two areas. Further, one or both of the areas may consist of separated subareas which may be adjacent to each other and/or which may be separated by areas that are not evaluated and/or which may be evaluated as part of a different quotient. Further, the first and the second area may consist of a linear combination of subareas, whereas the signal contributed by each subarea may be weighted differently when forming the center signal and/or the sum signal. This may further be beneficial for increasing the dynamic range of the quotient system.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by one or more line integrals along the slice or cut. For improved accuracy, several slices or cuts through the light spot may be used and averaged. In case of an elliptical spot profile, averaging over several slices or cuts may result in an improved distance information.

The evaluation device may be configured to derive the combined signal Q by one or more of dividing the edge information and the center information, dividing multiples of the edge information and the center information, dividing linear combinations of the edge information and the center information. Thus, essentially, photon ratios may be used as the physical basis of the method.

The detector may be adapted to determine depth information, in particular absolute depth information, from a radiance ratio of at least two asymmetric regions of a light beam profile on the at least two optical sensors. For example, the detector may comprise a plurality of optical sensors arranged in a matrix. The detector may be adapted to determine depth information from a radiance ratio of at least two asymmetric regions within an enclosed, in particular, a defocused beam profile captured by a single matrix of optical sensors such as a CMOS detector. In particular, the detector may be adapted to determine the depth information using the radiance ratio. This principle is called Distance by Photon Ratio (DPR).

The DPR principle can be applied, for example, to many sub-regions within a segmented image profile, such as a segmented image of at least one feature generated by the at least one light beam on the matrix of optical sensors, which is demonstrated hereafter. The quotient $Q_A(z)$ in the two-dimensional case can be written as $$Q_A(z) = \frac{\int\int_{-r_{out}}^{r_{out}} P(x, y, z) dx dy}{\int\int_{-r_{in}}^{r_{in}} P(x, y, z) dx dy},$$

where $P(x,y,z)$ is a two-dimensional beam profile and $r_{in}$ and $r_{out}$ are inner and outer circle radii, respectively. For line-segmented quotients $Q_y(z)$ along the y-dimension, this can be rewritten as $$Q_y(z) = \frac{\int_{-r_{out}}^{r_{out}} P(x, z) dx}{\int_{-r_{in}}^{r_{in}} P(x, z) dx}.$$

Without wishing to be bound by this theory, the overall defocused beam profile $P(x,z)$ can be regarded as a superposition of defocused image point profiles $p(x,z)$ along the image width $b(x,z)$. This relationship can be modelled as a convolution given by $$P(x,z)=b(x,z)*p(x,z),$$

wherein $p(x,z)$ represents the Point-Spread-Function (PSF) of a lens in defocus, which in the field of paraxial optics is also known as Circle of Confusion (CoC). By inserting $P(x,z)$ into $Q_y(z)$ the above described quotient $Q_y(z)$ can be rewritten as $$Q_y(z) = \frac{\int_{-r_{out}}^{r_{out}} b(x, z) * p(x, z) dx}{\int_{-r_{in}}^{r_{in}} b(x, z) * p(x, z) dx} = \frac{\int_{-r_{out}}^{r_{out}} b(x, z) dx \cdot \int_{-r_{out}}^{r_{out}} p(x, z) dx}{\int_{-r_{in}}^{r_{in}} b(x, z) dx \cdot \int_{-r_{in}}^{r_{in}} p(x, z) dx}.$$

Furthermore, with the matrix of optical sensors a defocused beam profile may be subdivided into cross-sections along lines of a certain angle θ and with a distance ω from the origin of ordinates. Accordingly, the parameterization of a single line may be given by $$\omega = x\cos(\theta) + y\sin(\theta).$$

The integration of the intensity along parallel lines can be mathematically described by an integral projection $\mathfrak{R}\{\cdot\}$ of the well-known Radon transform which reads $$\mathfrak{R}_{(\omega,\theta)}\{f(x,y)\} = \iint_{-\infty}^{\infty} f(x,y)\delta(x\cos(\theta)+y\sin(\theta)-\omega) dx\, dy,$$

where δ denotes the Dirac delta function and f(x,y) is the intensity of an enclosed defocused beam profile. The photon ratio R for a given angle θ and projection width ω is given by $$R = \frac{\mathfrak{R}_{(\omega,\theta)}\{f'(x, y)\}}{\mathfrak{R}_{(\omega,\theta)}\{f(x, y)\}},$$

with f'(x,y) as the inner region. The variation of θ may yield different ratios R for skewed object surfaces at a certain distance. It is sufficient to let θ vary in the following interval $\{\theta \in \mathbb{R}_+, \theta < \pi\}$.

In one embodiment, the light beam propagating from the object to the detector may illuminate the sensor element with at least one pattern comprising at least one feature point. As used herein, the term "feature point" refers to at least one at least partially extended feature of the pattern. The feature point may be selected from the group consisting of: at least one point, at least one line, at least one edge. The pattern may be generated by the object, for example, in response to an illumination by the at least one light source with an illumination pattern comprising the at least one pattern. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

For example, the light beam propagating from the object to the detector may illuminate the optical sensors with at least one line pattern. The line pattern may be generated by the object, for example in response to an illumination by the at least one illumination source with an illumination pattern comprising the at least one line pattern. A1 may correspond to an area with a full line width of the line pattern on the optical sensors, in particular on the light sensitive area of the optical sensors. The line pattern on the optical sensors may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensors. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

For example, the light beam propagating from the object to the detector may illuminate the sensor element with at least one point pattern. The point pattern may be generated by the object, for example in response to an illumination by the at least one light source with an illumination pattern comprising the at least one point pattern. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 of the full radius, preferably from 0.4 to 0.6 of the full radius.

The light beam propagating from the object to the detector may illuminate the sensor element with a reflection pattern comprising both point patterns and line patterns. Other embodiments in addition or alternatively to line pattern and point pattern are feasible.

Thus, generally, the evaluation device may be configured for determining the longitudinal coordinate by evaluating the combined signal such as the combined signal Q. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of steps c) and d) being separate and independent steps and the option of steps c) and d) being fully or partially combined, shall be comprised by the present invention.

The evaluation device may be configured for using at least one predetermined relationship between the combined signal and the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The combined signal Q may be determined by using various means. As an example, a software means for deriving the combined signal, a hardware means for deriving the combined signal, or both, may be used and may be implemented in the evaluation device. Thus, the evaluation device, as an example, may comprise at least one divider, wherein the divider is configured for deriving the combined signal. The divider may fully or partially be embodied as one or both of a software divider or a hardware divider. The divider may fully or partially be integrated into the sensor element answers or may fully or partially be embodied independent from the sensor element.

As outlined above, the optical sensors specifically may be or may comprise photodetectors, preferably inorganic photodetectors, more preferably inorganic semiconductor photodetectors, most preferably silicon photodetectors. Specifically, the optical sensors may be sensitive in the infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the infrared spectral range, preferably in the range of 780 nm to 3.0 micrometers. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available from Hamamatsu Photonics Deutschland GmbH, D-82211 Herrsching am Ammersee, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors of the detector may form a sensor array or may be part of a sensor array, such as the above-mentioned matrix. Thus, as an example, the detector may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

As further outlined above, the matrix specifically may be a rectangular matrix having at least one row, preferably a plurality of rows, and a plurality of columns. As an example, the rows and columns may be oriented essentially perpendicular, wherein, with respect to the term "essentially perpendicular", reference may be made to the definition given above. Thus, as an example, tolerances of less than 20°, specifically less than 10° or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multimega pixel range. Other embodiments, however, are feasible. Thus, as outlined above, in setups in which an axial rotational symmetry is to be expected, circular arrangements or concentric arrangements of the optical sensors of the matrix, which may also be referred to as pixels, may be preferred.

As further outlined above, preferably, the sensor element may be oriented essentially perpendicular to an optical axis of the detector. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

The matrix may comprise two or four separate light sensitive areas and/or may be sub-divided into two or more segments, in particular two or four active areas. The light sensitive areas and/or segments may be separated by a dividing line. The dividing line, for example, of two Si-diodes, can be arranged parallel to the baseline of the detector, in particular parallel to a spot movement on the optical sensors. However, other arrangements are feasible. For example, the quadrant diode may comprise at least two dividing lines. The at least two dividing lines may be arranged orthogonal to each other. The orthogonal arrangement of the dividing lines allows adjusting of the combined signal for near field and far field applications independently from each other. In addition to determining the combined signal of sum signal and center signal, the evaluation device may be adapted to determine a second quotient using other signals of the matrix. The two quotients can be formed such that two distinct distance ranges are covered. The two quotient signals for the near field and far field may have an overlap region in which both quotient signals allow obtaining reasonable determination of the longitudinal distance z. For example, the quotient signal may be determined by dividing the sensor signals of two top quadrants, also called top segment, by the sensor signals of two bottom quadrants, also called bottom segment. Using the quotient signal of sensor signals determined by two sensor areas which have a dividing line parallel to the baseline of the detector may allow determining of the quotient without any distance dependent movement of the light spot. In particular, as an example, if the dividing line between the top and bottom segment is parallel to the baseline, the quotient signal determined from top segment divided by bottom segment may be used in the near field, wherein the light spot may illuminate only one of a left or right segment of the quadrant diode. In this case determining the quotient signal by dividing sensor signals of the left and right segments may not be possible. However, determining the quotient by dividing the sensor signals of top and bottom segments may provide a reasonable distance measurement. The quotient signal determined by dividing sensor signals of the left and right segments may be used for far field measurement, wherein the light spot illuminates both left and right segments. Furthermore, the evaluation device may be adapted to determine the quotient signal by dividing sensor signals of opposing segments or neighboring segments. The evaluation device may be adapted to combine the acquired sensor signals of the quadrants such that distance measurement is possible over a wide range with a large resolution.

In view of the technical challenges involved in the prior art documents discussed above, specifically in view of the technical effort which is required for generating the FiP effect, it has to be noted that the present invention specifically may be realized by using non-FiP optical sensors. In fact, since optical sensors having the FiP characteristic typically exhibit a strong peak in the respective sensor signals at a focal point, the range of measurement of a detector according to the present invention using FiP sensors as optical sensors may be limited to a range in between the positions and which the optical sensors are in focus of the light beam. When using linear optical sensors, however, i.e. optical sensors not exhibiting the FiP effect, this problem, with the setup of the present invention, generally may be avoided. Consequently, the optical sensors each may have, at least within a range of measurement, a linear signal characteristic such that the respective sensor signals are dependent on the total power of illumination of the respective optical sensor.

The detector may further comprise an illumination source for illuminating the object. As an example, the illumination source may be configured for generating an illuminating light beam for illuminating the object. The detector may be configured such that the illuminating light beam propagates from the detector towards the object along an optical axis of the detector. For this purpose, the detector may comprise at least one reflective element, preferably at least one prism, for deflecting the illuminating light beam onto the optical axis.

As outlined above, the illumination source, specifically, may be configured for emitting light in the infrared spectral range. It shall be noted, however, that other spectral ranges are feasible, additionally or alternatively. Further, the illumination source, as outlined above, specifically may be configured for emitting modulated or non-modulated light. In case a plurality of illumination sources is used, the different illumination sources may have different modulation frequencies which, as outlined in further detail below, later on may be used for distinguishing the light beams. The illumination source may be adapted to generate and/or to project a cloud of points, for example the illumination source may comprise one or more of at least one digital light processing (DLP) projector, at least one LCoS projector, at least one spatial light modulator; at least one diffractive optical element; at least one array of light emitting diodes; at least one array of laser light sources.

The detector may comprise the at least one illumination source. The illumination source may be adapted to illuminate the object with at least one illumination light beam. The illumination light beam may be fully or partially reflected by the object and may travel back towards the detector. The illumination source may be arranged such that a direction of propagation of the illumination light beam is essentially parallel to the optical axis. As used herein, the term "essentially parallel to the optical axis" refers to the condition of a parallel orientation, with a tolerance of e.g. ±20° or less, preferably a tolerance of ±10° or less, more preferably a tolerance of ±5° or less. The illumination source may be arranged such that a line running in the direction of propagation of the illumination light beam and the optical axis do not intersect in space. In particular, the illumination may be on-axis. In order to provide such an on-axis illumination, as an example, one or more reflective elements may be used, such as one or more prisms and/or mirrors, such as dichroitic mirrors, such as movable mirrors or movable prisms. The reflected light beam may be essentially parallel to the optical axis. Thus, according to the present invention, the object distance is not determined from an angle of the light beam, i.e. a position of the light spot on a sensor, as done in triangulation methods. Instead, the object distance may be determined using light beams essential parallel to the optical axis. Determination of the object distance by a non-triangulation method but by combining the at least two sensor signals, allows arranging the illumination source such that the direction of propagation of the illumination light beam is essentially parallel to the optical axis.

The light beam may be a monochromatic light beam. The light beam may comprise a narrow band of wavelengths, preferably the light beam may comprise a single wavelength. The at least one light source may be adapted to generate at least one monochromatic light beam and/or the detector may comprise at least one filter element adapted to filter a narrow band of wavelength, such as a monochromator.

The illumination source may be adapted to generate at least one illumination pattern for illuminating the object. Additionally or alternatively, the illumination pattern may be generated by at least one ambient light source. The detector may be configured such that the illumination pattern propagates from the detector, in particular from at least one opening of the housing, towards the object along and/or parallel to an optical axis of the detector. For this purpose, the detector may comprise at least one reflective element, preferably at least one prism, for deflecting the illumination pattern such that it propagates along or parallel to the optical axis. Specifically, the illumination source may comprise at least one laser and/or laser source. Various types of lasers may be employed, such as semiconductor lasers. Additionally or alternatively, non-laser light sources may be used, such as LEDs and/or light bulbs. As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern which illuminates the object. The illumination pattern may be generated by ambient light, such as by at least one ambient light source, or by the at least one illumination source. The illumination pattern may comprise at least one pattern selected from the group consisting of: at least one point pattern, in particular a pseudo-random point pattern, a random point pattern or a quasi random pattern; at least one Sobol pattern; at least one quasiperiodic pattern; at least one pattern comprising at least one pre-known feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines; at least one fringe pattern. For example, the illumination source may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise as much as possible features per area such that a hexagonal pattern may be preferred. A distance between two features of the illumination pattern and/or an area of the at least one illumination feature may depend on the circle of confusion in the image.

The illumination source may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination source may comprise at least one light source adapted to generate the illumination pattern directly. For example, the illumination source may comprise at least one laser source. For example, the illumination source may comprise at least one line laser. The line laser may be adapted to send a laser line to the object, for example a horizontal or vertical laser line. The illumination source may comprise a plurality of line lasers. For example, the illumination source may comprise at least two line lasers which may be arranged such that the illumination pattern comprises at least two parallel or crossing lines. The illumination source may comprise the at least one light projector adapted to generate a cloud of points such that the illumination pattern may comprise a plurality of point pattern. The illumination source may comprise at least one mask adapted to generate the illumination pattern from at least one light beam generated by the illumination source. The illumination source may be one of attached to or integrated into a mobile device such as a smartphone. The illumination source may be used for further functions that may be used in determining an image such as for an autofocus function. The illumination source may be attached to a mobile device such as by using a connector such as a USB- or phone-connector such as the headphone jack.

The illumination source may be adapted to generate pulsed illumination. The illumination source may be adapted to generate at least one light pulse. As used herein, the term "light pulse" or "pulsed illumination" refers to a light beam limited in time. The light pulse may have a predefined length or time duration, for example in the nanoseconds range. For example, the illumination source may be adapted to generate pulses with a pulse length of less than a nanosecond, such as a tenth of a nanosecond, up to a tenth of a second. The illumination source may be adapted to periodically generate the light pulse. For example, the illumination source may be adapted to generate the light pulse with a frequency of 10 Hz to 10 GHz.

The illumination source may be adapted to generate a pulsed light beam. For example, the illumination source may be adapted to generate a continuous illumination light beam and the detector may comprise at least one interruption device adapted to interrupt the illumination, in particular periodically. The interruption device may comprise at least one shutter and/or a beam chopper or some other type of mechanical or electronical periodic beam interrupting device, for example comprising at least one interrupter blade or interrupter wheel, which preferably rotates at constant speed and which can thus periodically interrupt the illumination. By way of example, the at least one interruption device can also be wholly or partly integrated into the illumination source. Various possibilities are conceivable.

Preferably, the illumination source may be a movable and/or mobile illumination source. For example, the illumination source may be moved during the measurement such as to illuminate the object from different positions and/or angles. However, embodiments are feasible in which the illumination source may be positioned in at least one fixed position, for example during a complete measurement time. The evaluation device may be adapted to illumination sources with unclear position such as due to high manufacturing tolerances and/or user interaction and/or user assembly or the like.

The illumination source may illuminate the object with a convergent and/or divergent and/or collimated light beam.

The illumination source and the sensor element may be arranged in a common plane or in different planes. The illumination source and the optical sensors may have different spatial orientation. In particular, the illumination source and the optical sensors may be arranged in a twisted arrangement.

The illumination source and the optical axis may be separated by a small baseline. As used herein, the term "baseline", also denoted as basis line, refers to a distance, for example in a xy-plane, between the optical axis and the illumination source, in particular a distance between the optical axis and a z-component of the illumination light beam. The illumination source may be spaced apart from the optical axis by a minimum distance. The minimum distance from the optical axis may be defined by further detector elements such as size and position of the optical sensors and transfer device. The baseline may be less than 0.1 m, preferably less than 0.05 m, more preferably less than 0.025 m. For example, the baseline may be 21 mm. For example, the detector may be a compact device without further optical elements, wherein the illumination source may be placed as close as possible to an edge of the transfer device. Thus, the baseline may be close to half a diameter of the transfer device, in particular the lens diameter and housings of lens and light source. For example, the detector may be an even more compact device, wherein a mirror, in particular a small mirror, may be positioned in front of the transfer device, in particular in a center, for example a geometrical center, or close to the center of the transfer device, in order to couple the illumination beam into the beam path. Thus, the baseline may be less than half the diameter of the transfer device. The illumination source may be arranged such that the baseline is as small as possible. By arranging the illumination source such that the direction of propagation of the illumination light beam is essentially parallel to the optical axis and that the illumination source and the optical axis are separated by the small baseline, very compact devices are possible. For example, a distance from the center of the transfer device to the illumination source, in particular along a connecting line from the center of the transfer device to the illumination source, may be preferably less than 2.5 times a distance from the center of the transfer device to an edge if the transfer device, more preferably less than 1.5 times the distance center to edge of the transfer device, and most preferably less than 1 times the distance center to edge of the transfer device. The transfer device may have an arbitrary shape, in particular a non-circular shapes are possible. At small distances an aperture of the illumination source may be small and the baseline may be small. At large distances an aperture of the illumination source may be large and the baseline may be small. This is contrarily as in triangulation methods, wherein at large distances a large baseline is necessary. Further, triangulation based systems have a minimum detection range significantly greater than zero, for example such as 20 cm from the detector system, due to necessary spatial extent of the baseline. Such a large baseline may result in that the illuminated light scattered from the object may not reach the light sensitive area of the optical sensor behind the transfer device. In addition, in triangulation based systems, using a small baseline would reduce the minimum detection range, however, at the same time would reduce a maximum detection range. Further, triangulation based systems require a plurality of light sensitive areas and sensor signals, for example sensor signals of at least one detector row. According to the invention, determination of the longitudinal coordinate z is possible with a reduced number of sensor signals, in particular with less than 20, preferably less than 10 and more preferably less than 5 sensor signals.

The detector may further comprise at least one transfer device, the transfer device being adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

The optical sensor may be positioned off focus. As used herein, the term "focus" generally refers to one or both of a minimum extent of a circle of confusion of the light beam, in particular of at least one light beam emitted from one point of the object, caused by the transfer device or a focal length of the transfer device. As used herein, the term "circle of confusion" refers to a light spot caused by a cone of light rays of the light beam focused by the transfer device. The circle of confusion may depend on a focal length f of the transfer device, a longitudinal distance from the object to the transfer device, a diameter of an exit pupil of the transfer device, a longitudinal distance from the transfer device to the light sensitive area, a distance from the transfer device to an image of the object. For example, for Gaussian beams, a diameter of the circle of confusion may be a width of the Gaussian beam. In particular, for a point like object situated or placed at infinite distance from the detector the transfer device may be adapted to focus the light beam from the object into a focus point at the focal length of the transfer device. For non-point like objects situated or placed at infinite distance from the detector the transfer device may be adapted to focus the light beam from at least one point of the object into a focus plane at the focal length of the transfer device. For point like objects not situated or placed at infinite distance from the detector, the circle of confusion may have a minimum extent at least at one longitudinal coordinate. For non-point like objects not situated or placed at infinite distance from the detector, the circle of confusion of the light beam from at least one point of the object may have a minimum extent at least at one longitudinal coordinate. As used herein, the term "positioned off focus" generally refers to a position other than the minimum extent of a circle of confusion of the light beam caused by the transfer device or a focal length of the transfer device. In particular, the focal point or minimum extent of the circle of confusion may be at a longitudinal coordinate $l_{focus}$, whereas the position of the optical sensor may have a longitudinal coordinate $l_{sensor}$ different from $l_{focus}$. For example, the longitudinal coordinate $l_{sensor}$ may be, in a longitudinal direction, arranged closer to the position of the transfer device than the longitudinal coordinate $l_{focus}$ or may be arranged further away from the position of the transfer device than the longitudinal coordinate $l_{focus}$. Thus, the longitudinal coordinate $l_{sensor}$ and the longitudinal coordinate $l_{focus}$ may be situated at different distances from the transfer device. For example, the optical sensors may be spaced apart from the minimum extent of the circle of confusion in longitudinal direction by ±2% focal length, preferably by ±10 focal length, most preferably ±20% focal length. For example, at a focal length of the transfer device may be 20 mm and the longitudinal coordinate $l_{sensor}$ may be 19.5 mm, i.e. the optical sensor may be positioned at 97.5% focal length, such that $l_{sensor}$ is spaced apart from the focus by 2.5% of focal length. The extent of the circle of confusion may be larger than the extent of the optical sensor. For example, the optical sensor may be positioned as such that the circle of confusion extends beyond the optical sensor. The optical sensor may thus only partially evaluate the beam profile of the light beam. The evaluation device may be adapted to extrapolate a beam profile such as due to symmetry considerations or due to comparing the partial beam profile to prerecorded beam profiles or the like. Further, the evaluation device may be adapted to evaluate a partial sum signal and a partial center signal of a partial beam profile and convert it into a sum signal and a center signal of an extrapolated and/or fitted and/or prerecorded beam profile or the like.

The above-mentioned operations, including determining the at least one longitudinal coordinate of the object, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the object. Additionally or alternatively, however, the evaluation device may also fully or partially be embodied by hardware.

As outlined above, by evaluating the center signal and the sum signal, the detector may be enabled to determine the at least one longitudinal coordinate of the object, including the option of determining the longitudinal coordinate of the whole object or of one or more parts thereof. In addition, however, other coordinates of the object, including one or more transversal coordinates and/or rotational coordinates, may be determined by the detector, specifically by the evaluation device. Thus, as an example, one or more transversal sensors may be used for determining at least one transversal coordinate of the object. As outlined above, the position of the at least one optical sensor from which the center signal arises may provide information on the at least one transversal coordinate of the object, wherein, as an example, a simple lens equation may be used for optical transformation and for deriving the transversal coordinate. Additionally or alternatively, one or more additional transversal sensors may be used and may be comprised by the detector. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, the detector according to the present invention may comprise one or more PSDs disclosed in R. A. Street (Ed.): *Technology and Applications of Amorphous Silicon*, Springer-Verlag Heidelberg, 2010, pp. 346-349. Other embodiments are feasible. These devices may generally also be implemented into the detector according to the present invention. As an example, a part of the light beam may be split off within the detector, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the object. Consequently, the detector according to the present invention may either be a one-dimensional detector, such as a simple distance measurement device, or may be embodied as a two-dimensional detector or even as a three-dimensional detector. Further, as outlined above or as outlined in further detail below, by scanning a scenery or an environment in a one-dimensional fashion, a three-dimensional image may also be created. Consequently, the detector according to the present invention specifically may be one of a one-dimensional detector, a two-dimensional detector or a three-dimensional detector. The evaluation device may further be configured to determine at least one transversal coordinate x, y of the object. The evaluation device may be adapted to combine the information of the longitudinal coordinate and the transversal coordinate and to determine a position of the object in space.

The detector may be configured for evaluating a single light beam or a plurality of light beams. In case a plurality of light beams propagates from the object to the detector, means for distinguishing the light beams may be provided. Thus, the light beams may have different spectral properties, and the detector may comprise one or more wavelength selective elements for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

The illumination source may be adapted to generate and/or to project a cloud of points such that a plurality of illuminated regions is generated on the matrix of optical sensor, for example the CMOS detector. Additionally, disturbances may be present on the matrix of optical sensor such as disturbances due to speckles and/or extraneous light and/or multiple reflections. The evaluation device may be adapted to determine at least one region of interest, for example one or more pixels illuminated by the light beam which are used for determination of the longitudinal coordinate of the object. For example, the evaluation device may be adapted to perform a filtering method, for example, a blob-analysis and/or object recognition method.

As outlined above, the detector may comprise the at least one illumination source. A distance perpendicular to an optical axis of the detector between the illumination source and the optical sensors may be small. The distance perpendicular to the optical axis of the detector between the illumination source and the optical sensors may be less than 0.1 m, preferably less than 0.05 m, more preferably less than 0.025 m. The illumination source and the optical axis may be separated by a small baseline. The illumination source may be spaced apart from the optical axis by a minimum distance. The minimum distance from the optical axis may be defined by further detector elements such as size and position of the optical sensors and of the at least one optional transfer device, which will be described in detail below. The baseline may be less than 0.1 m, preferably less than 0.05 m, more preferably less than 0.025 m. For example, the baseline may be 21 mm. Preferably, the illumination source may be arranged right next to the transfer device. For example, the transfer device may be flattened such that the illumination source can be positioned even closer to the optical axis. The illumination source may be arranged behind the transfer device.

At least one of the optical sensors may be adapted to generate at least one sensor signal dependent on a time-of-flight (TOF) the illumination light beam has traveled from the illumination source to the object and the reflection light beam has traveled from the object to the light sensitive area of the optical sensor. The evaluation device may be configured for determining at least one TOF-longitudinal coordinate $z_{TOF}$ of the object by evaluating the TOF sensor signal. The optical sensor adapted to generate the TOF sensor signal may be designed as time-of-flight detector. The time-of-flight detector may be selected from the group consisting of: at least one pulsed time-of-flight detector; at least one phase modulated time-of-flight detector; at least one direct time-of-flight detector; at least one indirect time-of-flight detector. For example, the pulsed time-of-flight detector may be at least one range gated imager and/or at least one direct time-of-flight imager. For example the phase modulated time-of-flight detector may be at least one RF-modulated light source with at least one phase detector. The optical sensor may be adapted to determine a time delay between emission of the illumination light beam by the illumination source and receipt of the reflection light beam.

For example, the optical sensor adapted to generate the TOF sensor signal may be designed as pulsed time-of-flight detector. The detector may comprise the at least one interruption device, such as at least one shutter element, adapted to generate a pulsed light beam. The optical sensor may be adapted to store the TOF sensor signal dependent on the receiving time of the reflection light beam in a plurality of time windows, in particular subsequent time windows. The optical sensor may be adapted to store dependent on receiving time of the reflection light beam the generated TOF sensor signal in at least one first time window and/or in at least one second time window. The first and second time windows may be correlated with the opening and closure of the interruption device. Duration of first and second time windows may be pre-defined. For example, the TOF sensor signal may be stored in the first time window during opening of the interruption device, whereas during closure of the interruption device the TOF sensor signal may be stored in the second time window. Other durations of time windows are thinkable. The first and the second time window may comprise information about background, signal height and signal shift.

For example, the optical sensor adapted to generate the TOF sensor signal may be designed as direct time-of-flight imager. The direct time-of-flight imager may comprise the at least one illumination source adapted to generate at least one single laser pulse. The single laser pulse may be reflected back from the object onto the optical sensor. The optical sensor may comprise at least one photodiode, for example at least one Avalanche Photo Diode (APD), such as at least one Si APD, or such as at least one InGaAs APD, or at least one PIN photo detector array, or at least one Single-Photon Avalanche Photodiode (SPAD), adapted to image the reflection light beam. The direct time-of flight imager may be adapted to image at least one image comprising spatial and temporal data.

For example, the optical sensor adapted to generate the TOF sensor signal may be designed as phase modulated time-of-flight modulator. The phase modulated time-of-flight modulator may be adapted to measure a difference in phase, in particular a phase shift, by determining a correlated signal, for example by multiplying a received signal, i.e. of the reflection light beam, with the emitted signal, i.e. the illumination light beam. A DC component of the correlated signal may comprise an information about the difference in phase. The evaluation device may be adapted to determine the second longitudinal coordinate of the object from the phase difference. For example, the illumination source and the optical sensor adapted to generate the TOF sensor signal may be designed as RF-modulated light source with at least one phase detector. The illumination source may comprise, for example, at least one LED and/or at least one laser. The illumination source may comprise at least one modulation device adapted to modulate the light beam having a pre-defined phase shift. For example, the modulation device may comprise at least one radio frequency module. The radio frequency module may be adapted to modulate the illumination beam with an RF carrier. The optical sensor may be adapted to determine a phase shift of the reflective light beam impinging on the optical sensor.

The optical sensor may be designed as and/or may comprise at least one time-of-flight pixel. Preferably, the detector may comprise at least two optical sensors, wherein each optical sensor is designed as and/or comprises at least one TOF pixel. For example, the detector, in particular the optical sensor may comprise a quadrant diode adapted to generate the TOF sensor signal. For example, the detector, in particular the optical sensor, may comprise at least one pixelated TOF-imager.

The evaluation device may be configured for determining the at least one TOF longitudinal coordinate $z_{TOF}$ of the object by evaluating the TOF sensor signal. As used herein, the term "TOF longitudinal coordinate" refers to a longitudinal coordinate derived from the TOF sensor signal. As described above, the illumination light source may be adapted to periodically generate at least one light pulse. The detector may be adapted to generate the first longitudinal sensor signal for each period. The evaluation device may be adapted to determine in which pulse period the TOF sensor signal was generated using the second longitudinal coordinate. The detector may be adapted to uniquely assign to which period the ToF-signal refers to by using the combined sensor signal. Both, the TOF sensor signal and the combined sensor signal, may be non-monotonous functions of the longitudinal coordinate $z_{real}$. Thus, the longitudinal coordinate may not be uniquely determined from one of the TOF sensor signal or the combined sensor signal alone and a measurement range may not be restricted to a longitudinal range in which the signals are unique functions of $z_{real}$. The term "measurement range" generally refers to a range from the object to the detector in which determination of the longitudinal coordinate is possible. The term "longitudinal range" generally refers to a range from the object to the detector in which unique determination of the longitudinal coordinate is possible. Below and/or above certain distances from the object to the detector a determination of the longitudinal coordinate may not be possible. For example, time-of-flight measurements are not possible below a certain distance from the object to the detector, possibly due to the minimum measurement time of the internal clock. Furthermore, in time-of-flight measurements the sensor signal may be unique within a longitudinal period, but the sensor signal may be the same in case integer multiples of the longitudinal period are added such that the determined longitudinal coordinate may be non-unique. Thus, the same TOF sensor signal will be obtained for a distance $z_1$ and a distance $z_1 + n \cdot z_{1p}$, where n is an integer denoting the longitudinal period and $z_{1p}$ is the longitudinal period of the TOF sensor signal, wherein the distances $z_1$ and $z_1 + n \cdot z_{1p}$ are within the measurement range. As used herein, the term "longitudinal period" refers to partitions of a period, in particular a distance range, in which the longitudinal coordinate can be unambiguously determined from the TOF sensor signal. Non-unique longitudinal coordinates may be denoted as relative longitudinal coordinates and the unique longitudinal coordinates may be denoted as absolute longitudinal coordinates.

If both the TOF sensor signal F1 and the combined sensor signals F2 are available, it may be possible to uniquely determine the longitudinal coordinate and to extend the longitudinal range, as long as each signal pair (F1, F2) corresponds to a unique distance and vice versa. In particular, if a unique signal pair (F1, F2) exists for each longitudinal coordinate and vice versa, the evaluation device may be adapted to determine the unique combined longitudinal coordinate by (1) selecting at least one first selected signal such as the TOF sensor signal and/or the combined sensor signal and determining non-unique first longitudinal coordinates;

(2) selecting a second selected signal such as the combined signal Q and/or the TOF sensor signal, which was not selected in step (1), and determining non-unique second longitudinal coordinates;

(3) determining whether one of the non-unique first longitudinal coordinates and the non-unique second longitudinal coordinates match up to a predetermined tolerance threshold;

(4) setting a combined unique longitudinal coordinate to be a matching longitudinal coordinate.

In step (1) and step (2), signals may be selected in the given order or may be performed in a different order. For example, in step (1) the TOF sensor signal may be selected and in step (2) the combined signal Q may be selected. In another example, in step (1) the combined sensor signal may be selected, and the non-unique first longitudinal sensor signal may be determined therefrom. In step (2), the TOF sensor signal may be selected.

Additionally or alternatively to step (4), the evaluation device may be adapted to output an error signal in case no matching coordinates are found and/or to output an error signal in case more than one matching coordinates are found. Additionally or alternatively, the signal pairs and their corresponding longitudinal coordinates may be stored in a look-up table. Additionally or alternatively, the signal pairs and their corresponding longitudinal coordinates may be approximated or described by an analytical function which is evaluated to find the longitudinal coordinate corresponding to a given signal pair.

The evaluation device may comprise at least two memory elements. As used herein, the term "memory element" refers to a device adapted to store information. The evaluation device may be adapted to receive and to store information provided by the optical sensors, for example the at least one first sensor signal. Such information may comprise raw sensor data and/or processed sensor data. For example, the memory element may be adapted to store information for further evaluation by the evaluation device. The memory element may be a volatile or non-volatile memory element.

As described above, the optical sensor may be designed as and/or may comprise at least one ToF pixel. The detector may comprise at least two switches. Each of the switches may be connected to the optical sensor adapted to generate the first sensor signal, for example by at least one connector. In particular, each of the switches may be connected to the ToF pixel. The switches are adapted to provide the TOF sensor signal to one of the memory elements. In particular, the switches may be adapted to let, dependent on receiving time of the reflection light beam, the generated TOF sensor signal pass through one of the switches. For example, the TOF sensor signal may pass one of the switches during opening of the interruption device, whereas during closure of the interruption device the TOF sensor signal may pass the other switch. Each of the switches may be controlled by a control signal having a pulse length identical to a pulse length of a light pulse generated by the illumination source. The control signal of one of the switches may be delayed. For example, the delay may correspond to the pulse length of the light pulse. The evaluation device may be adapted to sample and/or store depending on the delay a first part, or fraction, of the TOF sensor signal through a first switch in a first memory element and the other, second part, or fraction, of the TOF sensor signal through a second switch in a second memory element. The evaluation device may be adapted to determine the first longitudinal coordinate by evaluating the first part and second part of the TOF sensor signal. The evaluation device may be adapted to determine the first longitudinal coordinate $z_1$ by $$z_1 = \frac{1}{2} \cdot c \cdot t_0 \cdot \frac{S1_2}{S1_1 + S1_2} + z_0;$$

wherein c is the speed of light, $t_0$ is the pulse length of the illumination light beam, $z_0$ is a distance offset often determined by the resolution of the time measurement, and $S1_1$ and $S1_2$ are the first part and second part of the TOF sensor signal, respectively.

The detector may be adapted to determine at least one distance information of the object by using triangulation and/or structured light techniques. In known 3D sensing devices, such as devices using triangulation or structured light techniques, due to correspondence problems regular, constant or periodic pattern are not suitable since each measured point has to be assigned to one reference point of a reference pattern. The at least one light beam propagating from the object to the detector may be adapted to generate at least one reflection pattern on the matrix of optical sensors. The term "reflection pattern" refers to at least one image determined by the optical sensors in response to illumination of the light sensitive areas by the light beam propagating from the object to the detector which was generated in response to illumination by the illumination pattern. The reflection pattern may comprise at least one reflection feature depending on the corresponding illumination feature of the illumination pattern. The detector may be adapted to determine the longitudinal coordinate of an object point for at least one reflection feature of the reflection pattern from the quotient signal. Thus, the detector may be adapted to pre-classify the at least one reflection feature of the reflection pattern. This allows using illumination patterns comprising regular and/or constant and/or periodic pattern such as a triangular pattern, a rectangular pattern, a hexagonal pattern or a pattern comprising further convex tilings. The illumination pattern may comprise as much as possible features per area such that hexagonal patterns may be preferred.

The evaluation device may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue; saturation; and brightness channels; a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors.

The evaluation device may be adapted to determine at least one reference feature in at least one reference pattern corresponding to the at least one reflection feature. The term "reference pattern" refers to an image of comparison at a specific spatial position comprising at least one reference feature. As outlined above, the evaluation device may be adapted to perform an image analysis and to identify features of the reflection pattern. The evaluation device may be adapted to identify at least one reference feature in the reference pattern having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference pattern and the reflection pattern may be images of the object determined at different spatial positions and/or spatial orientations having a fixed distance. The distance may be a relative distance, also denoted as baseline. The evaluation device may be adapted to determine an epipolar line in the reference pattern. The relative position of the reference pattern and reflection pattern may be known. For example, the relative position of the reference pattern and the reflection pattern may be stored within at least one storage unit of the evaluation device. The evaluation device may be adapted to determine a straight line extending from the selected reflection feature to the real world feature from which it originates. Thus, the straight line may comprise possible object features corresponding to the selected reflection feature. The straight line and the baseline span an epipolar plane. As the reference pattern is determined at a different relative constellation from the reflection pattern, the corresponding possible object features may be imaged on a straight line, called epipolar line, in the reference pattern. The epipolar line may be the intersection of the epipolar plane and the reference pattern. Thus, a feature of the reference pattern corresponding to the selected feature of the reflection pattern lies on the epipolar line.

Depending on the distance to the object, the reference feature corresponding to the image position of the reflection feature may be displaced within the reference pattern compared to the image position in the reflection pattern. The reference pattern may comprise at least one displacement region in which the reference feature corresponding to the selected reflection feature may be imaged. The displacement region may comprise only one reference feature. The displacement region may extend along the epipolar line. The evaluation device may be adapted to determine the reference feature along the epipolar line. The evaluation device may be adapted to determine the longitudinal coordinate z for the reflection feature and an error interval $±\varepsilon$ from the quotient signal Q to determine a displacement region along the epipolar line corresponding to $z±\varepsilon$. The evaluation device may be adapted to match the selected reflection feature with at least one reference feature within the displacement region. As used herein, the term "matching" refers to determining and/or evaluating the corresponding reference and reflection features. The evaluation device may be adapted to match the selected feature of the reflection pattern with the reference feature within the displacement region by using at least one evaluation algorithm considering the determined longitudinal coordinate z. The evaluation algorithm may be a linear scaling algorithm. Preferably, the detector may be adapted to pre-classify the selected reflection feature using the quotient signal Q such that an unambiguous assignment to one reference feature is possible. In particular, illumination features of the illumination pattern may be arranged such that corresponding reference features of the reference pattern may have a relative distance to each other as large as possible on the epipolar line. The illumination features of the illumination pattern may be arranged such that only few reference features are positioned on the epipolar line. For example, the illumination pattern may comprise at least one hexagonal pattern. Preferably, the illumination pattern may comprise at least one hexagonal pattern, wherein the pattern is rotated relative to the baseline. Preferably, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other.

The evaluation device may be adapted to determine a displacement of the reference feature and the reflection feature. The evaluation device may be adapted to determine the displacement of the matched reference feature and the selected reflection feature. As used herein, the term "displacement" refers to the difference between an image position in the reference image to an image position in the reflection image. The evaluation device may be adapted to determine a longitudinal information of the matched feature using a predetermined relationship between a longitudinal coordinate and the displacement. As used herein, the term "longitudinal information" refers to information relating to the longitudinal coordinate $z_{triang}$. For example, the longitudinal information may be a distance value. The evaluation device may be adapted to determine the pre-determined relationship by using triangulation methods. In case the position of the selected reflection feature in the reflection pattern and the position of the matched reference feature and/or the relative displacement of the selected reflection feature and the matched reference feature are known, the longitudinal coordinate of the corresponding object feature may be determined by triangulation. Thus, the evaluation device may be adapted to select, for example subsequent and/or column by column, a reflection feature and to determine for each potential position of the reference feature the corresponding distance value using triangulation. The displacement and the corresponding distance value may be stored in at least one storage device of the evaluation device. The evaluation device may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage device may be provided, such as for providing one or more look-up tables for storing the predetermined relationship.

The detector may comprise at least one FiP sensor adapted for generating the so called FiP effect as described in WO 2015/024871 or WO2016/120392. For example, at least one optical sensors of the matrix of optical sensors may be adapted to generate a so called FiP signal. For example, each of the optical sensors of the matrix may be adapted to generate the at least one FiP signal. For example, the matrix of optical sensors may be a pixelated FiP-sensor. Additionally or alternatively, the FiP signal may be determined, such as extracted and/or simulated, from the sensor signals of the matrix and the quotient as outlined above may be determined from the sensor signals. As outlined e.g. in WO 2015/024871 or WO2016/120392, the FiP signal can be used to determine depth information over a wide distance range. The FiP sensor may be adapted to exhibit a positive and/or a negative FiP effect. According to the FiP-effect, the longitudinal sensor signal, given the same total power, may exhibit at least one pronounced maximum for one or a plurality of focusings and/or for one or a plurality of specific sizes of the light spot on the sensor region or within the sensor region. For purposes of comparison, an observation of a maximum of the longitudinal sensor signal in a condition in which the corresponding material is impinged by a light beam with the smallest possible cross-section, such as when the material may be located at or near a focal point as affected by an optical lens, may be denominated as a "positive FiP-effect". The negative FiP effect describes an observation of a minimum of the longitudinal sensor signal under a condition in which the corresponding material is impinged by a light beam with the smallest available beam cross-section, in particular, when the material may be located at or near a focal point as effected by an optical lens. The negative FiP effect may be used to tune small image effects at high distances. Image changes such as position, size, shape, sharpness, etc. may vanish at high distances while the negative FiP effect increases. Furthermore, no luminance dependence may be introduced since both cells are at the same longitudinal position and thus receive identical photon density.

As outlined above, the detector may further comprise one or more additional elements such as one or more additional optical elements. Further, the detector may fully or partially be integrated into at least one housing. The detector specifically may comprise at least one transfer device, the transfer device being adapted to guide the light beam onto the optical sensor. The transfer device may comprise one or more of: at least one lens, preferably at least one focus-tunable lens; at least one beam deflection element, preferably at least one mirror; at least one beam splitting element, preferably at least one of a beam splitting cube or a beam splitting mirror; at least one multi-lens system. Therein, generally, the term "transfer device" may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of, preferably at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

In a further aspect of the present invention, a detector system for determining a position of at least one object is disclosed. The detector system comprises at least one detector according to the present invention, such as according to one or more of the embodiments disclosed above or according to one or more of the embodiments disclosed in further detail below. The detector system further comprises at least one beacon device adapted to direct at least one light beam towards the detector, wherein the beacon device is at least one of attachable to the object, holdable by the object and integratable into the object. Further details regarding the beacon device will be given below, including potential embodiments thereof. Thus, the at least one beacon device may be or may comprise at least one active beacon device, comprising one or more illumination sources such as one or more light sources like lasers, LEDs, light bulbs or the like. As an example, the light emitted by the illumination source may have a wavelength of 300-500 nm. Alternatively, as outlined above, the infrared spectral range may be used, such as in the range of 780 nm to 3.0 µm. The light emitted by the one or more beacon devices may be non-modulated or may be modulated, as outlined above, in order to distinguish two or more light beams. Additionally or alternatively, the at least one beacon device may be adapted to reflect one or more light beams towards the detector, such as by comprising one or more reflective elements. Further, the at least one beacon device may be or may comprise one or more scattering elements adapted for scattering a light beam. Therein, elastic or inelastic scattering may be used. In case the at least one beacon device is adapted to reflect and/or scatter a primary light beam towards the detector, the beacon device may be adapted to leave the spectral properties of the light beam unaffected or, alternatively, may be adapted to change the spectral properties of the light beam, such as by modifying a wavelength of the light beam.

In a further aspect of the present invention, a human-machine interface for exchanging at least one item of information between a user and a machine is disclosed. The human-machine interface comprises at least one detector system according to the embodiments disclosed above and/or according to one or more of the embodiments disclosed in further detail below. Therein, the at least one beacon device is adapted to be at least one of directly or indirectly attached to the user or held by the user. The human-machine interface is designed to determine at least one position of the user by means of the detector system, wherein the human-machine interface is designed to assign to the position at least one item of information.

In a further aspect of the present invention, an entertainment device for carrying out at least one entertainment function is disclosed. The entertainment device comprises at least one human-machine interface according to the embodiment disclosed above and/or according to one or more of the embodiments disclosed in further detail below. The entertainment device is configured to enable at least one item of information to be input by a player by means of the human-machine interface. The entertainment device is further configured to vary the entertainment function in accordance with the information.

In a further aspect of the present invention, a tracking system for tracking a position of at least one movable object is disclosed. The tracking system comprises at least one detector system according to one or more of the embodiments referring to a detector system as disclosed above and/or as disclosed in further detail below. The tracking system further comprises at least one track controller. The track controller is adapted to track a series of positions of the object at specific points in time.

In a further aspect of the present invention, a camera for imaging at least one object is disclosed. The camera comprises at least one detector according to any one of the embodiments referring to a detector as disclosed above or as disclosed in further detail below.

In a further aspect of the present invention, a scanning system for determining a depth profile of a scenery, which may also imply determining at least one position of at least one object, is provided. The scanning system comprises at least one detector according to the present invention, such as at least one detector as disclosed in one or more of the embodiments listed above and/or as disclosed in one or more of the embodiments below. The scanning system further comprises at least one illumination source adapted to scan the scenery with at least one light beam, which may also be referred to as an illumination light beam or scanning light beam. As used herein, the term "scenery" generally refers to a two-dimensional or three-dimensional range which is visible by the detector, such that at least one geometric or spatial property of the two-dimensional or three-dimensional range may be evaluated with the detector. As further used herein, the term "scan" generally refers to a consecutive measurement in different regions. Thus, the scanning specifically may imply at least one first measurement with the illumination light beam being oriented or directed in a first fashion, and at least one second measurement with the illumination light beam being oriented or directed in a second fashion which is different from the first fashion. The scanning may be a continuous scanning or a stepwise scanning. Thus, in a continuous or stepwise fashion, the illumination light beam may be directed into different regions of the scenery, and the detector may be detected to generate at least one item of information, such as at least one longitudinal coordinate, for each region. As an example, for scanning an object, one or more illumination light beams may, continuously or in a stepwise fashion, create light spots on the surface of the object, wherein longitudinal coordinates are generated for the light spots. Alternatively, however, a light pattern may be used for scanning. The scanning may be a point scanning or a line scanning or even a scanning with more complex light patterns. The illumination source of the scanning system may be distinct from the optional illumination source of the detector. Alternatively, however, the illumination source of the scanning system may also be fully or partially identical with or integrated into the at least one optional illumination source of the detector.

Thus, the scanning system may comprise at least one illumination source which is adapted to emit the at least one light beam being configured for the illumination of the at least one dot located at the at least one surface of the at least one object. As used herein, the term "dot" refers to an area, specifically a small area, on a part of the surface of the object which may be selected, for example by a user of the scanning system, to be illuminated by the illumination source.

Preferably, the dot may exhibit a size which may, on one hand, be as small as possible in order to allow the scanning system to determine a value for the distance between the illumination source comprised by the scanning system and the part of the surface of the object on which the dot may be located as exactly as possible and which, on the other hand, may be as large as possible in order to allow the user of the scanning system or the scanning system itself, in particular by an automatic procedure, to detect a presence of the dot on the related part of the surface of the object.

For this purpose, the illumination source may comprise an artificial illumination source, in particular at least one laser source and/or at least one incandescent lamp and/or at least one semiconductor light source, for example, at least one light-emitting diode, in particular an organic and/or inorganic light-emitting diode. As an example, the light emitted by the illumination source may have a wavelength of 300-500 nm. Additionally or alternatively, light in the infrared spectral range may be used, such as in the range of 780 nm to 3.0 µm. On account of their generally defined beam profiles and other properties of handleability, the use of at least one laser source as the illumination source is particularly preferred. Herein, the use of a single laser source may be preferred, in particular in a case in which it may be important to provide a compact scanning system that might be easily storable and transportable by the user. The illumination source may thus, preferably be a constituent part of the detector and may, therefore, in particular be integrated into the detector, such as into the housing of the detector. In a preferred embodiment, particularly the housing of the scanning system may comprise at least one display configured for providing distance-related information to the user, such as in an easy-to-read manner. In a further preferred embodiment, particularly the housing of the scanning system may, in addition, comprise at least one button which may be configured for operating at least one function related to the scanning system, such as for setting one or more operation modes. In a further preferred embodiment, particularly the housing of the scanning system may, in addition, comprise at least one fastening unit which may be configured for fastening the scanning system to a further surface, such as a rubber foot, a base plate or a wall holder, such as a base plate or holder comprising a magnetic material, in particular for increasing the accuracy of the distance measurement and/or the handleability of the scanning system by the user.

Particularly, the illumination source of the scanning system may, thus, emit a single laser beam which may be configured for the illumination of a single dot located at the surface of the object. By using at least one of the detectors according to the present invention at least one item of information about the distance between the at least one dot and the scanning system may, thus, be generated. Hereby, preferably, the distance between the illumination system as comprised by the scanning system and the single dot as generated by the illumination source may be determined, such as by employing the evaluation device as comprised by the at least one detector. However, the scanning system may, further, comprise an additional evaluation system which may, particularly, be adapted for this purpose. Alternatively or in addition, a size of the scanning system, in particular of the housing of the scanning system, may be taken into account and, thus, the distance between a specific point on the housing of the scanning system, such as a front edge or a back edge of the housing, and the single dot may, alternatively, be determined.

Alternatively, the illumination source of the scanning system may emit two or more individual laser beams which may be configured for providing a respective angle, such as a right angle, between the directions of an emission of the beams, whereby two respective dots located at the surface of the same object or at two different surfaces at two separate objects may be illuminated. However, other values for the respective angle between the two individual laser beams may also be feasible. This feature may, in particular, be employed for indirect measuring functions, such as for deriving an indirect distance which may not be directly accessible, such as due to a presence of one or more obstacles between the scanning system and the dot or which may otherwise be hard to reach. By way of example, it may, thus, be feasible to determine a value for a height of an object by measuring two individual distances and deriving the height by using the Pythagoras formula. In particular for being able to keep a predefined level with respect to the object, the scanning system may, further, comprise at least one leveling unit, in particular an integrated bubble vial, which may be used for keeping the predefined level by the user.

As a further alternative, the illumination source of the scanning system may emit a plurality of individual laser beams, such as an array of laser beams which may exhibit a respective pitch, in particular a regular pitch, with respect to each other and which may be arranged in a manner in order to generate an array of dots located on the at least one surface of the at least one object. For this purpose, specially adapted optical elements, such as beam-splitting devices and mirrors, may be provided which may allow a generation of the described array of the laser beams. In particular, the illumination source may be directed to scan an area or a volume by using one or more movable mirrors to redirect the light beam in a periodic or non-periodic fashion.

Thus, the scanning system may provide a static arrangement of the one or more dots placed on the one or more surfaces of the one or more objects. Alternatively, the illumination source of the scanning system, in particular the one or more laser beams, such as the above described array of the laser beams, may be configured for providing one or more light beams which may exhibit a varying intensity over time and/or which may be subject to an alternating direction of emission in a passage of time, in particular by moving one or more mirrors, such as the micro-mirrors comprised within the mentioned array of micro-mirrors. As a result, the illumination source may be configured for scanning a part of the at least one surface of the at least one object as an image by using one or more light beams with alternating features as generated by the at least one illumination source of the scanning device. In particular, the scanning system may, thus, use at least one row scan and/or line scan, such as to scan the one or more surfaces of the one or more objects sequentially or simultaneously. As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step. As non-limiting examples, the scanning system may be used in industrial safety curtain applications. As non-limiting examples, the scanning system may be used to perform sweeping, vacuuming, mopping, or waxing functions, or yard or garden care functions such as mowing or raking. As non-limiting examples, the scanning system may employ an LED illumination source with collimated optics and may be adapted to shift the frequency of the illumination source to a different frequency to obtain more accurate results and/or employ a filter to attenuate certain frequencies while transmitting others. As non-limiting examples, the scanning system and/or the illumination source may be rotated as a whole or rotating only a particular optics package such as a mirror, beam splitter or the like, using a dedicated motor as such that in operation, the scanning system may have a full 360 degree view or even be moved and or rotated out of plane to further increase the scanned area. Further, the illumination source may be actively aimed in a predetermined direction. Further, to allow the rotation of wired electrical systems, slip rings, optical data transmission, or inductive couplings may be employed.

As a non-limiting example, the scanning system may be attached to a tripod and point towards an object or region with a several corners and surfaces. One or more flexibly movable laser sources may be attached to the scanning system. The one or more laser sources may be moved as such that they illuminate points of interest. The position of the illuminated points with respect to the scanning system may be measured when pressing a designated button on the scanning system and the position information is transmitted via a wireless interface to a mobile phone. The position information may be stored in a mobile phone application. The laser sources may be moved to illuminate further points of interest the position of which are measured and transmitted to the mobile phone application. The mobile phone application may transform the set of points into a 3d model by connecting adjacent points with planar surfaces. The 3d model may be stored and processed further. The distances and/or angles between the measured points or surfaces may be displayed directly on a display attached to a scanning system or on the mobile phone to which the position information is transmitted.

As a non-limiting example, a scanning system may comprise two or more flexible movable laser sources to project points and further one movable laser source projecting a line. The line may be used to arrange the two or more laser spots along a line and the display of the scanning device may display the distance between the two or more laser spots that may be arranged along the line, such as at equal distance. In the case of two laser spots, a single laser source may be used whereas the distance of the projected points is modified using one or more beam-splitters or prisms, where a beam-splitter or prism can be moved as such that the projected laser spots move apart or closer together. Further, the scanning system may be adapted to project further patterns such as a right angle, a circle, a square, a triangle, or the like, along which a measurement can be done by projecting laser spots and measuring their position.

As a non-limiting example, the scanning system may be adapted as a line scanning device. In particular, the scanning device may comprise at least one sensor line or row. Triangulation systems require a sufficient baseline such that in the near filed no detection may be possible. Near field detection may be possible if the laser spot is tilted in direction of the transfer device. However, the tilting leads to that the light spot will move out of the field of view which limits detection in far field regions. These near field and far field problems can be overcome by using the detector according to the present invention. In particular, the detector may comprise a CMOS line of optical sensors. The scanning system may be adapted to detect a plurality of light beams propagating from the object to the detector on the CMOS line. The light beams may be generated at different positions on the object or by movement of the illumination source. The scanning system may be adapted to determine at least one longitudinal coordinate for each of the light points by determining the quotient signal Q as described above and in more detail below.

As a non-limiting example, the scanning system may be adapted to support the work with tools, such as wood or metal processing tools, such as a saw, a driller, or the like. Thus, the scanning system may be adapted to measure the distance in two opposite directions and display the two measured distances or the sum of the distances in a display. Further, the scanning system may be adapted to measure the distance to the edge of a surface as such that when the scanning system is placed on the surface, a laser point is moved automatically away from the scanning system along the surface, until the distance measurement shows a sudden change due to a corner or the edge of a surface. This makes it possible to measure the distance of the end of a wood plank while the scanning device is placed on the plank but remote from its end. Further, the scanning system may measure the distance of the end of a plank in one direction and project a line or circle or point in a designated distance in the opposite direction. The scanning system may be adapted to project the line or circle or point in a distance depending on the distance measured in the opposite direction such as depending on a predetermined sum distance. This allows working with a tool such as a saw or driller at the projected position while placing the scanning system in a safe distance from the tool and simultaneously perform a process using the tool in a predetermined distance to the edge of the plank. Further, the scanning system may be adapted to project points or lines or the like in two opposite directions in a predetermined distance. When the sum of the distances is changed, only one of the projected distances changes.

As a non-limiting example, the scanning system may be adapted to be placed onto a surface, such as a surface on which a task is performed, such as cutting, sawing, drilling, or the like, and to project a line onto the surface in a predetermined distance that can be adjusted such as with buttons on the scanning device.

As non-limiting examples, the scanning system may be used in safety laser scanners, e.g. in production environments, and/or in 3D-scanning devices as used for determining the shape of an object, such as in connection to 3D-printing, body scanning, quality control, in construction applications, e.g. as range meters, in logistics applications, e.g. for determining the size or volume of a parcel, in household applications, e.g. in robotic vacuum cleaners or lawn mowers, or in other kinds of applications which may include a scanning step.

The optional transfer device can, as explained above, be designed to feed light propagating from the object to the detector to the optical sensor, preferably successively. As explained above, this feeding can optionally be effected by means of imaging or else by means of non-imaging properties of the transfer device. In particular the transfer device can also be designed to collect the electromagnetic radiation before the latter is fed to the optical sensor. The optional transfer device can also be wholly or partly a constituent part of at least one optional illumination source, for example by the illumination source being designed to provide a light beam having defined optical properties, for example having a defined or precisely known beam profile, for example at least one Gaussian beam, in particular at least one laser beam having a known beam profile.

For potential embodiments of the optional illumination source, reference may be made to WO 2012/110924 A1. Still, other embodiments are feasible. Light emerging from the object can originate in the object itself, but can also optionally have a different origin and propagate from this origin to the object and subsequently toward the transversal and/or longitudinal optical sensor. The latter case can be effected for example by at least one illumination source being used. This illumination source can for example be or comprise an ambient illumination source and/or may be or may comprise an artificial illumination source. By way of example, the detector itself can comprise at least one illumination source, for example at least one laser and/or at least one incandescent lamp and/or at least one semiconductor illumination source, for example, at least one light-emitting diode, in particular an organic and/or inorganic light-emitting diode. On account of their generally defined beam profiles and other properties of handleability, the use of one or a plurality of lasers as illumination source or as part thereof, is particularly preferred. The illumination source itself can be a constituent part of the detector or else be formed independently of the detector. The illumination source can be integrated in particular into the detector, for example a housing of the detector. Alternatively or additionally, at least one illumination source can also be integrated into the at least one beacon device or into one or more of the beacon devices and/or into the object or connected or spatially coupled to the object.

The light emerging from the one or more optional beacon devices can accordingly, alternatively or additionally from the option that said light originates in the respective beacon device itself, emerge from the illumination source and/or be excited by the illumination source. By way of example, the electromagnetic light emerging from the beacon device can be emitted by the beacon device itself and/or be reflected by the beacon device and/or be scattered by the beacon device before it is fed to the detector. In this case, emission and/or scattering of the electromagnetic radiation can be effected without spectral influencing of the electromagnetic radiation or with such influencing. Thus, by way of example, a wavelength shift can also occur during scattering, for example according to Stokes or Raman. Furthermore, emission of light can be excited, for example, by a primary illumination source, for example by the object or a partial region of the object being excited to generate luminescence, in particular phosphorescence and/or fluorescence. Other emission processes are also possible, in principle. If a reflection occurs, then the object can have for example at least one reflective region, in particular at least one reflective surface. Said reflective surface can be a part of the object itself, but can also be for example a reflector which is connected or spatially coupled to the object, for example a reflector plaque connected to the object. If at least one reflector is used, then it can in turn also be regarded as part of the detector which is connected to the object, for example, independently of other constituent parts of the detector.

The beacon devices and/or the at least one optional illumination source generally may emit light in at least one of: the ultraviolet spectral range, preferably in the range of 200 nm to 380 nm; the visible spectral range (380 nm to 780 nm); the infrared spectral range, preferably in the range of 780 nm to 3.0 micrometers. For thermal imaging applications the target may emit light in the far infrared spectral range, preferably in the range of 3.0 micrometers to 20 micrometers. Most preferably, the at least one illumination source is adapted to emit light in the infrared spectral range. Other options, however, are feasible.

The feeding of the light beam to the sensor element can be effected in particular in such a way that a light spot, for example having a round, oval or differently configured cross section, is produced on the optional sensor area of the sensor element. By way of example, the detector can have a visual range, in particular a solid angle range and/or spatial range, within which objects can be detected. Preferably, the optional transfer device is designed in such a way that the light spot, for example in the case of an object arranged within a visual range of the detector, is arranged completely on a sensor region and/or on a sensor area of the optical sensor. By way of example, a sensor area can be chosen to have a corresponding size in order to ensure this condition.

In a further aspect, the present invention discloses an inertial measurement unit for use in an electronic device. The electronic device may be a mobile electronic device. The electronic device may be a camera. The electronic device may be a mobile phone. The inertial measurement unit is adapted to receive data determined by at least one inertial measurement unit comprising at least one detector according to the present invention, such as according to one or more of the embodiments referring to a detector as disclosed above or as disclosed in further detail below. As used herein, the term "data determined by the at least one detector" refers to at least one information on the at least one longitudinal coordinate z. The inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope. As used herein, the term "data determined by the at least one further sensor" refers to at least one information selected from the group consisting of: angle information; speed information; information on turn rate; information on inclination. The inertial measurement unit is adapted to determine by evaluating the data from the detector and the at least one further sensor at least one property of the electronic device selected from the group consisting of: position in space, relative or absolute motion in space, rotation, acceleration, orientation, angle position, inclination, turn rate, speed. The inertial measurement unit may comprise at least one processor. The processor may be adapted to evaluate data recorded by the further sensor. In particular, the processor may be adapted to determine and/or calculate one or more of spatial position, spatial orientation, movement and velocity. The inertial measurement unit may comprise a plurality of further sensors. The inertial measurement unit may be adapted to fuse information determined from at least two of the further sensors. The inertial measurement unit may be adapted to fuse information of at least two further sensors by using at least one Kalman filter. As outlined above, the detector may be adapted to provide an absolute measurement of the longitudinal coordinate z. The processor, e.g. the evaluation device as described above, may be adapted to fuse the information of the at least two further sensors considering the longitudinal coordinate z. The various sensor signals may be used within a Kalman filter or a linear quadratic estimated to take into account that each sensor signal is subject to measurement errors and inaccuracies. Fusion of these sensor signals within a Kalman filter may yield an improved estimate such as for the measurement of the longitudinal coordinate.

In a further aspect, the present invention discloses a method for determining a position of at least one object by using a detector, such as a detector according to the present invention, such as according to one or more of the embodiments referring to a detector as disclosed above or as disclosed in further detail below. Still, other types of detectors may be used.

The method comprises the following method steps, wherein the method steps may be performed in the given order or may be performed in a different order. Further, one or more additional method steps may be present which are not listed. Further, one, more than one or even all of the method steps may be performed repeatedly.

The method steps are as follows:
illuminating at least one sensor element of the detector with at least one light beam propagating from the object to the detector, the detector having a matrix of optical sensors, the optical sensors each having a light-sensitive area, wherein each optical sensor generates at least one sensor signal in response to the illumination;
evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

Specifically, the evaluation of the first and second sensor signal may comprise deriving a combined signal Q by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Further, the determination of the longitudinal coordinate may comprise evaluating the combined signal Q. The evaluation of the combined signal specifically may comprise using at least one predetermined relationship between the combined signal Q and the longitudinal coordinate, in order to determine the longitudinal coordinate.

For details, options and definitions, reference may be made to the detector as discussed above. Thus, specifically, as outlined above, the method may comprise using the detector according to the present invention, such as according to one or more of the embodiments given above or given in further detail below.

In a further aspect of the present invention, use of the detector according to the present invention, such as according to one or more of the embodiments given above or given in further detail below, is proposed, for a purpose of use, selected from the group consisting of: a position measurement in traffic technology; an entertainment application; a security application; a surveillance application; a safety application; a human-machine interface application; a tracking application; a photography application; a logistics application; a machine vision application; a robotics application; a quality control application; a manufacturing application.

The object generally may be a living or non-living object. The detector or the detector system even may comprise the at least one object, the object thereby forming part of the detector system. Preferably, however, the object may move independently from the detector, in at least one spatial dimension. The object generally may be an arbitrary object.

In one embodiment, the object may be a rigid object. Other embodiments are feasible, such as embodiments in which the object is a non-rigid object or an object which may change its shape.

As will be outlined in further detail below, the present invention may specifically be used for tracking positions and/or motions of a person, such as for the purpose of controlling machines, gaming or simulation of sports. In this or other embodiments, specifically, the object may be selected from the group consisting of: an article of sports equipment, preferably an article selected from the group consisting of a racket, a club, a bat; an article of clothing; a hat; a shoe.

Thus, generally, the devices according to the present invention, such as the detector, may be applied in various fields of uses. Specifically, the detector may be applied for a purpose of use, selected from the group consisting of: a position measurement in traffic technology; an entertainment application; a security application; a human-machine interface application; a tracking application; a photography application; a mapping application for generating maps of at least one space, such as at least one space selected from the group of a room, a building and a street; a mobile application; a webcam; an audio device; a dolby surround audio system; a computer peripheral device; a gaming application; a camera or video application; a security application; a surveillance application; an automotive application; a transport application; a medical application; a sports' application; a machine vision application; a vehicle application; an airplane application; a ship application; a spacecraft application; a building application; a construction application; a cartography application; a manufacturing application. Additionally or alternatively, applications in local and/or global positioning systems may be named, especially land-mark-based positioning and/or navigation, specifically for use in cars or other vehicles (such as trains, motorcycles, bicycles, trucks for cargo transportation), robots or for use by pedestrians. Further, indoor positioning systems may be named as potential applications, such as for household applications and/or for robots used in manufacturing, logistics, surveillance, or maintenance technology.

The devices according to the present invention may be used in mobile phones, tablet computers, laptops, smart panels or other stationary or mobile or wearable computer or communication applications. Thus, the devices according to the present invention may be combined with at least one active light source, such as a light source emitting light in the visible range or infrared spectral range, in order to enhance performance. Thus, as an example, the devices according to the present invention may be used as cameras and/or sensors, such as in combination with mobile software for scanning and/or detecting environment, objects and living beings. The devices according to the present invention may even be combined with 2D cameras, such as conventional cameras, in order to increase imaging effects. The devices according to the present invention may further be used for surveillance and/or for recording purposes or as input devices to control mobile devices, especially in combination with voice and/or gesture recognition. Thus, specifically, the devices according to the present invention acting as human-machine interfaces, also referred to as input devices, may be used in mobile applications, such as for controlling other electronic devices or components via the mobile device, such as the mobile phone. As an example, the mobile application including at least one device according to the present invention may be used for controlling a television set, a game console, a music player or music device or other entertainment devices.

Further, the devices according to the present invention may be used in webcams or other peripheral devices for computing applications. Thus, as an example, the devices according to the present invention may be used in combination with software for imaging, recording, surveillance, scanning or motion detection. As outlined in the context of the human-machine interface and/or the entertainment device, the devices according to the present invention are particularly useful for giving commands by facial expressions and/or body expressions. The devices according to the present invention can be combined with other input generating devices like e.g. mouse, keyboard, touchpad, microphone etc. Further, the devices according to the present invention may be used in applications for gaming, such as by using a webcam. Further, the devices according to the present invention may be used in virtual training applications and/or video conferences. Further, devices according to the present invention may be used to recognize or track hands, arms, or objects used in a virtual or augmented reality application, especially when wearing head-mounted displays.

Further, the devices according to the present invention may be used in mobile audio devices, television devices and gaming devices, as partially explained above. Specifically, the devices according to the present invention may be used as controls or control devices for electronic devices, entertainment devices or the like. Further, the devices according to the present invention may be used for eye detection or eye tracking, such as in 2D- and 3D-display techniques, especially with transparent displays for augmented reality applications and/or for recognizing whether a display is being looked at and/or from which perspective a display is being looked at. Further, devices according to the present invention may be used to explore a room, boundaries, obstacles, in connection with a virtual or augmented reality application, especially when wearing a head-mounted display.

Further, the devices according to the present invention may be used in or as digital cameras such as DSC cameras and/or in or as reflex cameras such as SLR cameras. For these applications, reference may be made to the use of the devices according to the present invention in mobile applications such as mobile phones, as disclosed above.

Further, the devices according to the present invention may be used for security or surveillance applications. Thus, as an example, at least one device according to the present invention can be combined with one or more digital and/or analogue electronics that will give a signal if an object is within or outside a predetermined area (e.g. for surveillance applications in banks or museums). Specifically, the devices according to the present invention may be used for optical encryption. Detection by using at least one device according to the present invention can be combined with other detection devices to complement wavelengths, such as with IR, x-ray, UV-VIS, radar or ultrasound detectors. The devices according to the present invention may further be combined with an active infrared light source to allow detection in low light surroundings. The devices according to the present invention are generally advantageous as compared to active detector systems, specifically since the devices according to the present invention avoid actively sending signals which may be detected by third parties, as is the case e.g. in radar applications, ultrasound applications, LIDAR or similar active detector devices. Thus, generally, the devices according to the present invention may be used for an unrecognized and undetectable tracking of moving objects. Additionally, the devices according to the present invention generally are less prone to manipulations and irritations as compared to conventional devices.

Further, given the ease and accuracy of 3D detection by using the devices according to the present invention, the devices according to the present invention generally may be used for facial, body and person recognition and identification. Therein, the devices according to the present invention may be combined with other detection means for identification or personalization purposes such as passwords, finger prints, iris detection, voice recognition or other means. Thus, generally, the devices according to the present invention may be used in security devices and other personalized applications.

Further, the devices according to the present invention may be used as 3D barcode readers for product identification.

In addition to the security and surveillance applications mentioned above, the devices according to the present invention generally can be used for surveillance and monitoring of spaces and areas. Thus, the devices according to the present invention may be used for surveying and monitoring spaces and areas and, as an example, for triggering or executing alarms in case prohibited areas are violated. Thus, generally, the devices according to the present invention may be used for surveillance purposes in building surveillance or museums, optionally in combination with other types of sensors, such as in combination with motion or heat sensors, in combination with image intensifiers or image enhancement devices and/or photomultipliers. Further, the devices according to the present invention may be used in public spaces or crowded spaces to detect potentially hazardous activities such as commitment of crimes such as theft in a parking lot or unattended objects such as unattended baggage in an airport.

Further, the devices according to the present invention may advantageously be applied in camera applications such as video and camcorder applications. Thus, the devices according to the present invention may be used for motion capture and 3D-movie recording. Therein, the devices according to the present invention generally provide a large number of advantages over conventional optical devices. Thus, the devices according to the present invention generally require a lower complexity with regard to optical components. Thus, as an example, the number of lenses may be reduced as compared to conventional optical devices, such as by providing the devices according to the present invention having one lens only. Due to the reduced complexity, very compact devices are possible, such as for mobile use. Conventional optical systems having two or more lenses with high quality generally are voluminous, such as due to the general need for voluminous beam-splitters. Further, the devices according to the present invention generally may be used for focus/autofocus devices, such as autofocus cameras. Further, the devices according to the present invention may also be used in optical microscopy, especially in confocal microscopy.

Further, the devices according to the present invention generally are applicable in the technical field of automotive technology and transport technology. Thus, as an example, the devices according to the present invention may be used as distance and surveillance sensors, such as for adaptive cruise control, emergency brake assist, lane departure warning, surround view, blind spot detection, traffic sign detection, traffic sign recognition, lane recognition, rear cross traffic alert, light source recognition for adapting the head light intensity and range depending on approaching traffic or vehicles driving ahead, adaptive frontlighting systems, automatic control of high beam head lights, adaptive cut-off lights in front light systems, glare-free high beam front lighting systems, marking animals, obstacles, or the like by headlight illumination, rear cross traffic alert, and other driver assistance systems such as advanced driver assistance systems, or other automotive and traffic applications. Further, devices according to the present invention may be used in driver assistance systems anticipating maneuvers of the driver beforehand for collision avoidance or the like. Further, the devices according to the present invention can also be used for velocity and/or acceleration measurements, such as by analyzing a first and second time-derivative of position information gained by using the detector according to the present invention. This feature generally may be applicable in automotive technology, transportation technology or general traffic technology. Applications in other fields of technology are feasible. A specific application in an indoor positioning system may be the detection of positioning of passengers in transportation, more specifically to electronically control the use of safety systems such as airbags. The use of an airbag may be prevented in case the passenger is located as such, that the use of an airbag will cause a severe injury. Further, in vehicles such as cars, trains, planes or the like, especially in autonomous vehicles, devices according to the present invention may be used to determine whether a driver pays attention to the traffic or is distracted, or asleep, or tired, or incapable of driving such as due to the consumption of alcohol or the like.

In these or other applications, generally, the devices according to the present invention may be used as stand-alone devices or in combination with other sensor devices, such as in combination with radar and/or ultrasonic devices. Specifically, the devices according to the present invention may be used for autonomous driving and safety issues. Further, in these applications, the devices according to the present invention may be used in combination with infrared sensors, radar sensors, which are sonic sensors, two-dimensional cameras or other types of sensors. In these applications, the generally passive nature of the devices according to the present invention is advantageous. Thus, since the devices according to the present invention generally do not require emitting signals, the risk of interference of active sensor signals with other signal sources may be avoided. The devices according to the present invention specifically may be used in combination with recognition software, such as standard image recognition software. Thus, signals and data as provided by the devices according to the present invention typically are readily processable and, therefore, generally require lower calculation power than established 3D measurement systems. Given the low space demand, the devices according to the present invention such as cameras may be placed at virtually any place in a vehicle, such as on or behind a window screen, on a front hood, on bumpers, on lights, on mirrors or other places and the like. Various detectors according to the present invention such as one or more detectors based on the effect disclosed within the present invention can be combined, such as in order to allow autonomously driving vehicles or in order to increase the performance of active safety concepts. Thus, various devices according to the present invention may be combined with one or more other devices according to the present invention and/or conventional sensors, such as in the windows like rear window, side window or front window, on the bumpers or on the lights.

A combination of at least one device according to the present invention such as at least one detector according to the present invention with one or more rain detection sensors is also possible. This is due to the fact that the devices according to the present invention generally are advantageous over conventional sensor techniques such as radar, specifically during heavy rain. A combination of at least one device according to the present invention with at least one conventional sensing technique such as radar may allow for a software to pick the right combination of signals according to the weather conditions.

Further, the devices according to the present invention generally may be used as break assist and/or parking assist and/or for speed measurements. Speed measurements can be integrated in the vehicle or may be used outside the vehicle, such as in order to measure the speed of other cars in traffic control. Further, the devices according to the present invention may be used for detecting free parking spaces in parking lots.

Further, the devices according to the present invention may be used in the fields of medical systems and sports. Thus, in the field of medical technology, surgery robotics, e.g. for use in endoscopes, may be named, since, as outlined above, the devices according to the present invention may require a low volume only and may be integrated into other devices. Specifically, the devices according to the present invention having one lens, at most, may be used for capturing 3D information in medical devices such as in endoscopes. Further, the devices according to the present invention may be combined with an appropriate monitoring software, in order to enable tracking and analysis of movements. This may allow an instant overlay of the position of a medical device, such as an endoscope or a scalpel, with results from medical imaging, such as obtained from magnetic resonance imaging, x-ray imaging, or ultrasound imaging. These applications are specifically valuable e.g. in medical treatments where precise location information is important such as in brain surgery and long-distance diagnosis and tele-medicine. Further, the devices according to the present invention may be used in 3D-body scanning. Body scanning may be applied in a medical context, such as in dental surgery, plastic surgery, bariatric surgery, or cosmetic plastic surgery, or it may be applied in the context of medical diagnosis such as in the diagnosis of myofascial pain syndrome, cancer, body dysmorphic disorder, or further diseases. Body scanning may further be applied in the field of sports to assess ergonomic use or fit of sports equipment.

Body scanning may further be used in the context of clothing, such as to determine a suitable size and fitting of clothes. This technology may be used in the context of tailor-made clothes or in the context of ordering clothes or shoes from the internet or at a self-service shopping device such as a micro kiosk device or customer concierge device. Body scanning in the context of clothing is especially important for scanning fully dressed customers.

Further, the devices according to the present invention may be used in the context of people counting systems, such as to count the number of people in an elevator, a train, a bus, a car, or a plane, or to count the number of people passing a hallway, a door, an aisle, a retail store, a stadium, an entertainment venue, a museum, a library, a public location, a cinema, a theater, or the like. Further, the 3D-function in the people counting system may be used to obtain or estimate further information about the people that are counted such as height, weight, age, physical fitness, or the like. This information may be used for business intelligence metrics, and/or for further optimizing the locality where people may be counted to make it more attractive or safe. In a retail environment, the devices according to the present invention in the context of people counting may be used to recognize returning customers or cross shoppers, to assess shopping behavior, to assess the percentage of visitors that make purchases, to optimize staff shifts, or to monitor the costs of a shopping mall per visitor. Further, people counting systems may be used for anthropometric surveys. Further, the devices according to the present invention may be used in public transportation systems for automatically charging passengers depending on the length of transport. Further, the devices according to the present invention may be used in playgrounds for children, to recognize injured children or children engaged in dangerous activities, to allow additional interaction with playground toys, to ensure safe use of playground toys or the like.

Further, the devices according to the present invention may be used in construction tools, such as a range meter that determines the distance to an object or to a wall, to assess whether a surface is planar, to align objects or place objects in an ordered manner, or in inspection cameras for use in construction environments or the like.

Further, the devices according to the present invention may be applied in the field of sports and exercising, such as for training, remote instructions or competition purposes. Specifically, the devices according to the present invention may be applied in the fields of dancing, aerobic, football, soccer, basketball, baseball, cricket, hockey, track and field, swimming, polo, handball, volleyball, rugby, sumo, judo, fencing, boxing, golf, car racing, laser tag, battlefield simulation etc. The devices according to the present invention can be used to detect the position of a ball, a bat, a sword, motions, etc., both in sports and in games, such as to monitor the game, support the referee or for judgment, specifically automatic judgment, of specific situations in sports, such as for judging whether a point or a goal actually was made.

Further, the devices according to the present invention may be used in the field of auto racing or car driver training or car safety training or the like to determine the position of a car or the track of a car, or the deviation from a previous track or an ideal track or the like.

The devices according to the present invention may further be used to support a practice of musical instruments, in particular remote lessons, for example lessons of string instruments, such as fiddles, violins, violas, celli, basses, harps, guitars, banjos, or ukuleles, keyboard instruments, such as pianos, organs, keyboards, harpsichords, harmoniums, or accordions, and/or percussion instruments, such as drums, timpani, marimbas, xylophones, vibraphones, bongos, congas, timbales, djembes or tablas.

The devices according to the present invention further may be used in rehabilitation and physiotherapy, in order to encourage training and/or in order to survey and correct movements. Therein, the devices according to the present invention may also be applied for distance diagnostics.

Further, the devices according to the present invention may be applied in the field of machine vision. Thus, one or more of the devices according to the present invention may be used e.g. as a passive controlling unit for autonomous driving and or working of robots. In combination with moving robots, the devices according to the present invention may allow for autonomous movement and/or autonomous detection of failures in parts. The devices according to the present invention may also be used for manufacturing and safety surveillance, such as in order to avoid accidents including but not limited to collisions between robots, production parts and living beings. In robotics, the safe and direct interaction of humans and robots is often an issue, as robots may severely injure humans when they are not recognized. Devices according to the present invention may help robots to position objects better and faster and allow a safe interaction. Given the passive nature of the devices according to the present invention, the devices according to the present invention may be advantageous over active devices and/or may be used complementary to existing solutions like radar, ultrasound, 2D cameras, IR detection etc. One particular advantage of the devices according to the present invention is the low likelihood of signal interference. Therefore multiple sensors can work at the same time in the same environment, without the risk of signal interference. Thus, the devices according to the present invention generally may be useful in highly automated production environments like e.g. but not limited to automotive, mining, steel, etc. The devices according to the present invention can also be used for quality control in production, e.g. in combination with other sensors like 2-D imaging, radar, ultrasound, IR etc., such as for quality control or other purposes. Further, the devices according to the present invention may be used for assessment of surface quality, such as for surveying the surface evenness of a product or the adherence to specified dimensions, from the range of micrometers to the range of meters. Other quality control applications are feasible. In a manufacturing environment, the devices according to the present invention are especially useful for processing natural products such as food or wood, with a complex 3-dimensional structure to avoid large amounts of waste material. Further, devices according to the present invention may be used to monitor the filling level of tanks, silos etc. Further, devices according to the present invention may be used to inspect complex products for missing parts, incomplete parts, loose parts, low quality parts, or the like, such as in automatic optical inspection, such as of printed circuit boards, inspection of assemblies or sub-assemblies, verification of engineered components, engine part inspections, wood quality inspection, label inspections, inspection of medical devices, inspection of product orientations, packaging inspections, food pack inspections, or the like.

Further, the devices according to the present invention may be used in vehicles, trains, airplanes, ships, spacecraft and other traffic applications. Thus, besides the applications mentioned above in the context of traffic applications, passive tracking systems for aircraft, vehicles and the like may be named. The use of at least one device according to the present invention, such as at least one detector according to the present invention, for monitoring the speed and/or the direction of moving objects is feasible. Specifically, the tracking of fast moving objects on land, sea and in the air including space may be named. The at least one device according to the present invention, such as the at least one detector according to the present invention, specifically may be mounted on a still-standing and/or on a moving device. An output signal of the at least one device according to the present invention can be combined e.g. with a guiding mechanism for autonomous or guided movement of another object. Thus, applications for avoiding collisions or for enabling collisions between the tracked and the steered object are feasible. The devices according to the present invention generally are useful and advantageous due to the low calculation power required, the instant response and due to the passive nature of the detection system which generally is more difficult to detect and to disturb as compared to active systems, like e.g. radar. The devices according to the present invention are particularly useful but not limited to e.g. speed control and air traffic control devices. Further, the devices according to the present invention may be used in automated tolling systems for road charges.

The devices according to the present invention generally may be used in passive applications. Passive applications include guidance for ships in harbors or in dangerous areas, and for aircraft when landing or starting. Therein, fixed, known active targets may be used for precise guidance. The same can be used for vehicles driving on dangerous but well defined routes, such as mining vehicles. Further, the devices according to the present invention may be used to detect rapidly approaching objects, such as cars, trains, flying objects, animals, or the like. Further, the devices according to the present invention can be used for detecting velocities or accelerations of objects, or to predict the movement of an object by tracking one or more of its position, speed, and/or acceleration depending on time.

Further, as outlined above, the devices according to the present invention may be used in the field of gaming. Thus, the devices according to the present invention can be passive for use with multiple objects of the same or of different size, color, shape, etc., such as for movement detection in combination with software that incorporates the movement into its content. In particular, applications are feasible in implementing movements into graphical output. Further, applications of the devices according to the present invention for giving commands are feasible, such as by using one or more of the devices according to the present invention for gesture or facial recognition. The devices according to the present invention may be combined with an active system in order to work under e.g. low light conditions or in other situations in which enhancement of the surrounding conditions is required. Additionally or alternatively, a combination of one or more devices according to the present invention with one or more IR or VIS light sources is possible. A combination of a detector according to the present invention with special devices is also possible, which can be distinguished easily by the system and its software, e.g. and not limited to, a special color, shape, relative position to other devices, speed of movement, light, frequency used to modulate light sources on the device, surface properties, material used, reflection properties, transparency degree, absorption characteristics, etc. The device can, amongst other possibilities, resemble a stick, a racquet, a club, a gun, a knife, a wheel, a ring, a steering wheel, a bottle, a ball, a glass, a vase, a spoon, a fork, a cube, a dice, a figure, a puppet, a teddy, a beaker, a pedal, a switch, a glove, jewelry, a musical instrument or an auxiliary device for playing a musical instrument, such as a plectrum, a drumstick or the like. Other options are feasible.

Further, the devices according to the present invention may be used to detect and or track objects that emit light by themselves, such as due to high temperature or further light emission processes. The light-emitting part may be an exhaust stream or the like. Further, the devices according to the present invention may be used to track reflecting objects and analyze the rotation or orientation of these objects.

Further, the devices according to the present invention generally may be used in the field of building, construction and cartography. Thus, generally, one or more devices according to the present invention may be used in order to measure and/or monitor environmental areas, e.g. countryside or buildings. Therein, one or more devices according to the present invention may be combined with other methods and devices or can be used solely in order to monitor progress and accuracy of building projects, changing objects, houses, etc. The devices according to the present invention can be used for generating three-dimensional models of scanned environments, in order to construct maps of rooms, streets, houses, communities or landscapes, both from ground or from air. Potential fields of application may be construction, cartography, real estate management, land surveying or the like. As an example, the devices according to the present invention may be used in drones or multicopters to monitor buildings, production sites, chimneys, agricultural production environments such as fields, production plants, or landscapes, to support rescue operations, to support work in dangerous environments, to support fire brigades in a burning location indoors or outdoors, or to find or monitor one or more persons or animals, or the like, or for entertainment purposes, such as a drone following and recording one or more persons doing sports such as skiing or cycling or the like, which could be realized by following a helmet, a mark, a beacon device, or the like. Devices according to the present invention could be used recognize obstacles, follow a predefined route, follow an edge, a pipe, a building, or the like, or to record a global or local map of the environment. Further, devices according to the present invention could be used for indoor or outdoor localization and positioning of drones, for stabilizing the height of a drone indoors where barometric pressure sensors are not accurate enough, or for the interaction of multiple drones such as concertized movements of several drones or recharging or refueling in the air or the like.

Further, the devices according to the present invention may be used within an interconnecting network of home appliances such as CHAIN (Cedec Home Appliances Inter-operating Network) to interconnect, automate, and control basic appliance-related services in a home, e.g. energy or load management, remote diagnostics, pet related appliances, child related appliances, child surveillance, appliances related surveillance, support or service to elderly or ill persons, home security and/or surveillance, remote control of appliance operation, and automatic maintenance support. Further, the devices according to the present invention may be used in heating or cooling systems such as an air-conditioning system, to locate which part of the room should be brought to a certain temperature or humidity, especially depending on the location of one or more persons. Further, the devices according to the present invention may be used in domestic robots, such as service or autonomous robots which may be used for household chores. The devices according to the present invention may be used for a number of different purposes, such as to avoid collisions or to map the environment, but also to identify a user, to personalize the robot's performance for a given user, for security purposes, or for gesture or facial recognition. As an example, the devices according to the present invention may be used in robotic vacuum cleaners, floor-washing robots, dry-sweeping robots, ironing robots for ironing clothes, animal litter robots, such as cat litter robots, security robots that detect intruders, robotic lawn mowers, automated pool cleaners, rain gutter cleaning robots, window washing robots, toy robots, telepresence robots, social robots providing company to less mobile people, or robots translating and speech to sign language or sign language to speech. In the context of less mobile people, such as elderly persons, household robots with the devices according to the present invention may be used for picking up objects, transporting objects, and interacting with the objects and the user in a safe way. Further, the devices according to the present invention may be used in robots operating with hazardous materials or objects or in dangerous environments. As a non-limiting example, the devices according to the present invention may be used in robots or unmanned remote-controlled vehicles to operate with hazardous materials such as chemicals or radioactive materials especially after disasters, or with other hazardous or potentially hazardous objects such as mines, unexploded arms, or the like, or to operate in or to investigate insecure environments such as near burning objects or post disaster areas or for manned or unmanned rescue operations in the air, in the sea, underground, or the like.

Further, devices according to the present invention may be used for navigation purposes, where Global Positioning Systems (GPS) are not sufficiently reliable. GPS signals commonly use radio waves that are can be blocked or difficult to receive indoors or outdoors in valleys or in forests below the treeline. Further, especially in unmanned autonomous vehicles, the weight of the system may be critical. Especially unmanned autonomous vehicles need high-speed position data for reliable feedback and stability of their control systems. Using devices according to the present invention may allow short time response and positioning without adding weight due to a heavy device.

Further, the devices according to the present invention may be used in household, mobile or entertainment devices, such as a refrigerator, a microwave, a washing machine, a window blind or shutter, a household alarm, an air condition device, a heating device, a television, an audio device, a smart watch, a mobile phone, a phone, a dishwasher, a stove or the like, to detect the presence of a person, to monitor the contents or function of the device, or to interact with the person and/or share information about the person with further household, mobile or entertainment devices.

Further, the devices according to the present invention may be used to support elderly or disabled persons or persons with limited or no vision, such as in household chores or at work such as in devices for holding, carrying, or picking objects, or in a safety system with optical or acoustical signals signaling obstacles in the environment.

The devices according to the present invention may further be used in agriculture, for example to detect and sort out vermin, weeds, and/or infected crop plants, fully or in parts, wherein crop plants may be infected by fungus or insects. Further, for harvesting crops, the devices according to the present invention may be used to detect animals, such as deer, which may otherwise be harmed by harvesting devices. Further, the devices according to the present invention may be used to monitor the growth of plants in a field or greenhouse, in particular to adjust the amount of water or fertilizer or crop protection products for a given region in the field or greenhouse or even for a given plant. Further, in agricultural biotechnology, the devices according to the present invention may be used to monitor the size and shape of plants.

Further, devices according to the present invention may be used to automatically remove weeds such as with mechanical means, such as to avoid the use of herbicides. Further, devices according to the present invention may be used in the field of agriculture, in particular to detect and/or locate specific insects such as to decide whether or not to apply a crop protection or fertilization substance, such as to reduce the amount of applied substance or to protect specific groups of animals such as bees.

Further, the devices according to the present invention may be combined with sensors to detect chemicals or pollutants, electronic nose chips, microbe sensor chips to detect bacteria or viruses or the like, Geiger counters, tactile sensors, heat sensors, or the like. This may for example be used in constructing smart robots which are configured for handling dangerous or difficult tasks, such as in treating highly infectious patients, handling or removing highly dangerous substances, cleaning highly polluted areas, such as highly radioactive areas or chemical spills, or for pest control in agriculture.

One or more devices according to the present invention can further be used for scanning of objects, such as in combination with CAD or similar software, such as for additive manufacturing and/or 3D printing. Therein, use may be made of the high dimensional accuracy of the devices according to the present invention, e.g. in x-, y- or z-direction or in any arbitrary combination of these directions, such as simultaneously. Further, the devices according to the present invention may be used in inspections and maintenance, such as pipeline inspection gauges. Further, in a production environment, the devices according to the present invention may be used to work with objects of a badly defined shape such as naturally grown objects, such as sorting vegetables or other natural products by shape or size or cutting products such as meat or objects that are manufactured with a precision that is lower than the precision needed for a processing step.

Further the devices according to the present invention may be used in local navigation systems to allow autonomously or partially autonomously moving vehicles or multicopters or the like through an indoor or outdoor space. A non-limiting example may comprise vehicles moving through an automated storage for picking up objects and placing them at a different location. Indoor navigation may further be used in shopping malls, retail stores, museums, airports, or train stations, to track the location of mobile goods, mobile devices, baggage, customers or employees, or to supply users with a location-specific information, such as the current position on a map, or information on goods sold, or the like.

Further, the devices according to the present invention may be used to ensure safe driving of motorcycles such as driving assistance for motorcycles by monitoring speed, inclination, upcoming obstacles, unevenness of the road, or curves or the like. Further, the devices according to the present invention may be used in trains or trams to avoid collisions.

Further, the devices according to the present invention may be used in handheld devices, such as for scanning packaging or parcels to optimize a logistics process. Further, the devices according to the present invention may be used in further handheld devices such as personal shopping devices, RFID-readers, handheld devices for use in hospitals or health environments such as for medical use or to obtain, exchange or record patient or patient health related information, smart badges for retail or health environments, or the like.

As outlined above, the devices according to the present invention may further be used in manufacturing, quality control or identification applications, such as in product identification or size identification (such as for finding an optimal place or package, for reducing waste etc.). Further, the devices according to the present invention may be used in logistics applications. Thus, the devices according to the present invention may be used for optimized loading or packing containers or vehicles. Further, the devices according to the present invention may be used for monitoring or controlling of surface damages in the field of manufacturing, for monitoring or controlling rental objects such as rental vehicles, and/or for insurance applications, such as for assessment of damages. Further, the devices according to the present invention may be used for identifying a size of material, object or tools, such as for optimal material handling, especially in combination with robots. Further, the devices according to the present invention may be used for process control in production, e.g. for observing filling level of tanks. Further, the devices according to the present invention may be used for maintenance of production assets like, but not limited to, tanks, pipes, reactors, tools etc. Further, the devices according to the present invention may be used for analyzing 3D-quality marks. Further, the devices according to the present invention may be used in manufacturing tailor-made goods such as tooth inlays, dental braces, prosthesis, clothes or the like. The devices according to the present invention may also be combined with one or more 3D-printers for rapid prototyping, 3D-copying or the like. Further, the devices according to the present invention may be used for detecting the shape of one or more articles, such as for anti-product piracy and for anti-counterfeiting purposes.

Thus, specifically, the present application may be applied in the field of photography. Thus, the detector may be part of a photographic device, specifically of a digital camera. Specifically, the detector may be used for 3D photography, specifically for digital 3D photography. Thus, the detector may form a digital 3D camera or may be part of a digital 3D camera. As used herein, the term photography generally refers to the technology of acquiring image information of at least one object. As further used herein, a camera generally is a device adapted for performing photography. As further used herein, the term digital photography generally refers to the technology of acquiring image information of at least one object by using a plurality of light-sensitive elements adapted to generate electrical signals indicating an intensity and/or color of illumination, preferably digital electrical signals. As further used herein, the term 3D photography generally refers to the technology of acquiring image information of at least one object in three spatial dimensions. Accordingly, a 3D camera is a device adapted for performing 3D photography. The camera generally may be adapted for acquiring a single image, such as a single 3D image, or may be adapted for acquiring a plurality of images, such as a sequence of images. Thus, the camera may also be a video camera adapted for video applications, such as for acquiring digital video sequences.

Thus, generally, the present invention further refers to a camera, specifically a digital camera, more specifically a 3D camera or digital 3D camera, for imaging at least one object. As outlined above, the term imaging, as used herein, generally refers to acquiring image information of at least one object. The camera comprises at least one detector according to the present invention. The camera, as outlined above, may be adapted for acquiring a single image or for acquiring a plurality of images, such as image sequence, preferably for acquiring digital video sequences. Thus, as an example, the camera may be or may comprise a video camera. In the latter case, the camera preferably comprises a data memory for storing the image sequence.

As used within the present invention, the expression "position" generally refers to at least one item of information regarding one or more of an absolute position and an orientation of one or more points of the object. Thus, specifically, the position may be determined in a coordinate system of the detector, such as in a Cartesian coordinate system. Additionally or alternatively, however, other types of coordinate systems may be used, such as polar coordinate systems and/or spherical coordinate systems.

As outlined above and as will be outlined in further detail below, the present invention preferably may be applied in the field of human-machine interfaces, in the field of sports and/or in the field of computer games. Thus, preferably, the object may be selected from the group consisting of: an article of sports equipment, preferably an article selected from the group consisting of a racket, a club, a bat, an article of clothing, a hat, a shoe. Other embodiments are feasible.

As used herein, the object generally may be an arbitrary object, chosen from a living object and a non-living object. Thus, as an example, the at least one object may comprise one or more articles and/or one or more parts of an article. Additionally or alternatively, the object may be or may comprise one or more living beings and/or one or more parts thereof, such as one or more body parts of a human being, e.g. a user, and/or an animal.

With regard to the coordinate system for determining the position of the object, which may be a coordinate system of the detector, the detector may constitute a coordinate system in which an optical axis of the detector forms the z-axis and in which, additionally, an x-axis and a y-axis may be provided which are perpendicular to the z-axis and which are perpendicular to each other. As an example, the detector and/or a part of the detector may rest at a specific point in this coordinate system, such as at the origin of this coordinate system. In this coordinate system, a direction parallel or antiparallel to the z-axis may be regarded as a longitudinal direction, and a coordinate along the z-axis may be considered a longitudinal coordinate. An arbitrary direction perpendicular to the longitudinal direction may be considered a transversal direction, and an x- and/or y-coordinate may be considered a transversal coordinate.

Alternatively, other types of coordinate systems may be used. Thus, as an example, a polar coordinate system may be used in which the optical axis forms a z-axis and in which a distance from the z-axis and a polar angle may be used as additional coordinates. Again, a direction parallel or antiparallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

The detector may be a device configured for providing at least one item of information on the position of the at least one object and/or a part thereof. Thus, the position may refer to an item of information fully describing the position of the object or a part thereof, preferably in the coordinate system of the detector, or may refer to a partial information, which only partially describes the position. The detector generally may be a device adapted for detecting light beams, such as the light beams propagating from the beacon devices towards the detector.

The evaluation device and the detector may fully or partially be integrated into a single device. Thus, generally, the evaluation device also may form part of the detector. Alternatively, the evaluation device and the detector may fully or partially be embodied as separate devices. The detector may comprise further components.

The detector may be a stationary device or a mobile device. Further, the detector may be a stand-alone device or may form part of another device, such as a computer, a vehicle or any other device. Further, the detector may be a hand-held device. Other embodiments of the detector are feasible.

The detector specifically may be used to record a light-field behind a lens or lens system of the detector, comparable to a plenoptic or light-field camera. Thus, specifically, the detector may be embodied as a light-field camera adapted for acquiring images in multiple focal planes, such as simultaneously. The term light-field, as used herein, generally refers to the spatial light propagation of light inside the detector such as inside a camera. The detector according to the present invention, specifically having a stack of optical sensors, may have the capability of directly recording a light-field within the detector or camera, such as behind a lens. The plurality of sensors may record images at different distances from the lens. Using, e.g., convolution-based algorithms such as "depth from focus" or "depth from defocus", the propagation direction, focus points, and spread of the light behind the lens can be modeled. From the modeled propagation of light behind the lens, images at various distances to the lens can be extracted, the depth of field can be optimized, pictures that are in focus at various distances can be extracted, or distances of objects can be calculated. Further information may be extracted.

The use of several optical sensors further allows for correcting lens errors in an image processing step after recording the images. Optical instruments often become expensive and challenging in construction, when lens errors need to be corrected. These are especially problematic in microscopes and telescopes. In microscopes, a typical lens error is that rays of varying distance to the optical axis are distorted differently (spherical aberration). In telescopes, varying the focus may occur from differing temperatures in the atmosphere. Static errors such as spherical aberration or further errors from production may be corrected by determining the errors in a calibration step and then using a fixed image processing such as fixed set of pixels and sensor, or more involved processing techniques using light propagation information. In cases in which lens errors are strongly time-dependent, i.e. dependent on weather conditions in telescopes, the lens errors may be corrected by using the light propagation behind the lens, calculating extended depth of field images, using depth from focus techniques, and others.

The detector according to the present invention may further allow for color detection. For color detection, a plurality of optical sensors having different spectral properties may be used, and sensor signals of these optical sensors may be compared.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage devices. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the method according to the present invention. As an example, one or more algorithms may be implemented which, by using the sensor signals as input variables, may determine the position of the object.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, infrared or internet interfaces, ports or connections. It may further be connected or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, USART, or SPI, or analogue interfaces or ports such as one or more of ADCs or DACs, or standardized interfaces or ports to further devices such as a 2D-camera device using an RGB-interface such as CameraLink. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+RW drive, a flash drive, a memory card, a disk drive, a hard disk drive, a solid state disk or a solid state hard disk.

The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

Possible embodiments of a single device incorporating one or more of the detectors according to the present invention, the evaluation device or the data processing device, such as incorporating one or more of the optical sensor, optical systems, evaluation device, communication device, data processing device, interfaces, system on a chip, display devices, or further electronic devices, are: mobile phones, personal computers, tablet PCs, televisions, game consoles or further entertainment devices. In a further embodiment, the 3D-camera functionality which will be outlined in further detail below may be integrated in devices that are available with conventional 2D-digital cameras, without a noticeable difference in the housing or appearance of the device, where the noticeable difference for the user may only be the functionality of obtaining and/or processing 3D information.

Specifically, an embodiment incorporating the detector and/or a part thereof such as the evaluation device and/or the data processing device may be: a mobile phone incorporating a display device, a data processing device, the optical sensor, optionally the sensor optics, and the evaluation device, for the functionality of a 3D camera. The detector according to the present invention specifically may be suitable for integration in entertainment devices and/or communication devices such as a mobile phone.

A further embodiment of the present invention may be an incorporation of the detector or a part thereof such as the evaluation device and/or the data processing device in a device for use in automotive, for use in autonomous driving or for use in car safety systems such as Daimler's Intelligent Drive system, wherein, as an example, a device incorporating one or more of the optical sensors, optionally one or more optical systems, the evaluation device, optionally a communication device, optionally a data processing device, optionally one or more interfaces, optionally a system on a chip, optionally one or more display devices, or optionally further electronic devices may be part of a vehicle, a car, a truck, a train, a bicycle, an airplane, a ship, a motorcycle. In automotive applications, the integration of the device into the automotive design may necessitate the integration of the optical sensor, optionally optics, or device at minimal visibility from the exterior or interior. The detector or a part thereof such as the evaluation device and/or the data processing device may be especially suitable for such integration into automotive design.

As used herein, the term light generally refers to electromagnetic radiation in one or more of the visible spectral range, the ultraviolet spectral range and the infrared spectral range. Therein, the term visible spectral range generally refers to a spectral range of 380 nm to 780 nm. The term infrared spectral range generally refers to electromagnetic radiation in the range of 780 nm to 1 mm, preferably in the range of 780 nm to 3.0 micrometers. The term ultraviolet spectral range generally refers to electromagnetic radiation in the range of 1 nm to 380 nm, preferably in the range of 100 nm to 380 nm. Preferably, light as used within the present invention is visible light, i.e. light in the visible spectral range.

The term light beam generally may refer to an amount of light emitted and/or reflected into a specific direction. Thus, the light beam may be a bundle of the light rays having a predetermined extension in a direction perpendicular to a direction of propagation of the light beam. Preferably, the light beams may be or may comprise one or more Gaussian light beams such as a linear combination of Gaussian light beams, which may be characterized by one or more Gaussian beam parameters, such as one or more of a beam waist, a Rayleigh-length or any other beam parameter or combination of beam parameters suited to characterize a development of a beam diameter and/or a beam propagation in space.

The detector according to the present invention may further be combined with one or more other types of sensors or detectors. Thus, the detector may further comprise at least one additional detector. The at least one additional detector may be adapted for detecting at least one parameter, such as at least one of: a parameter of a surrounding environment, such as a temperature and/or a brightness of a surrounding environment; a parameter regarding a position and/or orientation of the detector; a parameter specifying a state of the object to be detected, such as a position of the object, e.g. an absolute position of the object and/or an orientation of the object in space. Thus, generally, the principles of the present invention may be combined with other measurement principles in order to gain additional information and/or in order to verify measurement results or reduce measurement errors or noise.

As outlined above, the human-machine interface may comprise a plurality of beacon devices which are adapted to be at least one of directly or indirectly attached to the user and held by the user. Thus, the beacon devices each may independently be attached to the user by any suitable means, such as by an appropriate fixing device. Additionally or alternatively, the user may hold and/or carry the at least one beacon device or one or more of the beacon devices in his or her hands and/or by wearing the at least one beacon device and/or a garment containing the beacon device on a body part.

The beacon device generally may be an arbitrary device which may be detected by the at least one detector and/or which facilitates detection by the at least one detector. Thus, as outlined above or as will be outlined in further detail below, the beacon device may be an active beacon device adapted for generating the at least one light beam to be detected by the detector, such as by having one or more illumination sources for generating the at least one light beam. Additionally or alternatively, the beacon device may fully or partially be designed as a passive beacon device, such as by providing one or more reflective elements adapted to reflect a light beam generated by a separate illumination source. The at least one beacon device may permanently or temporarily be attached to the user in a direct or indirect way and/or may be carried or held by the user. The attachment may take place by using one or more attachment means and/or by the user himself or herself, such as by the user holding the at least one beacon device by hand and/or by the user wearing the beacon device.

Additionally or alternatively, the beacon devices may be at least one of attached to an object and integrated into an object held by the user, which, in the sense of the present invention, shall be included into the meaning of the option of the user holding the beacon devices. Thus, as will be outlined in further detail below, the beacon devices may be attached to or integrated into a control element which may be part of the human-machine interface and which may be held or carried by the user, and of which the orientation may be recognized by the detector device. Thus, generally, the present invention also refers to a detector system comprising at least one detector device according to the present invention and which, further, may comprise at least one object, wherein the beacon devices are one of attached to the object, held by the object and integrated into the object. As an example, the object preferably may form a control element, the orientation of which may be recognized by a user. Thus, the detector system may be part of the human-machine interface as outlined above or as outlined in further detail below. As an example, the user may handle the control element in a specific way in order to transmit one or more items of information to a machine, such as in order to transmit one or more commands to the machine.

Alternatively, the detector system may be used in other ways. Thus, as an example, the object of the detector system may be different from a user or a body part of the user and, as an example, may be an object which moves independently from the user. As an example, the detector system may be used for controlling apparatuses and/or industrial processes, such as manufacturing processes and/or robotics processes. Thus, as an example, the object may be a machine and/or a machine part, such as a robot arm, the orientation of which may be detected by using the detector system.

The human-machine interface may be adapted in such a way that the detector device generates at least one item of information on the position of the user or of at least one body part of the user. Specifically in case a manner of attachment of the at least one beacon device to the user is known, by evaluating the position of the at least one beacon device, at least one item of information on a position and/or an orientation of the user or of a body part of the user may be gained.

The beacon device preferably is one of a beacon device attachable to a body or a body part of the user and a beacon device which may be held by the user. As outlined above, the beacon device may fully or partially be designed as an active beacon device. Thus, the beacon device may comprise at least one illumination source adapted to generate at least one light beam to be transmitted to the detector, preferably at least one light beam having known beam properties. Additionally or alternatively, the beacon device may comprise at least one reflector adapted to reflect light generated by an illumination source, thereby generating a reflected light beam to be transmitted to the detector.

The object, which may form part of the detector system, may generally have an arbitrary shape. Preferably, the object being part of the detector system, as outlined above, may be a control element which may be handled by a user, such as manually. As an example, the control element may be or may comprise at least one element selected from the group consisting of: a glove, a jacket, a hat, shoes, trousers and a suit, a stick that may be held by hand, a bat, a club, a racket, a cane, a toy, such as a toy gun. Thus, as an example, the detector system may be part of the human-machine interface and/or of the entertainment device.

As used herein, an entertainment device is a device which may serve the purpose of leisure and/or entertainment of one or more users, in the following also referred to as one or more players. As an example, the entertainment device may serve the purpose of gaming, preferably computer gaming. Thus, the entertainment device may be implemented into a computer, a computer network or a computer system or may comprise a computer, a computer network or a computer system which runs one or more gaming software programs.

The entertainment device comprises at least one human-machine interface according to the present invention, such as according to one or more of the embodiments disclosed above and/or according to one or more of the embodiments disclosed below. The entertainment device is designed to enable at least one item of information to be input by a player by means of the human-machine interface. The at least one item of information may be transmitted to and/or may be used by a controller and/or a computer of the entertainment device. The at least one item of information preferably may comprise at least one command adapted for influencing the course of a game. Thus, as an example, the at least one item of information may include at least one item of information on at least one orientation of the player and/or of one or more body parts of the player, thereby allowing for the player to simulate a specific position and/or orientation and/or action required for gaming. As an example, one or more of the following movements may be simulated and communicated to a controller and/or a computer of the entertainment device: dancing; running; jumping; swinging of a racket; swinging of a bat; swinging of a club; pointing of an object towards another object, such as pointing of a toy gun towards a target.

The entertainment device as a part or as a whole, preferably a controller and/or a computer of the entertainment device, is designed to vary the entertainment function in accordance with the information. Thus, as outlined above, a course of a game might be influenced in accordance with the at least one item of information. Thus, the entertainment device might include one or more controllers which might be separate from the evaluation device of the at least one detector and/or which might be fully or partially identical to the at least one evaluation device or which might even include the at least one evaluation device. Preferably, the at least one controller might include one or more data processing devices, such as one or more computers and/or microcontrollers.

As further used herein, a tracking system is a device which is adapted to gather information on a series of past positions of the at least one object and/or at least one part of the object. Additionally, the tracking system may be adapted to provide information on at least one predicted future position and/or orientation of the at least one object or the at least one part of the object. The tracking system may have at least one track controller, which may fully or partially be embodied as an electronic device, preferably as at least one data processing device, more preferably as at least one computer or microcontroller. Again, the at least one track controller may fully or partially comprise the at least one evaluation device and/or may be part of the at least one evaluation device and/or may fully or partially be identical to the at least one evaluation device.

The tracking system comprises at least one detector according to the present invention, such as at least one detector as disclosed in one or more of the embodiments listed above and/or as disclosed in one or more of the embodiments below. The tracking system further comprises at least one track controller. The track controller is adapted to track a series of positions of the object at specific points in time, such as by recording groups of data or data pairs, each group of data or data pair comprising at least one position information and at least one time information.

The tracking system may further comprise the at least one detector system according to the present invention. Thus, besides the at least one detector and the at least one evaluation device and the optional at least one beacon device, the tracking system may further comprise the object itself or a part of the object, such as at least one control element comprising the beacon devices or at least one beacon device, wherein the control element is directly or indirectly attachable to or integratable into the object to be tracked.

The tracking system may be adapted to initiate one or more actions of the tracking system itself and/or of one or more separate devices. For the latter purpose, the tracking system, preferably the track controller, may have one or more wireless and/or wire-bound interfaces and/or other types of control connections for initiating at least one action. Preferably, the at least one track controller may be adapted to initiate at least one action in accordance with at least one actual position of the object. As an example, the action may be selected from the group consisting of: a prediction of a future position of the object; pointing at least one device towards the object; pointing at least one device towards the detector; illuminating the object; illuminating the detector.

As an example of application of a tracking system, the tracking system may be used for continuously pointing at least one first object to at least one second object even though the first object and/or the second object might move. Potential examples, again, may be found in industrial applications, such as in robotics and/or for continuously working on an article even though the article is moving, such as during manufacturing in a manufacturing line or assembly line. Additionally or alternatively, the tracking system might be used for illumination purposes, such as for continuously illuminating the object by continuously pointing an illumination source to the object even though the object might be moving. Further applications might be found in communication systems, such as in order to continuously transmit information to a moving object by pointing a transmitter towards the moving object.

The proposed devices and methods provide a large number of advantages over known detectors of this kind. Thus, the detector generally may avoid the shortcomings of the known prior art systems disclosed above. Specifically, the detector may avoid the use of FiP sensors, thereby allowing for e.g. using simple and cheap and commercially available semiconductor sensors such as silicon photodiodes. These photodiodes generally do not show a luminance dependency, and the method disclosed above is generally independent from the brightness of the scenery and/or the brightness of the light spot on the light beam. Consequently, a range of measurement in terms of luminance or total power of the light beam entering the detector is generally larger in the present invention as compared to many of the devices disclosed above. Further, the measurement by using the detector according to the present invention is generally independent from the target spot size, i.e. from either the size of the object, the size of a light spot projected on to the object or the size of a beacon device being one or more of attached to the object, integrated into the object or held by the object.

The detector according to the present invention may be realized as a simple device combining the functionality of distance measurement or measurement of z-coordinates, with the additional option of measuring one or more transversal coordinates, thereby integrating the functionality of a PSD.

The detector specifically may use linear photodetectors, such as the near silicon photodiodes. The use of a beam splitter is optional but is not generally necessary, which allows for using a simple optical setup.

The result of the measurement, i.e. the position determined by the detector such as the at least one longitudinal coordinate, may be rendered widely independent from the brightness of the scenery and/or the brightness of the object, the brightness of the at least one beacon device, the brightness of the at least one illumination source or the total power of the light beam propagating from the object to the detector. Further, due to this independence and wide range of measurement in terms of brightness, reflective objects or non-reflective objects may be used.

When mentioning a range of measurement, the range of measurement may both refer to a range of brightness which may be used with the detector according to the present invention, such as a range of total powers of the light beam, or may refer to a range of distances between the detector and the object which may be measured. Conventional detectors, such as according to one or more of the documents listed above, are typically limited in both ranges of measurement. The use of the combined signal, as mentioned above, contrarily, provides a wide range of a continuously and monotonously decreasing or increasing functions which may be used to determine the longitudinal coordinate from the combined signal. Consequently, a very wide range of measurement in terms of distance between the object and the detector is given. Similarly, due to the general independence of the combined signal from the total power of the light beam, at least as long as no saturation of the optical sensors is reached, the present invention also provides a very wide range of measurement in terms of brightness, i.e. in terms of total power of the light beam.

Overall, in the context of the present invention, the following embodiments are regarded as preferred:

Embodiment 1: A detector for determining a position of at least one object, the detector having at least one sensor element having a matrix of optical sensors, the optical sensors each having a light-sensitive area, wherein each optical sensor is configured to generate at least one sensor signal in response to an illumination of the light-sensitive area by at least one light beam propagating from the object to the detector;

at least one evaluation device configured for evaluating the sensor signals, by a) determining at least one optical sensor having the highest sensor signal and forming at least one center signal;

b) evaluating the sensor signals of the optical sensors of the matrix and forming at least one sum signal;

c) determining at least one combined signal by combining the center signal and the sum signal; and d) determining at least one longitudinal coordinate z of the object by evaluating the combined signal.

Embodiment 2: The detector according to the preceding embodiment, wherein the center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Embodiment 3: The detector according to any one of the preceding embodiments, wherein the detector, specifically the evaluation device, is configured for transforming the sensor signals of the optical sensor, thereby generating secondary optical sensor signals, wherein the evaluation device is configured for performing steps a)-d) by using the secondary optical sensor signals.

Embodiment 4: The detector according to the preceding embodiment, wherein the transforming of the sensor signals comprises at least one transformation selected from the group consisting of: a filtering; a selection of at least one region of interest; a formation of a difference image between an image created by the sensor signals and at least one offset; an inversion of sensor signals by inverting an image created by the sensor signals; a formation of a difference image between an image created by the sensor signals at different times; a background correction; a decomposition into color channels; a decomposition into hue, saturation, and brightness channels, a frequency decomposition; a singular value decomposition; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image.

Embodiment 5: The detector according to any one of the preceding embodiments, wherein the evaluation device comprises at least one center detector for detecting the at least one highest sensor signal and/or for forming the center signal.

Embodiment 6: The detector according to the preceding embodiment, wherein the center detector is fully or partially integrated into the sensor element.

Embodiment 7: The detector according to any one of the two preceding embodiments, wherein the center detector is fully or partially embodied in one or both of software or hardware.

Embodiment 8: The detector according to any one of the preceding embodiments, wherein the sum signal is selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal.

Embodiment 9: The detector according to the preceding embodiment, wherein the evaluation device comprises at least one summing device for forming the sum signal.

Embodiment 10: The detector according to the preceding embodiment, wherein the summing device is fully or partially integrated into the sensor element.

Embodiment 11: The detector according to any one of the two preceding embodiments, wherein the summing device is fully or partially embodied in one or both of software or hardware.

Embodiment 12: The detector according to any one of the preceding embodiments, wherein the combined signal is a combined signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of a first linear combination of the center signal and the sum signal and a second linear combination of the center signal and the sum signal.

Embodiment 13: The detector according to any one of the preceding embodiments, wherein the evaluation device is configured for deriving the combined signal Q by $$Q(z_O) = \frac{\int\int_{A_1} E(x, y; z_O) dx dy}{\int\int_{A_2} E(x, y; z_O) dx dy}$$

wherein x and y are transversal coordinates, A1 and A2 are areas of the beam profile at the sensor position, and $E(x,y,z_o)$ denotes the beam profile given at the object distance $z_o$.

Embodiment 14: The detector according to any one of the preceding embodiments, wherein the evaluation device is configured for using at least one predetermined relationship between the combined signal Q and the longitudinal coordinate for determining the longitudinal coordinate.

Embodiment 15: The detector according to the preceding embodiment, wherein the predetermined relationship is one or more of an empiric relationship, a semi-empiric relationship and an analytically derived relationship.

Embodiment 16: The detector according to any one of the two preceding embodiments, wherein the evaluation device comprises at least one data storage device for storing the predetermined relationship.

Embodiment 17: The detector according to any one of the four preceding embodiments, wherein the evaluation device comprises at least one divider, wherein the divider is configured for deriving the combined signal.

Embodiment 18: The detector according to the preceding embodiment, wherein the divider is fully or partially embodied as one or both of a software divider or a hardware divider.

Embodiment 19: The detector according to any one of the two preceding embodiments, wherein the divider is fully or partially integrated into the sensor element.

Embodiment 20: The detector according to any one of the preceding embodiments, wherein the optical sensors are photodetectors, preferably inorganic photodetectors, more preferably inorganic semiconductor photodetectors, most preferably silicon photodetectors.

Embodiment 21: The detector according to any one of the preceding embodiments, wherein the optical sensors are sensitive in the infrared spectral range.

Embodiment 22: The detector according to any one of the preceding embodiments, wherein the matrix comprises one or both of a CCD detector, preferably a CCD detector chip, or a CMOS detector, preferably a CMOS detector chip.

Embodiment 23: The detector according to any one of the preceding embodiments, wherein the matrix is a rectangular matrix having at least one row, preferably a plurality of rows, and a plurality of columns.

Embodiment 24: The detector according to the preceding embodiment, wherein the rows and columns are oriented essentially perpendicular.

Embodiment 25: The detector according to any one of the two preceding embodiments, wherein the matrix has at least 10 rows, preferably at least 50 rows, more preferably at least 100 rows.

Embodiment 26: The detector according to any one of the three preceding embodiments, wherein the matrix has at least 10 columns, preferably at least 50 columns, more preferably at least 100 columns.

Embodiment 27: The detector according to any one of the preceding embodiments, wherein the matrix comprises at least 50 optical sensors, preferably at least 100 optical sensors, more preferably at least 500 optical sensors.

Embodiment 28: The detector according to any one of the four preceding embodiments, wherein the ratio of the number of rows and the number of columns is close to 1 preferable larger than 1:3, more preferably larger than 1:2.

Embodiment 29: The detector according to any one of the preceding embodiments, wherein the sensor element is oriented essentially perpendicular to an optical axis of the detector.

Embodiment 30: The detector according to any one of the preceding embodiments, wherein the optical sensors each have, at least within a range of measurement, a linear signal characteristic such that the respective sensor signals are dependent on the total power of illumination of the respective optical sensor.

Embodiment 31: The detector according to any one of the preceding embodiments, wherein the detector further comprises an illumination source for illuminating the object.

Embodiment 32: The detector according to the preceding embodiment, wherein the illumination source is configured for generating an illuminating light beam for illuminating the object, wherein the detector is configured such that the illuminating light beam propagates from the detector towards the object along an optical axis of the detector.

Embodiment 33: The detector according to the preceding embodiment, wherein the detector comprises at least one reflective element, preferably at least one prism, for deflecting the illuminating light beam onto the optical axis.

Embodiment 34: The detector according to any one of the three preceding embodiments, wherein the illumination source is adapted to generate at least one illumination pattern for illumination of the object, wherein the illumination pattern comprises at least one pattern selected from the group consisting of: at least one point pattern, in particular a pseudo-random point pattern or a random point pattern; at least one Sobol pattern; at least one quasiperiodic pattern; at least one pattern comprising at least one pre-known feature; at least one regular pattern; at least one triangular pattern; at least one hexagonal pattern, in particular a rotated hexagonal pattern and/or a displaced hexagonal pattern; at least one rectangular pattern at least one pattern comprising convex uniform tilings.

Embodiment 35: The detector according to the preceding embodiment, wherein the optical sensors are adapted to determine at least one reflection pattern, wherein the evaluation device is adapted to select at least one feature of the reflection pattern and to determine the longitudinal coordinate z of the selected feature of the reflection pattern by evaluating the combined signal Q.

Embodiment 36: The detector according to any one of the preceding embodiments, wherein the detector further comprises at least one transfer device, the transfer device being adapted to guide the light beam onto the optical sensors.

Embodiment 37: The detector according to the preceding embodiment, wherein the transfer device comprises one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system.

Embodiment 38: The detector according to any one of the preceding embodiments, wherein the evaluation device is further configured for determining at least one transversal coordinate of the object by evaluating a transversal position of the at least one optical sensor having the highest sensor signal.

Embodiment 39: The detector according to any one of the preceding embodiments, wherein the evaluation device is configured for distinguishing different light beams having different modulations.

Embodiment 40: The detector according to any one of the preceding embodiments, wherein the detector comprises at least one illumination source, wherein the illumination source is adapted to illuminate the object with at least one illumination light beam, wherein the illumination source is arranged such that a direction of propagation of the illumination light beam is essentially parallel to the optical axis.

Embodiment 41: The detector according to any one of the preceding embodiments, wherein the detector comprises the at least one illumination source, wherein the illumination source and the optical axis are separated by a small baseline.

Embodiment 42: A detector system for determining a position of at least one object, the detector system comprising at least one detector according to any one of the preceding embodiments, the detector system further comprising at least one beacon device adapted to direct at least one light beam towards the detector, wherein the beacon device is at least one of attachable to the object, holdable by the object and integratable into the object.

Embodiment 43: A human-machine interface for exchanging at least one item of information between a user and a machine, wherein the human-machine interface comprises at least one detector system according to the preceding embodiment, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

Embodiment 44: An entertainment device for carrying out at least one entertainment function, wherein the entertainment device comprises at least one human-machine interface according to the preceding embodiment, wherein the entertainment device is designed to enable at least one item of information to be input by a player by means of the human-machine interface, wherein the entertainment device is designed to vary the entertainment function in accordance with the information.

Embodiment 45: A tracking system for tracking a position of at least one movable object, the tracking system comprising at least one detector system according to any one of the preceding embodiments referring to a detector system, the tracking system further comprising at least one track controller, wherein the track controller is adapted to track a series of positions of the object at specific points in time.

Embodiment 46: A scanning system for determining a depth profile of a scenery, the scanning system comprising at least one detector according to any of the preceding embodiments referring to a detector, the scanning system further comprising at least one illumination source adapted to scan the scenery with at least one light beam.

Embodiment 47: A camera for imaging at least one object, the camera comprising at least one detector according to any one of the preceding embodiments referring to a detector.

Embodiment 48: An inertial measurement unit for use in an electronic device, wherein the inertial measurement unit is adapted to receive data determined by at least one detector according to any one of the preceding embodiment referring to a detector, wherein the inertial measurement unit further is adapted to receive data determined by at least one further sensor selected from the group consisting of: a wheel speed sensor, a turn rate sensor, an inclination sensor, an orientation sensor, a motion sensor, a magneto hydro dynamic sensor, a force sensor, an angular sensor, an angular rate sensor, a magnetic field sensor, a magnetometer, an accelerometer; a gyroscope, wherein the inertial measurement unit is adapted to determine by evaluating the data from the detector and the at least one further sensor at least one property of the electronic device selected from the group consisting of: position in space, relative or absolute motion, rotation, acceleration, orientation, angle position, inclination, turn rate, speed.

Embodiment 49: A method for determining a position of at least one object by using at least one detector, the method comprising the following steps:

illuminating at least one sensor element of the detector with at least one light beam propagating from the object to the detector, the detector having a matrix of optical sensors, the optical sensors each having a light-sensitive area, wherein each optical sensor generates at least one sensor signal in response to the illumination;

evaluating the sensor signals, by a) determining at least one optical sensor having the highest sensor signal and forming at least one center signal;

b) evaluating the sensor signals of the optical sensors of the matrix and forming at least one sum signal;

c) determining at least one combined signal by combining the center signal and the sum signal; and d) determining at least one longitudinal coordinate z of the object by evaluating the combined signal.

Embodiment 50: The method according to the preceding embodiment, wherein the combined signal is a combined signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of a first linear combination of the center signal and the sum signal and a second linear combination of the center signal and the sum signal.

Embodiment 51: The method according to the preceding embodiment, wherein the determining the longitudinal coordinate comprises evaluating the combined signal Q, wherein the evaluating the combined signal comprises using at least one predetermined relationship between the combined signal Q and the longitudinal coordinate for determining the longitudinal coordinate.

Embodiment 52: The method according to any one of the preceding method embodiments, wherein the method comprises using the detector according to any one of the preceding claims referring to a detector.

Embodiment 53: A use of the detector according to any one of the preceding embodiments relating to a detector, for a purpose of use, selected from the group consisting of: a position measurement in traffic technology; an entertainment application; a security application; a surveillance application; a safety application; a human-machine interface application; a tracking application; a photography application; a logistics application; a machine vision application; a robotics application; a quality control application; a manufacturing application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
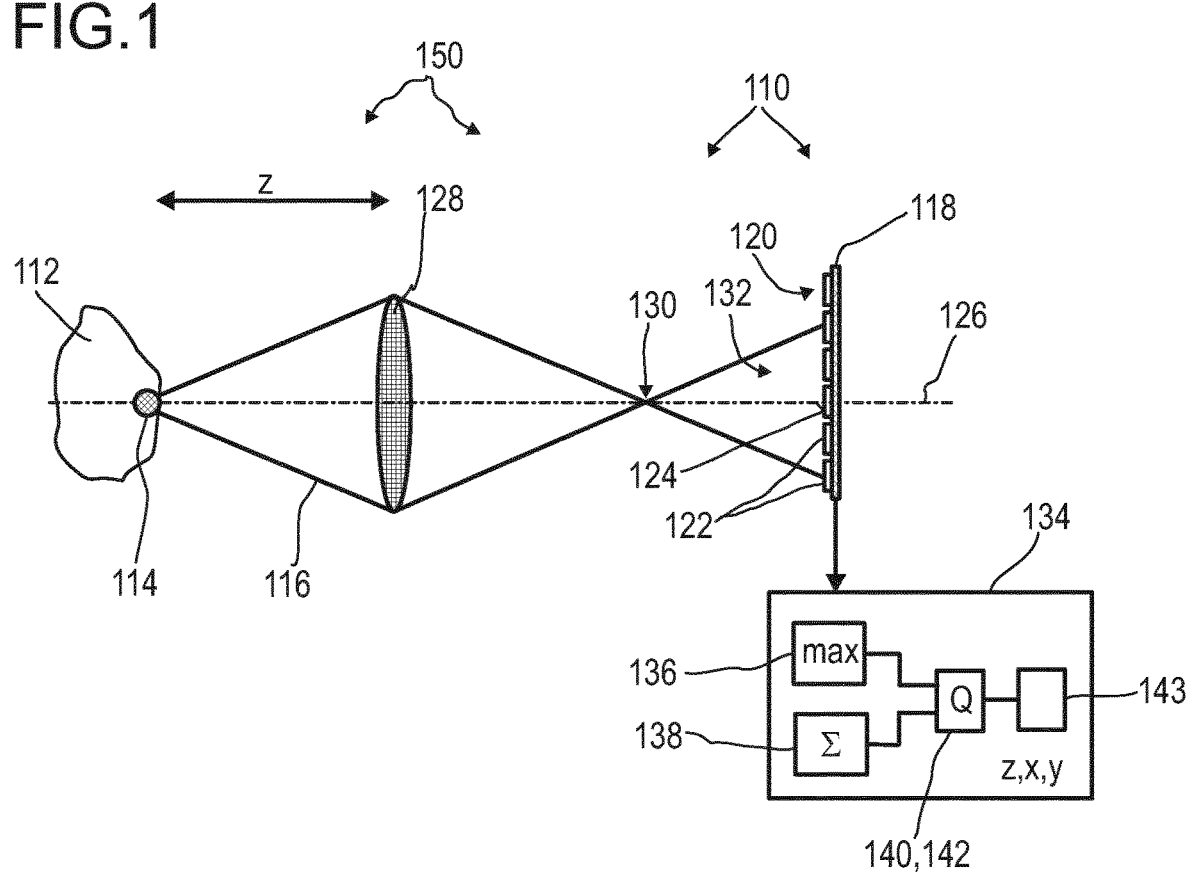
FIGS. 1 and 2 show different embodiments of a detector according to the present invention.

In FIG. 1, a schematic view of an embodiment of a detector 110 for determining a position of at least one object 112 is depicted. In this case, the object 112 comprises a beacon device 114, from which a light beam 116 propagates towards a sensor element 118. The sensor element 118 comprises a matrix 120 of optical sensors 122, each optical sensor 122 having a light-sensitive area 124 facing the object 112. The light beam 116, as an example, may propagate along an optical axis 126 of the detector 110. Other embodiments, however, are feasible. The optical detector 110, further, may comprise at least one transfer device 128, such as at least one lens and/or at least one lens system, specifically for beam shaping. Consequently, the light beam 116 may be focused, such as in one or more focal points 130, and a beam width of the light beam 116 may depend on a longitudinal coordinate z of the object 112, such as on a distance between the detector 110 and the beacon device 114 and/or the object 112. For details of this beam width dependency on the longitudinal coordinate, reference may be made to one or more of the above-mentioned prior art documents, such as to one or more of WO 2012/110924 A1 and/or WO 2014/097181 A1.

Figure 3:
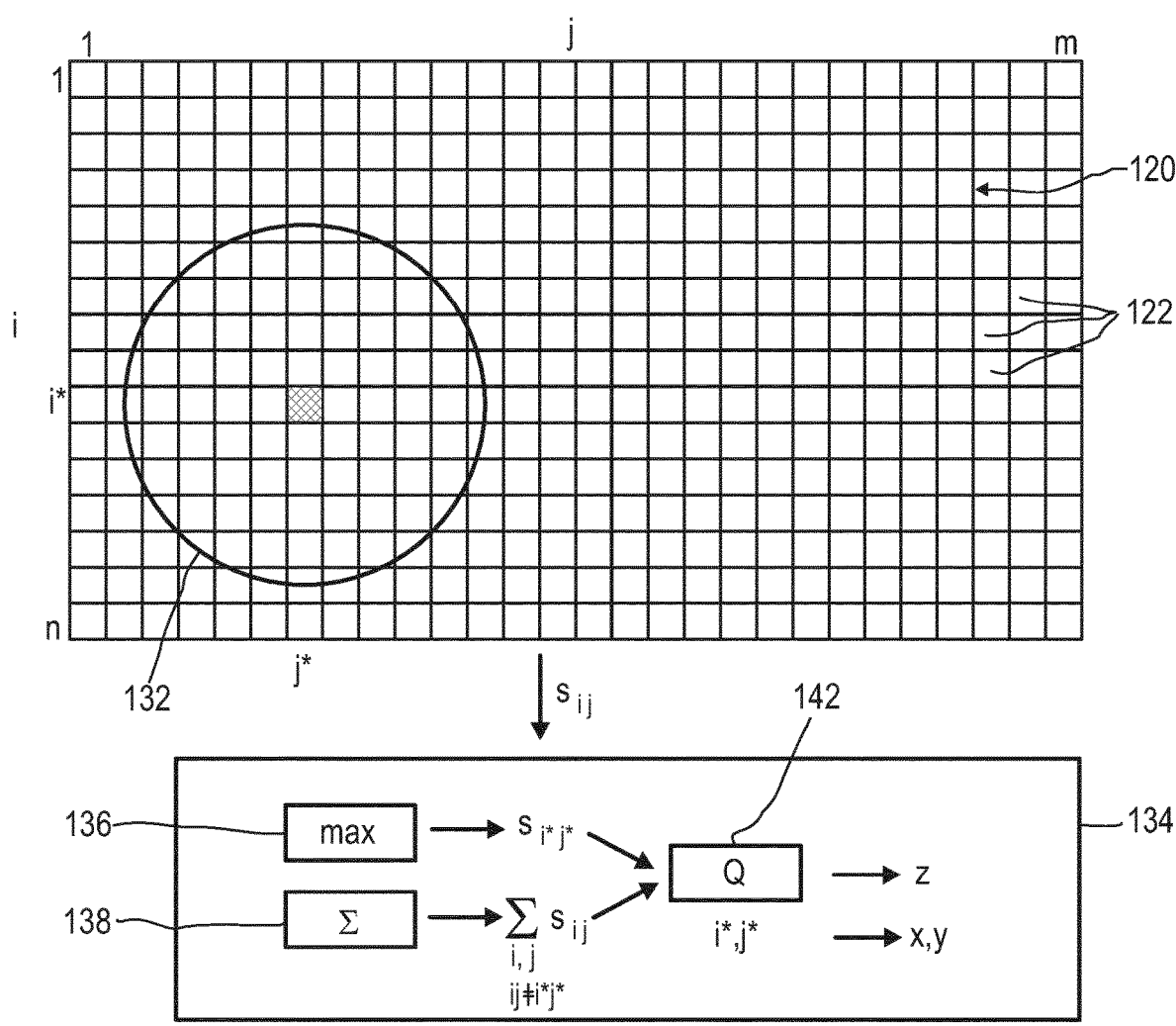
FIG. 3 shows an example of a light spot on a matrix of optical sensors and the evaluation thereof.

As can be seen in FIG. 1, the light beam 116 generates a light spot 132 on the matrix 120. In FIG. 3, an exemplary view of the light spot 132 on the matrix 120 is shown. As can be seen, in this exemplary embodiment, the matrix 120 specifically may be a rectangular matrix, with rows numbered by "i", from 1 to n, and with columns, denoted by "j", from 1 to m, with n, m being integers. The center of the light spot 132, in this exemplary embodiment, is located in the sensor element denoted by i*, j*. The optical sensors 122 may provide sensor signals $s_{ij}$ to an evaluation device 134 which, out of the sensor signals, determines at least one center signal, denoted symbolically by $s_{i*j*}$. As outlined in further detail above, for generating the center signal, the evaluation device 134 may comprise at least one center detector 136. As an example, the center detector simply may determine the maximum sensor signal out of the plurality of sensor signals generated by the optical sensors 122. Alternative methods are feasible. Thus, as an example, instead of determining a single maximum optical sensor signal, a plurality of sensor signals may be used for generating the center signal. Thus, as an example, neighboring optical sensors which are adjacent to the optical sensor i*, j* may contribute to the center signal, such as optical sensors with the coordinates i*−1, . . . , i*+1 and j*−1, . . . , j*+1. These coordinates, in the simple exemplary embodiment, may form a square around the optical sensor i*, j*. Instead of a square having a side length of 3, as in this embodiment, other environments around the optical sensor having the highest sensor signal may be used. Further, additionally or alternatively, the center signal may be generated by adding up and/or averaging over sensor signals within a certain range from the maximum sensor signal which may for example be beneficial to the measurement precision concerning noise such as pixel noise. Further, additionally or alternatively, for the determination of the center signal or sum signal, image processing techniques such as subpixel processing, interpolation, normalization or the like may be employed. Other alternatives are feasible. For example, the beam profile may be a trapezoid beam profile and the evaluation device 134 may be adapted to determine an integral of the trapezoid, in particular of a plateau of the trapezoid. Further, when trapezoid beam profiles may be assumed, the evaluation device 134 may be adopted to determine the sum and center signals by equivalent evaluations making use of properties of the trapezoid beam profile such as determination of the slope and position of the edges and of the height of the central plateau and deriving edge and center signals by geometric considerations.

Further, the evaluation device 134 is configured for determining at least one sum signal out of the sensor signals of the matrix 120. For this purpose, the evaluation device 134 may comprise at least one summing device 138. The summing device 138 may be configured for adding up, integrating or averaging over the sensor signals of the entire matrix 120, of a region of interest within the matrix 120, each option with or without the optical sensors from which the center signal is generated. Thus, in the exemplary embodiment shown in FIG. 3, the summing device is simply configured for summing over the sensor signals $s_{ij}$ of the entire matrix 120, except for the center optical detector with the coordinates i*, j*. Other options, however, are feasible.

The evaluation device 134 further is configured for forming at least one combined signal out of the center signal and the sum signal. For this purpose, the evaluation device 134, as an example, may comprise at least one combining device 140, such as at least one divider 142. As a very simple embodiment, a quotient Q may be formed, by dividing the center signal by the sum signal or vice versa. Other options are feasible and are given above.

Finally, the evaluation device 134 is configured for determining at least one longitudinal coordinate z of the object by evaluating the combined signal. For this purpose, the evaluation device may comprise at least one further component, such as at least one evaluation component, which is not depicted in the figures. It shall be noted that the components of the evaluation device 134 shown in FIG. 3 may fully or partially be embodied in hardware and/or software. Further, the components may fully or partially be embodied as independent or separate components, and/or may fully or partially be embodied as components which are integrated into the sensor element 118.

The embodiment of FIG. 3 further shows that, in addition to the longitudinal coordinate z, at least one item of information on a transversal coordinate of the object 112 and/or the beacon device 114 may be generated. Thus, the coordinates i* and j* provide additional items of information on a transversal position of the object 112 and/or the beacon device 114. In the setup of FIG. 1, the beacon device 114, for the sake of simplicity, is positioned in the center, i.e. on the optical axis 126. In this case, the light spot 132 is likely to be centered in the middle of the matrix 120. In the embodiment shown in FIG. 3, however, as can easily be detected, the light spot 132 is off-centered. This off-centering is characterized by the coordinates i*, j*. By using known optical relationships between this off-centering and a transversal position of the object 112 and/or the beacon device 114, such as by using the lens equation, at least one transversal coordinate of the object 112 and/or the beacon device 114 may be generated. This option is also shown in the exemplary embodiment of FIG. 3.

Figure 2:
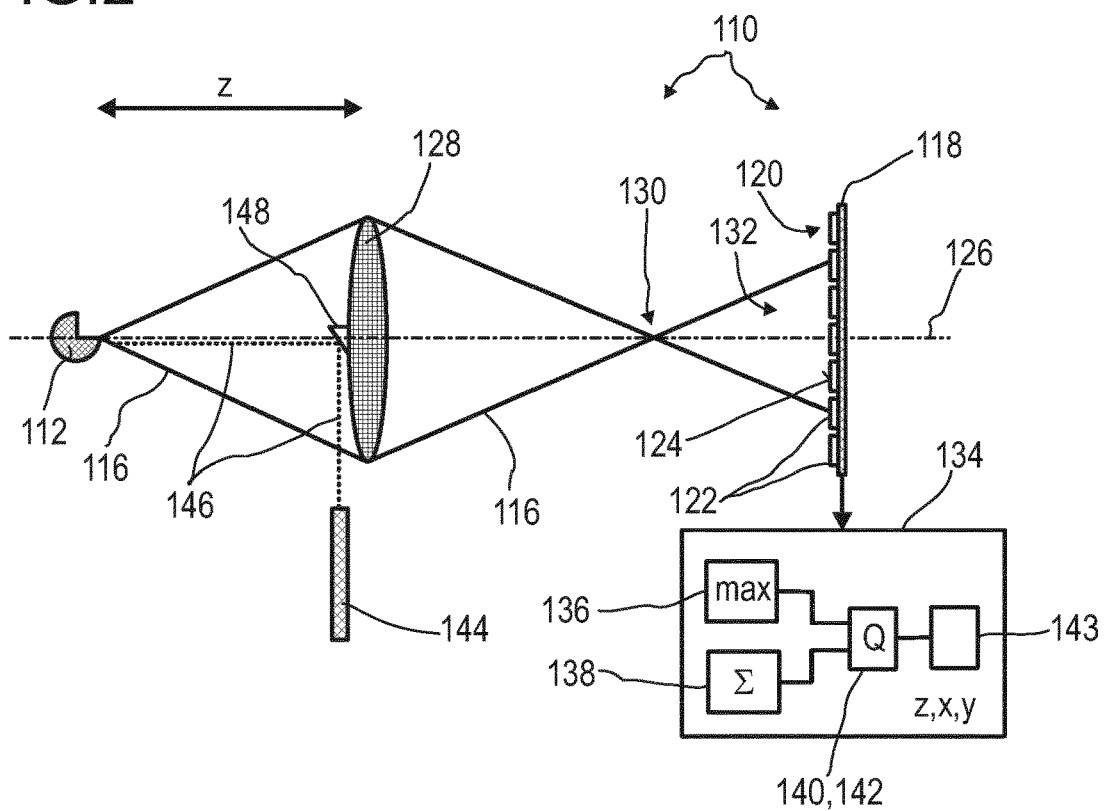

In FIG. 2, a modification of the embodiment of FIG. 1 is shown, which forms an alternative detector 110. The alternative embodiment of the detector 110 widely corresponds to the embodiment shown in FIG. 1. Instead of using an active beacon device 114 with light-emitting properties for generating the light beam 116, however, the detector 110 itself comprises at least one illumination source 144. The illumination source 144, as an example, may comprise at least one laser, whereas, in FIG. 1, as an example, the beacon device 114 may comprise a light-emitting diode (LED). Other embodiments, however, are feasible. The illumination source 144 may be configured for generating at least one illumination light beam 146 for fully or partially illuminating the object 112. The illumination light beam 146 is fully or partially reflected by the object 112 and travels back towards the detector 110, thereby forming the light beam 116.

As shown in FIG. 2, as an example, the illumination light beam 146 may be parallel to the optical axis 126 of the detector 110. Other embodiments, i.e. off-axis illumination and/or illumination at an angle, are feasible, too, as will be shown in the context of FIGS. 6A and 6B below. In order to provide an on-axis illumination, as shown in FIG. 2, as an example, one or more reflective elements 148 may be used, such as one or more prisms and/or mirrors, such as dichroitic mirrors, such as movable mirrors or movable prisms.

Apart from these modifications, the setup of the embodiment in FIG. 2 corresponds to the setup in FIG. 1. Thus, again, an evaluation device 134 may be used, having e.g. at least one divider 142 for forming the combined signal Q, and, as an example, at least one position evaluation device 143, for deriving the at least one longitudinal coordinate z from the combined signal Q and/or another type of combined signal. It shall be noted that the evaluation device 134, again, may fully or partially be embodied in hardware and/or software. Thus, as an example, one or more of components 136, 138, 140, 142, 143 may fully or partially be embodied by appropriate software components and/or may fully or partially be embodied by hardware components.

The optical sensors 122 of the matrix 120, as an example, may be pixels of a pixelated optical sensor, such as a CCD and/or a CMOS sensor chip. Thus, as an example, the optical sensors 122 may have a side length and/or an equivalent diameter in the range of a few micrometers to several hundred micrometers. It shall be noted, however, that larger pixels or optical sensors 122 may be used. Further, instead of using an integrated sensor element 118 such as a CCD and/or CMOS sensor chip, non-integrated matrices may be used.

Figure 4:
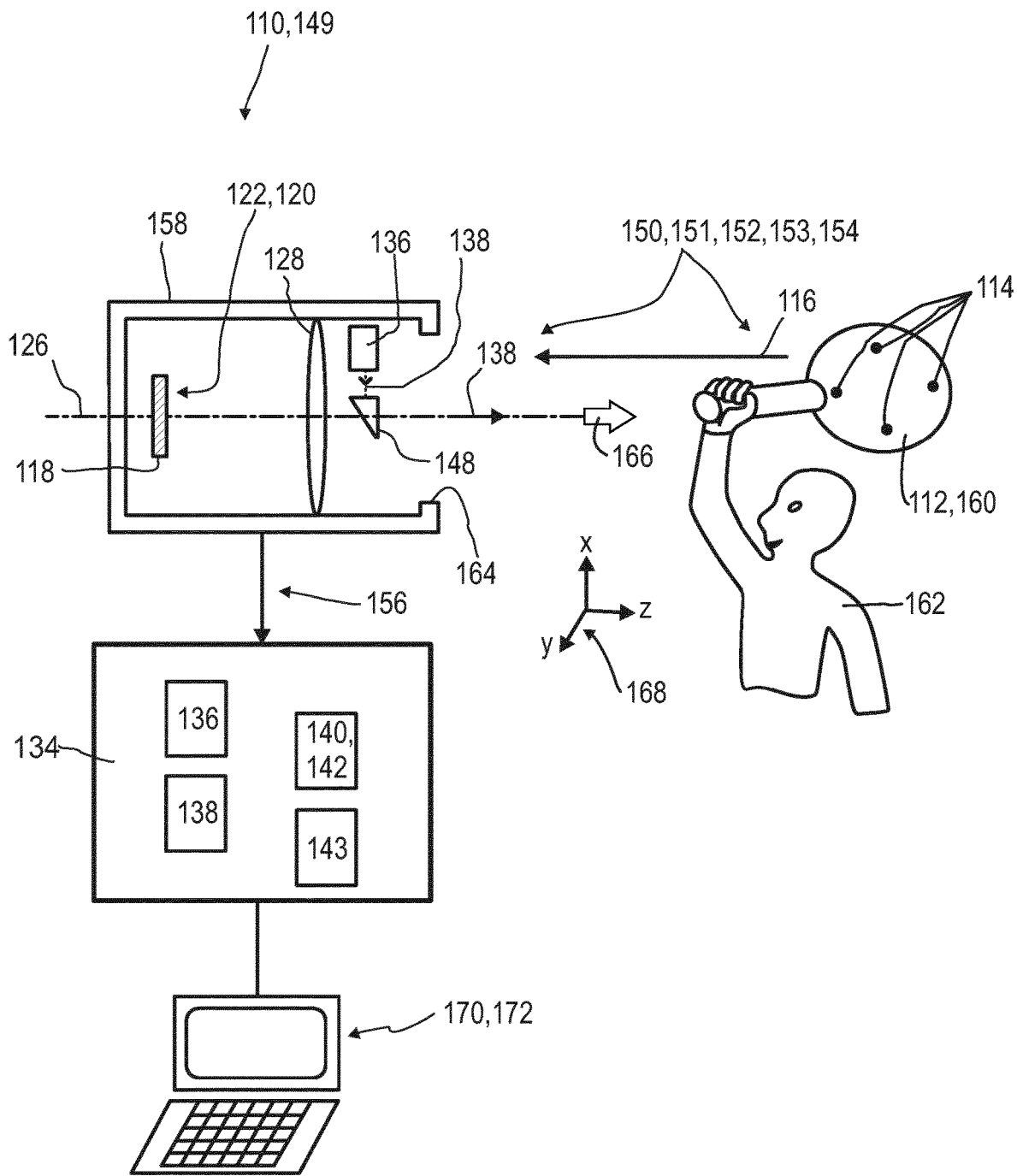
FIG. 4 shows an exemplary embodiment of a detector according to the present invention; a detector system, a human machine interface, an entertainment device, a tracking system, a scanning system and a camera.

FIG. 4 shows, in a highly schematic illustration, an exemplary embodiment of a detector 110, e.g. according to the embodiments in FIG. 1 or 2. The detector 110, specifically, may be embodied as a camera 149 and/or may be part of a camera 149. The camera 149 may be made for imaging, specifically for 3D imaging, and may be made for acquiring standstill images and/or image sequences such as digital video clips. Other embodiments are feasible.

FIG. 4 further shows an embodiment of a detector system 150, which, besides the at least one detector 110, comprises one or more beacon devices 114, which, in this example, may be attached to and/or integrated into an object 112, the position of which shall be detected by using the detector 110. FIG. 4 further shows an exemplary embodiment of a human-machine interface 151, which comprises the at least one detector system 150 and, further, an entertainment device 152, which comprises the human-machine interface 151. The figure further shows an embodiment of a tracking system 153 for tracking a position of the object 112, which comprises the detector system 150. The components of the devices and systems shall be explained in further detail below.

FIG. 4 further shows an exemplary embodiment of a scanning system 154 for scanning a scenery comprising the at least one object 112, such as for scanning the object 112 and/or for determining at least one position of the at least one object 112. The scanning system 154 comprises the at least one detector 110 and, further, optionally, the at least one illumination source 136 as well as, optionally, at least one further illumination source 136, which is not shown. The illumination source 136, generally, may be configured to emit the at least one illumination light beam 138, such as for illumination of at least one dot, e.g. a dot located on one or more of the positions of the beacon devices 114 and/or on a surface of the object 112. It shall be noted, however, that an active beacon device, as e.g. shown in the setup of FIG. 1, may also be used, and, thus, that setups with no integrated illumination source 136 are also feasible. The scanning system 134 may be designed to generate a profile of the scenery including the object 112 and/or a profile of the object 112 and/or may be designed to generate at least one item of information about the distance between the at least one dot and the scanning system 154, specifically the detector 110, by using the at least one detector 110.

As outlined above, an exemplary embodiment of the detector 110 which may be used in the setup of FIG. 4 is shown in FIGS. 1 and 2. Thus, the detector 110, besides the sensor element 118, comprises the at least one evaluation device 134, having, e.g., the at least one center detector 136, the at least one summing device 138, the at least one combining device 140, the at least one divider 142, the at least one position evaluation device 143 and/or combinations thereof. These components, which may optionally be present, are symbolically depicted in FIG. 4. The components of the evaluation device 134 may fully or partially be integrated into a distinct device and/or may fully or partially be integrated into other components of the detector 110. Besides the possibility of fully or partially combining two or more components, one or more of the components of the evaluation device 134 and one or more of the components of the sensor element 118 may be interconnected by one or more connectors 156 and/or by one or more interfaces, as symbolically depicted in FIG. 4. Further, the one or more connectors 156 may comprise one or more drivers and/or one or more devices for modifying or preprocessing sensor signals. Further, instead of using the at least one optional connector 156, the evaluation device 134 may fully or partially be integrated into one or both of the sensor element 118 and/or into a housing 158 of the detector 110. Additionally or alternatively, the evaluation device 134 may fully or partially be designed as a separate device.

In this exemplary embodiment, the object 112, the position of which may be detected, may be designed as an article of sports equipment and/or may form a control element or a control device 160, the position of which may be manipulated by a user 162. As an example, the object 112 may be or may comprise a bat, a racket, a club or any other article of sports equipment and/or fake sports equipment. Other types of objects 112 are possible. Further, the user 162 himself or herself may be considered as the object 112, the position of which shall be detected.

As outlined above, the detector 110 comprises at least the sensor element 118. The sensor 118, wherein one or more of the sensor elements 118 may be provided, may be located inside the housing 158 of the detector 110. Further, the at least one transfer device 128 may be comprised, such as one or more optical systems, preferably comprising one or more lenses.

An opening 164 inside the housing 158, which, preferably, is located concentrically with regard to the optical axis 126 of the detector 110, preferably defines a direction of view 166 of the detector 110. A coordinate system 168 may be defined, in which a direction parallel or antiparallel to the optical axis 126, such as parallel or antiparallel to the direction of view 166, may be defined as a transversal direction. In the coordinate system 168, symbolically depicted in FIG. 4, a longitudinal direction is denoted by z, and transversal directions are denoted by x and y, respectively. Other types of coordinate systems 168 are feasible, such as non-Cartesian coordinate systems.

The detector 110 may comprise the sensor element 118 as well as, optionally, one or more further optical sensors. A non-branched beam path may be used or, alternatively, a branched beam path may be possible, with, e.g., additional optical sensors in one or more additional beam paths, such as by branching off a beam path for at least one transversal detector or transversal sensor for determining the transversal coordinates of the object 112 and/or parts thereof. As outlined above, however, in the context of FIG. 3, the at least one transversal coordinate may also be determined by the sensor element 118 itself, such as by determining the transversal coordinates of the center of the light spot 132.

One or more light beams 116 are propagating from the object 112 and/or from one or more of the beacon devices 114, towards the detector 110. The detector 110 is configured for determining a position of the at least one object 112. For this purpose, as outlined above in the context of FIGS. 1 to 3, the evaluation device 134 may be configured to evaluate the sensor signals provided by the optical sensors 122 of the matrix 120 of the sensor element 118. The detector 110 is adapted to determine a position of the object 112, and the optical sensors 122 are adapted to detect the light beam 116 propagating from the object 112 towards the detector 110, specifically from one or more of the beacon devices 114. In case no illumination source 136 is used, the beacon devices 114 and/or at least one of these beacon devices 114 may comprise active beacon devices with an integrated illumination source such as light-emitting diodes. In case the illumination source 136 is used, the beacon devices do not necessarily have to be active beacon devices. Contrarily, a reflective surface of the object 112 may be used, such as integrated reflective beacon devices 114 having at least one reflective surface. The light beam 116, directly and/or after being modified by the transfer device 128, such as being focused by one or more lenses, illuminates the sensor element 118. For details of the evaluation, reference may be made to FIGS. 1 to 3 above.

As outlined above, the determination of the position of the object 112 and/or a part thereof by using the detector 110 may be used for providing a human-machine interface 151, in order to provide at least one item of information to a machine 170. In the embodiments schematically depicted in FIG. 4, the machine 170 may be a computer and/or may comprise a computer. Other embodiments are feasible. The evaluation device 134 may even be fully or partially integrated into the machine 170, such as into the computer.

As outlined above, FIG. 4 also depicts an example of a tracking system 153, configured for tracking the position of the at least one object 112 and/or of parts thereof. The tracking system 153 comprises the detector 110 and at least one track controller 172. The track controller 172 may be adapted to track a series of positions of the object 112 at specific points in time. The track controller 172 may be an independent device and/or may fully or partially be integrated into the machine 170, specifically the computer, as indicated in FIG. 4, and/or into the evaluation device 134.

Similarly, as outlined above, the human-machine interface 151 may form part of an entertainment device 152. The machine 170, specifically the computer, may also form part of the entertainment device 152. Thus, by means of the user 162 functioning as the object 112 and/or by means of the user 162 handling a control device 160 functioning as the object 112, the user 162 may input at least one item of information, such as at least one control command, into the computer, thereby varying the entertainment functions, such as controlling the course of a computer game.

Figure 5:
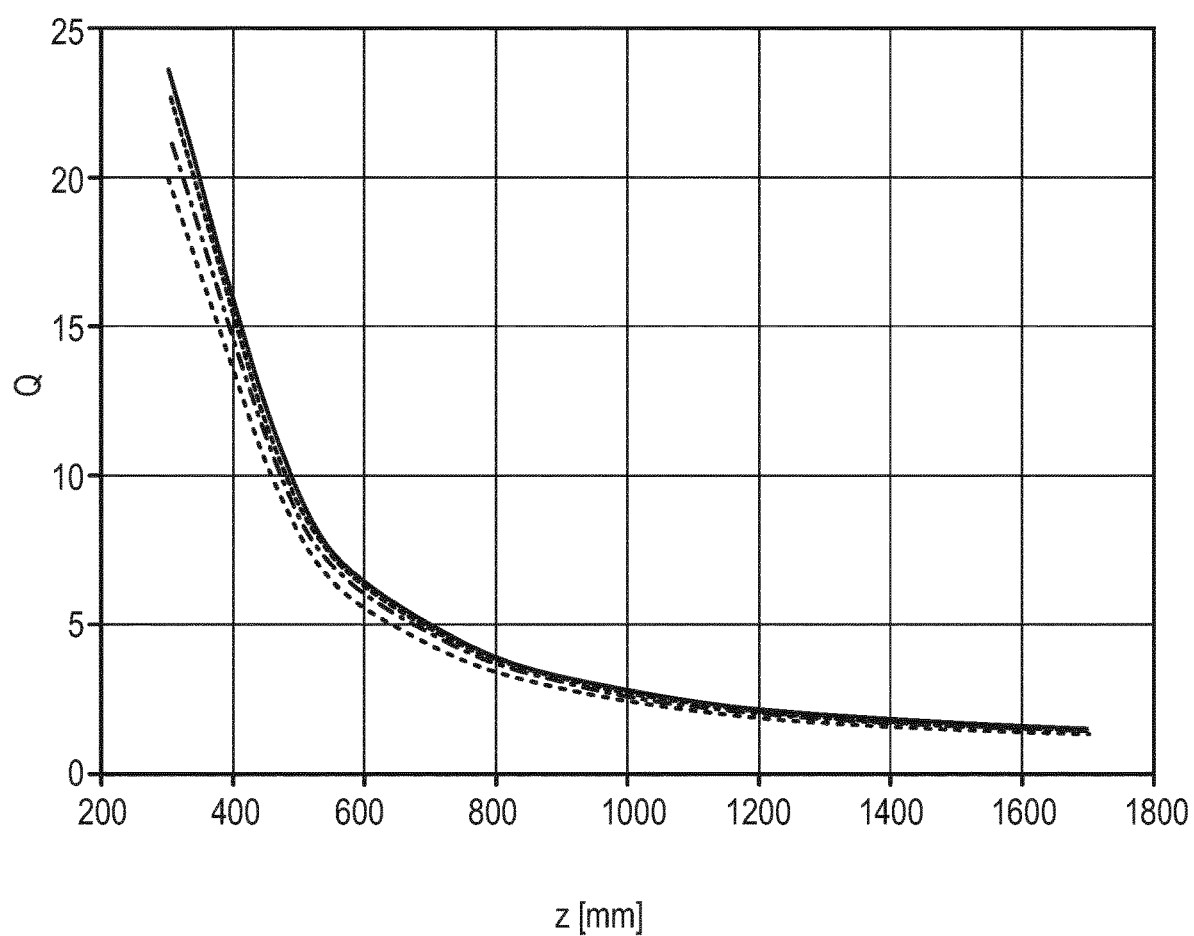
FIG. 5 shows an exemplary embodiment of a combined signal Q as a function of a longitudinal coordinate z, for various illumination intensities.

In FIG. 5, experimental data are shown which demonstrate an exemplary embodiment of the present invention in terms of measurement data. The figure shows a combined signal Q as a function of a longitudinal coordinate z, given in millimeters, for various illumination intensities.

In order to gain the experimental data shown in FIG. 5, an experimental setup was used with a sensor element 118 formed by a Basler AC 1920-40GC camera, with a transfer device 128 formed by a Nikkor 50 mm lens.

As a beacon device 114, a light-emitting diode (LED) was used, having a central nominal wavelength of 532 nm. A diffusor was used in front of the LED and a diaphragm, in order to provide a well-defined light-emitting area having a diameter of 5 mm. The intensity of the LED was varied, by varying a drive current of the LED between 5 mA and 150 mA.

In the experiments, the distance z between the LED and the lens was varied from 300 mm to 1700 mm. The signal of the Basler AC 1920-40GC camera was evaluated by the following procedure. As a center signal, an accumulated signal of an inner circle having a radius of 15 pixels around the optical axis was determined, with the light spot centered at the optical axis. As a sum signal, the sum of the signals of all pixels of the camera within the light spot was generated. A combined signal was formed, by dividing the sum signal by the center signal.

In FIG. 5, the solid curves, overlapping, show the combined signal curves for LED currents of 150 mA, 125 mA, 100 mA and 50 mA. As can be seen, there are basically no differences between these curves, within the whole measurement range. This experiment clearly shows that the combined signal is widely independent on the total power of the light beam. Only at lower intensities, the curves may be distinguished. Thus, the dotted curve shows measurements at an LED current of 25 mA, the dashed-dotted line at an LED current of 10 mA, and the dashed line at an LED current of 5 mA. Still, even at these low intensities, the measurement curves are very close to the solid curves, which shows the high tolerances of the measurement.

Figure 6A:
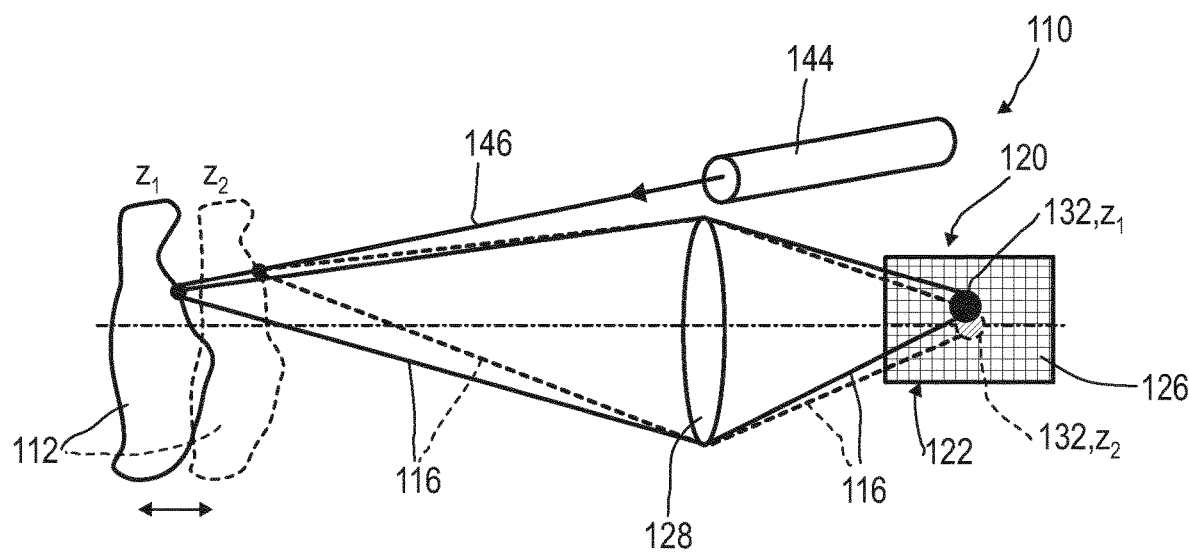
FIGS. 6A and 6B show a modification of the embodiment of FIG. 2, with an off-axis illumination light beam.
Figure 6B:
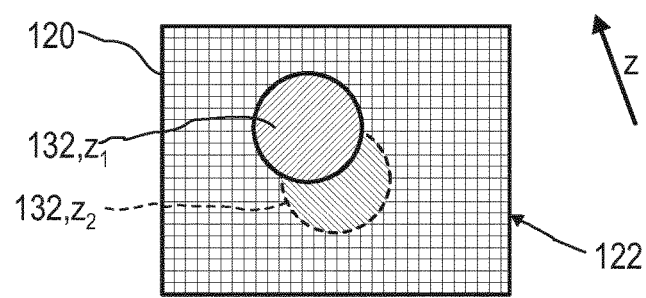

In FIGS. 6A and 6B, an alternative embodiment of the detector 110 is shown which is a modification of the setup shown in FIG. 2. Thus, for most elements and optional details as well as further elements not shown in the schematic FIGS. 6A and 6B, reference may be made to the description of FIG. 2 above.

In FIG. 2, the illumination light beam 146, as discussed above, preferably travels along the optical axis 126, i.e. parallel to the optical axis 126 or even on the optical axis 126. In the setup, the position of the center of the light spot 132 typically does not depend on the z-coordinate of the object 112, such as on a distance between the object 112 and the detector 110. In other words, the diameter or equivalent diameter of the light spot 132 changes with the distance between the object 112 and the detector 110 whereas, typically, the position of the light spot 132 on the matrix 120 does not.

Contrarily, in FIGS. 6A and 6B, a setup of the detector 110 is shown in which an illumination light beam 146 travels off-axis, i.e. one or both of at an angle other than 0° with the optical axis 126 or parallel to the optical axis 126 but shifted from the optical axis 126. This embodiment, as will be discussed in further detail below, demonstrates that the method according to the present invention can be further enhanced by increasing the z-dependency of a combined sensor signal. Thus, in FIG. 6A, a side view is shown with two different positions of the object 112, i.e. a first position at $z_1$, drawn in solid lines, and a second position at $z_2$, drawn in dashed lines. As can be seen, the illumination light beam 146 which, as an example, propagates at an angle of 5° to 30°, e.g. 10° to 20°, with the optical axis 126, hits the object 112 in both cases at different positions. From these points of the object 112 illuminated by the illumination light beam 146, light beams 116 propagate towards the detector 110, wherein, again, the light beam 116 for the object 112 being located at position $z_1$ is drawn in solid lines, wherein the light beam 116 for the object 112 being located at position $z_2$ is drawn in dashed lines.

In FIG. 6B, the matrix 120 is shown in an enlarged fashion. As can be seen in this setup, the position of the light spot 132 moves with the longitudinal position z of the object 112. Thus, not only is the size of the light spot 132 affected by the longitudinal position z but also is the position on the matrix 120 of the light spot 132 changed. In FIG. 6B, this movement of the light spot 132 is denoted by arrow z.

Consequently, by this movement of the light spot 132, the z-dependency of a combined signal taking into account at least two sensor signals of the optical sensor 122 may be increased.

In the situation shown in FIG. 2, the position of the light spot 132 does not depend on z. With a change in z, depending on the optical situation, the spot will become larger or smaller, such as by becoming more diffuse or more focused. In case the spot size increases and the spot becomes more diffuse such that the combined signal $Q=s_{center}/s_{sum}$ decreases.

Contrarily, in the situation of FIG. 6A, both the size and the position of the light spot 132 are dependent on the z-coordinate. Thus, the tendency of the z-dependency of the combined signal such as the combined signal Q will be increased. In the situation of FIG. 2, depending on the z-coordinate, the sensor signal of at least one optical sensor of the matrix will increase and simultaneously the sensor signal of at least one different sensor will decrease, resulting in the z-dependent combined signal Q. In the situation of FIG. 6A, the position dependency of the light spot 132 can result in three different situations depending on the relative position of light source, optical axis, and sensor, especially in case the center signal and sum signal are determined from one or more optical sensors, whereas the optical sensors used for determining the center signal and sum signal are kept fixed, independent of the z-coordinate and/or position of the light spot: Firstly, the position dependency of the light spot may result in a further decrease of the at least one decreasing sensor signal depending on the z-coordinate, while, simultaneously, the position dependency of the light spot may result in a further increase of the at least one decreasing sensor signal depending on the z-coordinate compared to the situation in FIG. 2. Secondly, the position dependency of the light spot may result in a reduced decrease or even increase of the at least one decreasing sensor signal depending on the z-coordinate, while, simultaneously, the position dependency of the light spot may result in a reduced increase or even decrease of the at least one decreasing sensor signal depending on the z-coordinate compared to the situation in FIG. 2. Thirdly, the position dependency of the light spot may be as such that the z-dependence of the sensor signals is largely unchanged compared to the situation in FIG. 2. However, according to the present invention, object distance is not determined from the position of the light spot on a sensor as done in triangulation methods. Instead, movement of the light spot 132 on the matrix 120 may be used to enhance dynamic of the sensor signals and or the resulting combined signal Q which may result in an enhanced dynamic of the z-dependency.

Figure 6C:
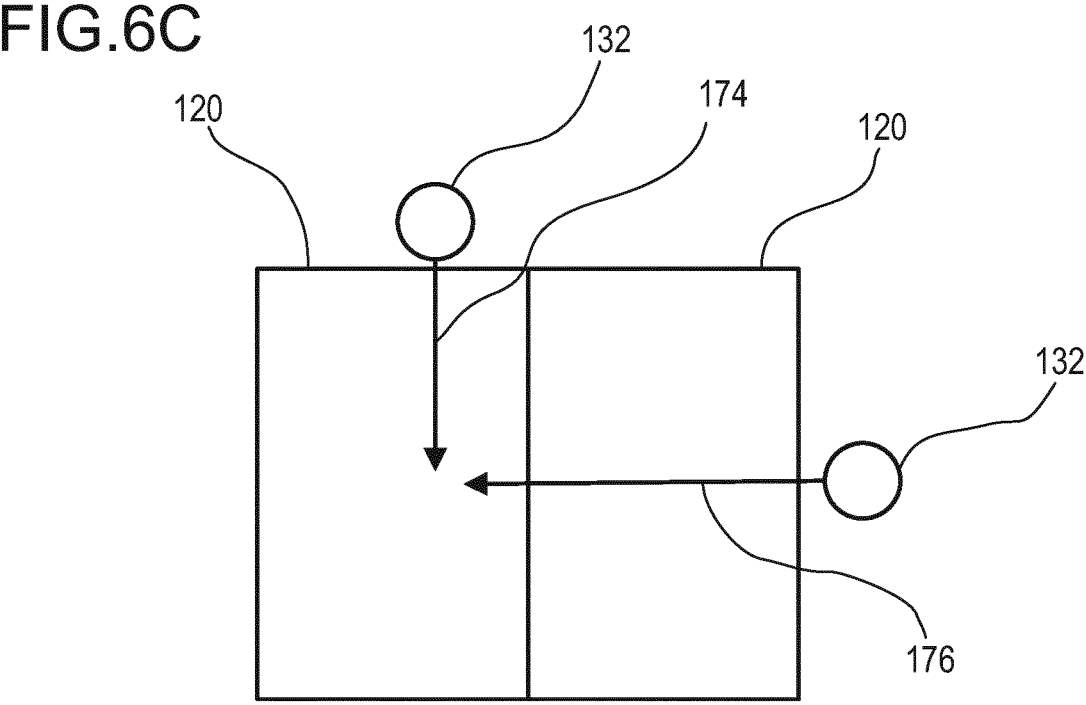
FIGS. 6C and 6D show a comparison of two experimental setups using a detector setup according to FIG. 6A with a Bi-cell as optical sensors and experimental results.

FIG. 6C shows a comparison of two experimental setups using a detector setup according to FIG. 6A with a Bi-cell as optical sensors 120 with two light sensitive areas. In a first experimental setup, depending on the relative position of the illumination light source, the optical axis and the sensor, the light spot 132 may move in parallel to the linear boundary of the two optical sensors 120 of the Bi-cell along a direction of movement 174 in dependence of the object distance. Since the direction of movement 174 of the light spot 132 is in parallel to the linear boundary of the two light sensitive areas in dependence of the object distance, the resulting sensor signals are identical to a situation with no movement of the light spot 132 depending on object distance as shown in FIG. 2. In a second experimental setup, depending on the relative position of the illumination light source, the optical axis and the sensor, the light spot 132 may move as such that the distance of the center of the light spot 132 to the boundary of the two optical sensors 120 of the Bi-cell changes in dependence of the object distance such as a movement orthogonal to the boundary of the two optical sensors 120 such as a movement along a direction of movement 176 in dependence of the object distance. The detector setup allowing movement of the light spot 132 may be a modification of the setup shown in FIG. 6A. Thus, for most elements and optional details as well as further elements, reference may be made to the description of FIG. 6A above. In FIG. 6C, the optical sensors 120 may be 1×2 matrix.

Figure 6D:
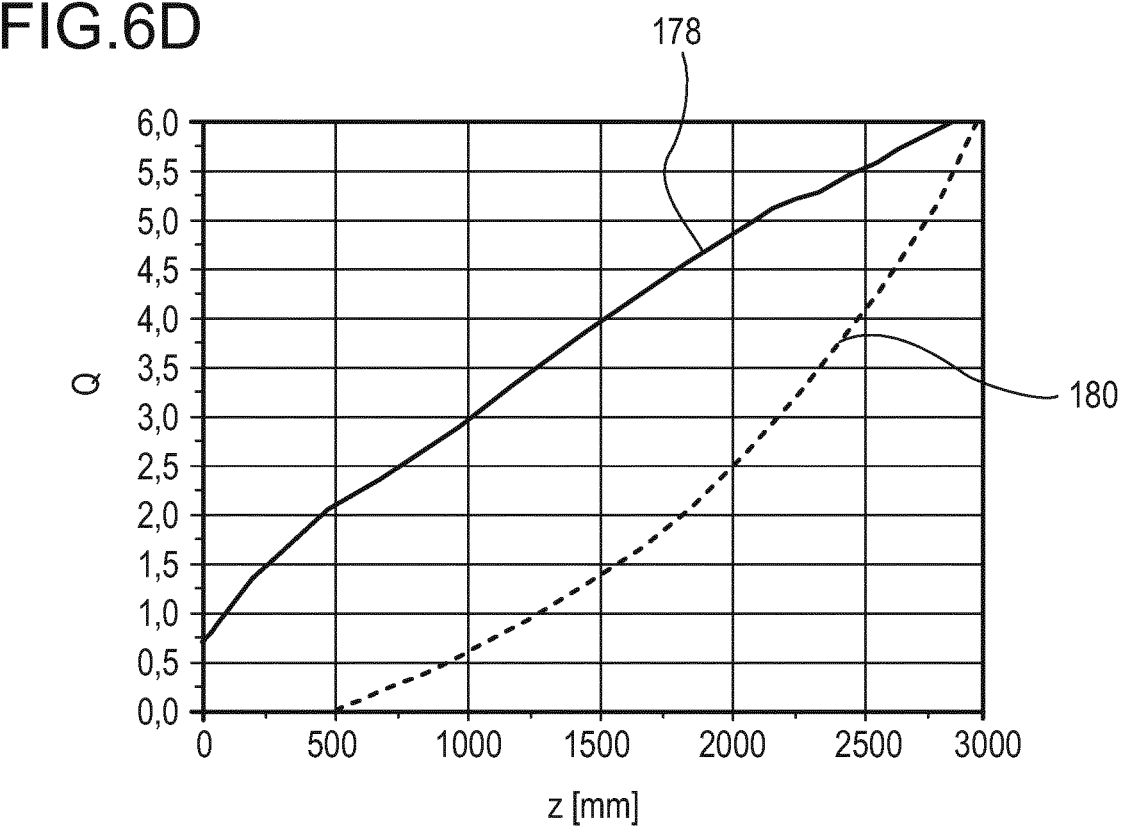

FIG. 6D shows experimental results of the comparison of the two experimental setups using a detector setup according to FIG. 6A, allowing movement of the light spot 132 according to FIG. 6C with movement of the light spot depending on the object distance along directions of movement 174 and 176. Curve 178 shows the dependency of quotient Q on the longitudinal coordinate z for the detector setup allowing movement of the light spot 132 along a direction of movement 174 as shown in FIG. 6C which is in parallel to the boundary of the optical sensors of the Bi-Cell and, which is a situation equivalent to FIG. 2 without a movement of the light spot depending on the object distance. Curve 180 shows the dependency of quotient Q on the longitudinal coordinate z for the detector setup according to FIG. 6A and using a detector setup allowing movement of the light spot 186 with movement of the light spot 132 according to FIG. 6C with movement of the light spot depending on the object distance along a direction of movement 176. The experimental setup was as follows: The optical sensors 122 may be a 1×2 matrix, in particular a Si—Bi-Cell. The illumination source 144 may be a 950 nm laser with a spot size of 4 mm. The transfer device 128 may have a focal length of 20 mm, e.g. a lens available as Thorlabs Asphere, f=20 mm. The distance of the object 112 was varied from 0 to 3000 mm. Determination of the longitudinal coordinate z may be possible without allowing movement of the light spot 132. In particular, according to the present invention, movement of the light spot may not be essential for determination of the longitudinal coordinate z. With the detector setup allowing movement of the light spot 132 along a direction 174 or without any movement determination of object distance is possible at very small distance, whereas with movement along a direction 176 determination of object distance is possible for object distance such as distances greater than 500 mm.

Figure 7A:
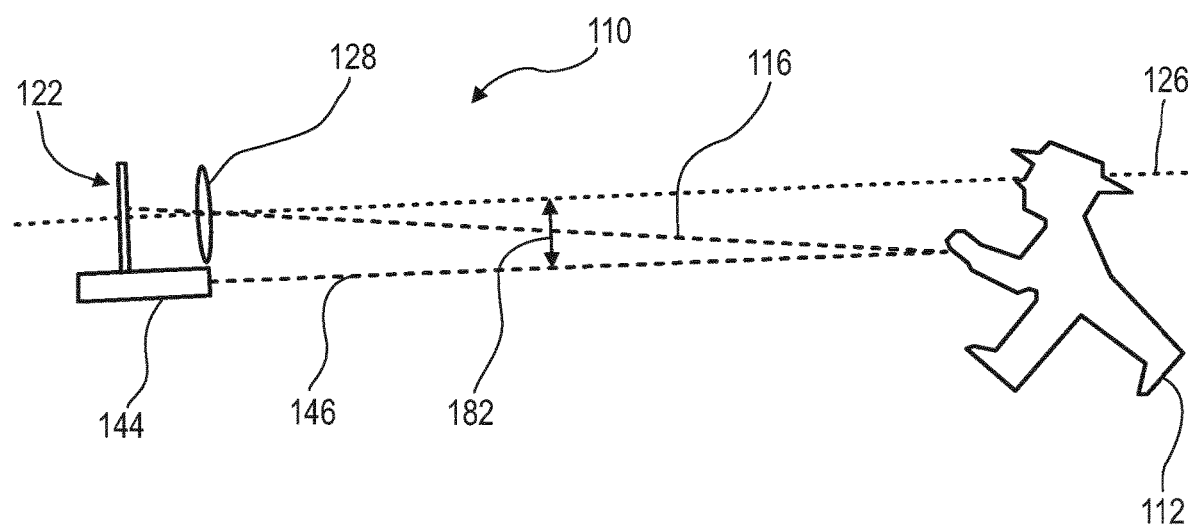
FIGS. 7A and 7B show a further exemplary embodiment of a detector according to the present invention with a small baseline.
Figure 7B:
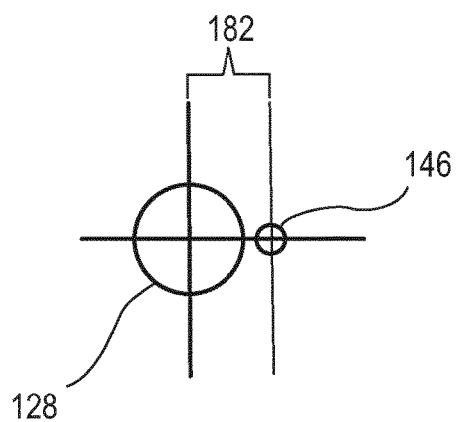

FIGS. 7A and 7B show an exemplary embodiment of a detector 110 with a small baseline 182. FIG. 7A shows a side view of the detector 110. The detector 110 may comprise the at least one illumination source 144. The illumination source 144 may be adapted to illuminate the object 112 with at least one illumination light beam 146. The illumination light beam 146 may be fully or partially reflected by the object and may travel back towards the optical sensor 122. The illumination source 144 may be arranged such that a direction of propagation of the illumination light beam is essentially parallel to the optical axis 126. The illumination source 144 may be arranged such that a line running in the direction of propagation of the illumination light beam and the optical axis 126 do not intersect in space. The illumination source 144 and the optical axis 126 may be separated by a small baseline 182. The illumination source 144 may be spaced apart from the optical axis 126 by a minimum distance. The minimum distance from the optical axis may be defined by further detector elements such as size and position of the optical sensors and transfer device. FIG. 7B shows a front view on the illumination light beam 144 and the transfer device 128. The baseline may be less than 0.1 m, preferably less than 0.05 m, more preferably less than 0.025 m. For example, the detector 110 may be a compact device without further optical elements, wherein the illumination source 144 may be placed as close as possible to an edge of the transfer device 128. Thus, the baseline 182 may be close to half a diameter of the transfer device 128, in particular the lens diameter and housings of lens and light source. The illumination source 144 may be arranged such that the baseline 182 is as small as possible. For example, a distance from the center of the transfer device 128 to the illumination source 144, in particular along a connecting line from the center of the transfer device 128 to the illumination source 144, may be preferably less than 2.5 times a distance from the center of the transfer device 128 to an edge if the transfer device 128, more preferably less than 1.5 times the distance center to edge of the transfer device 128, and most preferably less 1 times the distance center to edge of the transfer device 128.

Figure 8:
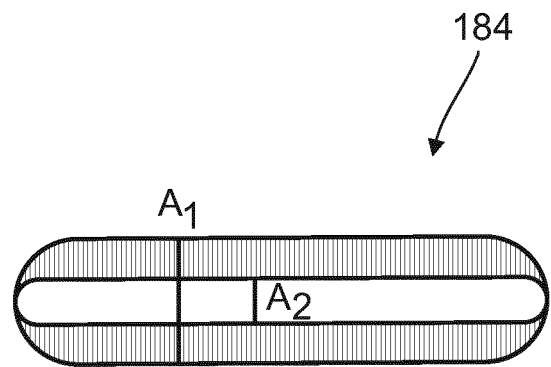
FIG. 8 shows an embodiment of determining a longitudinal coordinate z using a line pattern.

Referring to FIG. 8, the detector 110 such as the detector as described with respect to FIGS. 1 to 7 may be adapted to determine depth information, in particular absolute depth information, from a radiance ratio of at least two asymmetric regions of a light beam profile on the at least two optical sensors 122. For example, the detector 110 may comprise a plurality of optical sensors arranged in the matrix 120. The detector 110 may be adapted to determine depth information from a radiance ratio of at least two asymmetric regions within an enclosed, in particular, defocused beam profile captured by a single matrix of optical sensors such as a CMOS detector. In particular, the detector 110 may be adapted to determine the depth information using the radiance ratio independent of a certain object size range. As outlined above, this principle is called Distance by Photon Ratio (DPR). In one embodiment, the light beam 116 may illuminate the sensor element with at least one pattern comprising at least one feature point. The feature point may be selected from the group consisting of: at least one point, at least one line, at least one edge. The pattern may be generated by the object, for example, in response to an illumination by the at least one light source with an illumination pattern comprising the at least one pattern. The evaluation device 134 may be configured for deriving the combined signal Q by $$Q(z_O) = \frac{\int\int_{A_1} E(x, y; z_O)dxdy}{\int\int_{A_2} E(x, y; z_O)dxdy}$$

wherein x and y are transversal coordinates, A1 and A2 are areas of the beam profile at the sensor position, and $E(x,y,z_O)$ denotes the beam profile given at the object distance zo. A1 may correspond to a full or complete area of a feature point on the optical sensors. A2 may be a central area of the feature point on the optical sensors. The central area may be a constant value. The central area may be smaller compared to the full area of the feature point. For example, in case of a circular feature point, the central area may have a radius from 0.1 to 0.9 of a full radius of the feature point, preferably from 0.4 to 0.6 of the full radius.

In the embodiment shown in FIG. 8, the light beam 116 propagating from the object 112 to the detector 110 may illuminate the matrix 120 with at least one line pattern 184. The line pattern 184 may be generated by the object 112 for example in response to an illumination by the at least one illumination source 144 with an illumination pattern comprising at least one illumination line pattern. A1 may correspond to an area with a full line width of the line pattern 184 in the matrix 120. The line pattern 184 in the matrix 120 may be widened and/or displaced compared to the line pattern of the illumination pattern such that a line width in the matrix 120 is increased. In particular, the line width of the line pattern 184 in the matrix 120 may change from one column to another column. A2 may be a central area of the line pattern 184 in the matrix 120. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern 184 may be segmented in the matrix 120. Each of the columns may comprise center information of intensity in the central area of the line pattern 184 and edge information of intensity from regions extending further outwards from the central area to edge regions of the line pattern 184.

Figure 9A:
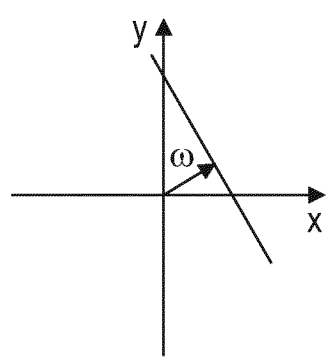
FIGS. 9A and B show a defocused beam profile subdivided into cross-sections along lines of a certain angle θ and with a distance w from the origin of ordinates and Radon transformation different image regions on a matrix of optical sensors.
Figure 9B:
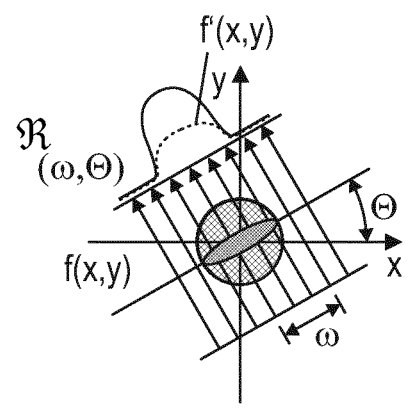

Referring to FIGS. 9A and 9B, as outlined above, the detector 110 may comprise the at least one matrix 120 of optical sensors 122. With the aid of such a pixelated imaging device, a defocused beam profile may be subdivided into cross-sections along lines of a certain angle $\theta$ and with a distance $\omega$ from the origin of ordinates as shown in FIG. 9A. Accordingly, the parameterization of a single line would be given by $\omega = x \cos(\theta) + y \sin(\theta)$. The integration of the intensity along parallel lines can be mathematically described by an integral projection $\mathfrak{R}\{\cdot\}$ of the well-known Radon transform which reads $$\mathfrak{R}_{(\omega,\theta)}\{f(x, y)\} = \int\int_{-\infty}^{\infty} f(x, y)\delta(x\cos(\theta) + y\sin(\theta) - \omega)dxdy$$

where $\delta$ denotes the Dirac delta function and $f(x,y)$ is the intensity of an enclosed defocused beam profile. The photon ratio R for a given angle $\theta$ and projection width $\omega$ is then given by $$R = \frac{\mathfrak{R}_{(\omega,\theta)}\{f'(x, y)\}}{\mathfrak{R}_{(\omega,\theta)}\{f(x, y)\}}$$

with $f'(x,y)$ as the overshined image region highlighted in FIG. 9. The variation of $\theta$ may yield different ratios R for skewed object surfaces at a certain distance. It is sufficient to let $\theta$ vary in the following interval $\{\theta \in \mathbb{R}_+, \theta < \pi\}$.

Figure 10A:
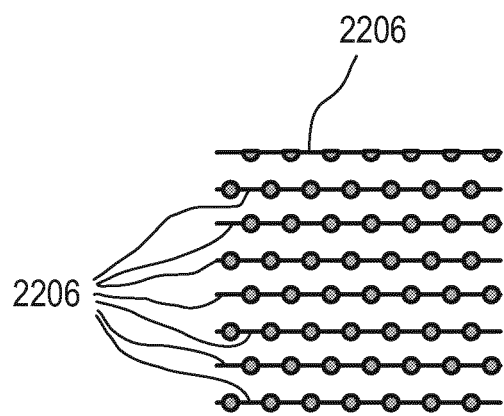
FIGS. 10A to C show three embodiments of a hexagonal illumination pattern.
Figure 10B:
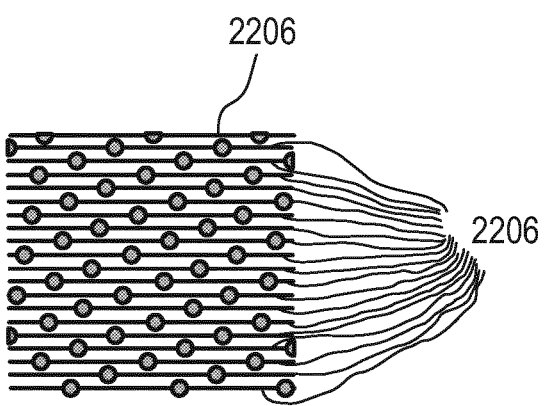
Figure 10C:
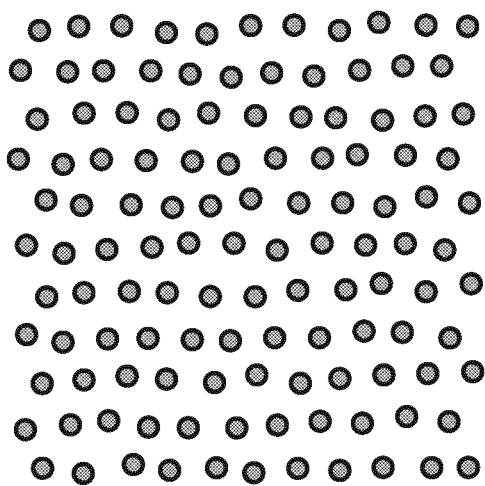

FIGS. 10A to 10C show three embodiments of a hexagonal illumination pattern. The illumination source 144 may be adapted to generate at least one illumination pattern for illuminating the object 112. Additionally or alternatively, the illumination pattern may be generated by at least one ambient light source. Specifically, the illumination source 144 may comprise at least one laser and/or laser source. Various types of lasers may be employed, such as semiconductor lasers. Additionally or alternatively, non-laser light sources may be used, such as LEDs and/or light bulbs. The illumination pattern may comprise at least one feature such as a point or symbol. The illumination pattern may comprise a plurality of features. The illumination pattern may comprise an arrangement of periodic or non-periodic features. The illumination pattern may be generated by ambient light, such as by at least one ambient light source, or by the at least one illumination source. The illumination pattern may comprise at least one pattern selected from the group consisting of: at least one point pattern, in particular a pseudo-random point pattern, a random point pattern or a quasi random pattern; at least one Sobol pattern; at least one quasiperiodic pattern; at least one pattern comprising at least one preknown feature; at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines; at least one fringe pattern. For example, the illumination source may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise as much as possible features per area such that hexagonal pattern may be preferred. A distance between two features of the illumination pattern and/or an area of the at least one illumination feature may depend on the circle of confusion in the image.

The illumination features of the illumination pattern may be arranged such that only few reference features are positioned on an epipolar line. As shown in FIG. 10A, the illumination pattern may comprise at least one hexagonal pattern, wherein the individual points are positioned on epipolar lines 186. As shown in FIG. 10B, the illumination pattern may comprise at least one hexagonal pattern, wherein the pattern is rotated relative to the baseline. Such a positioning of the illumination features allows enhancing distance between the individual points on each epipolar line. For example as shown in FIG. 10C, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other. Such a positioning allows to enhance the number of possible features per area.

Figure 11:
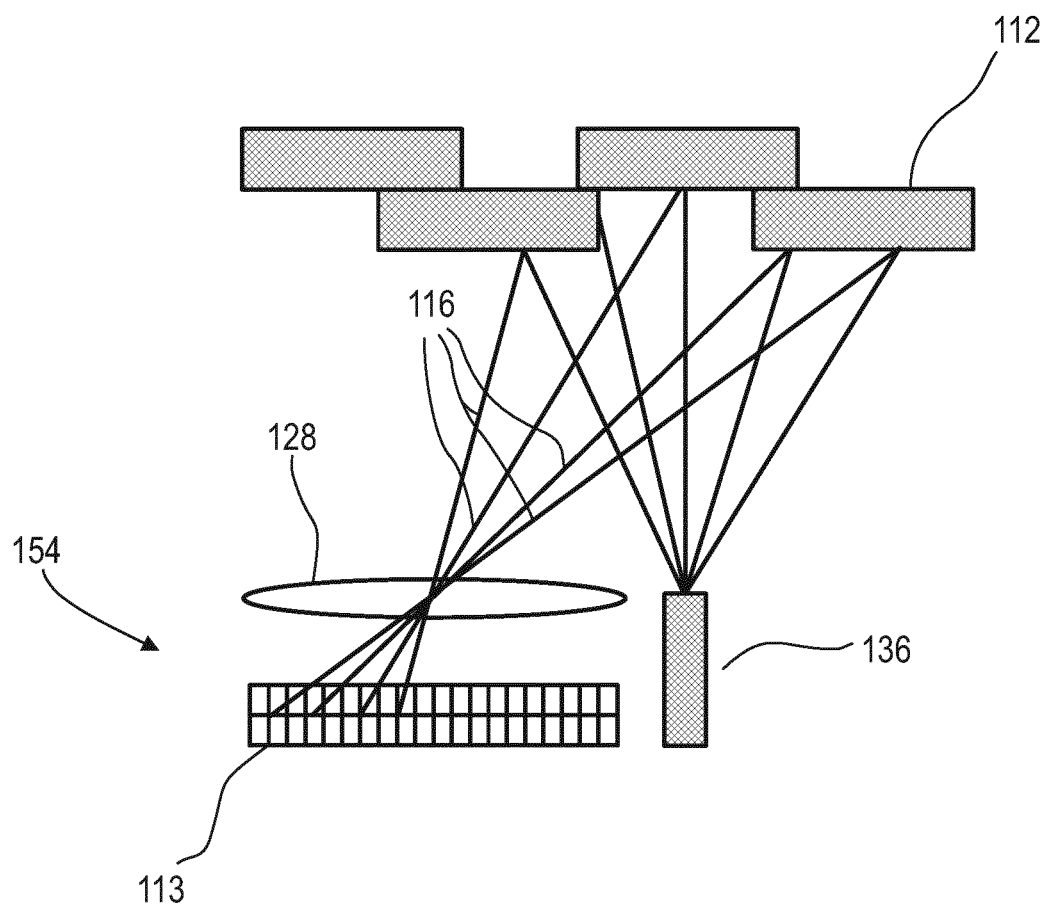
FIG. 11 shows an embodiment of a scanning device.

FIG. 11 shows an embodiment of a scanning system 154. The scanning system 154 may be adapted as a line scanning device. In particular, the scanning system 154 may comprise at least one sensor line or row of optical sensors 113. Furthermore, the scanning system may comprise the at least one transfer device 128 and the at least one illumination source 144. Triangulation systems require a sufficient baseline, however due to the baseline in the near filed no detection may be possible. Near field detection may be possible if the light spot is tilted in direction of the transfer device. However, the tilting leads to that the light spot will move out of the field of view which limits detection in far field regions. Thus, in triangulation systems, the non-zero baseline will always lead to a substantial reduction in the measurement range, in the near field, and/or in the far field. Reducing the baseline as possible with the detector according to the present invention will thus always increase the measurement range. Further, these near field and far field problems can be overcome by using the scanning system 154 of FIG. 11. The scanning system 154 may be adapted to detect a plurality of light beams 116 propagating from the object 112 to the scanning device 154 on the CMOS line. The light beams 116 may be generated at different position on the object 112 or by movement of the object 112. The scanning system 154 may be adapted to determine at least one longitudinal coordinate for each of the light points by determining the combined signal Q as described above.

LIST OF REFERENCE NUMBERS 110 detector
112 object
114 beacon device
116 light beam
118 sensor element
120 matrix
122 optical sensor
124 light-sensitive area
126 optical axis
128 transfer device
130 focal point
132 light spot
134 evaluation device
136 center detector
138 summing device
140 combining device
142 divider
143 position evaluation device
144 illumination source
146 illumination light beam
148 reflective element
149 camera
150 detector system
151 human-machine interface
152 entertainment device
153 tracking system
154 scanning system
156 connector
158 housing
160 control device
162 user
164 opening
166 direction of view
168 coordinate system
170 machine
172 track controller
174 direction of movement
176 direction of movement
178 curve
180 curve
182 baseline
184 Line pattern
186 Epipolar line

The invention claimed is:

1. A detector for determining a position of at least one object, the detector having
at least one sensor element having a matrix of optical sensors, the optical sensors each having a light-sensitive area, wherein each optical sensor is configured to generate at least one sensor signal in response to an illumination of the light-sensitive area by at least one light beam propagating from the object to the detector;
at least one evaluation device configured for evaluating the sensor signals, by
a) determining at least one optical sensor having the highest sensor signal and forming at least one center signal;
b) evaluating the sensor signals of the optical sensors of the matrix and forming at least one sum signal;
c) determining at least one combined signal by combining the center signal and the sum signal; and
d) determining at least one longitudinal coordinate z of the object by evaluating the combined signal.

2. The detector according to claim 1, wherein the center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

3. The detector according to claim 1, wherein the sum signal is selected from the group consisting of: an average over all sensor signals of the matrix; a sum of all sensor signals of the matrix; an integral of all sensor signals of the matrix an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal.

4. The detector according to claim 1, wherein the combined signal is a combined signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of a first linear combination of the center signal and the sum signal and a second linear combination of the center signal and the sum signal.

5. The detector according to claim 4, wherein the evaluation device is configured for using at least one predetermined relationship between the combined signal Q and the longitudinal coordinate for determining the longitudinal coordinate.

6. The detector according to claim 4, wherein the evaluation device comprises at least one divider, wherein the divider is configured for deriving the combined signal.

7. The detector according to claim 1, wherein the evaluation device is further configured for determining at least one transversal coordinate of the object by evaluating a transversal position of the at least one optical sensor having the highest sensor signal.

8. The detector according to claim 1, wherein the detector comprises at least one illumination source, wherein the illumination source is adapted to illuminate the object with at least one illumination light beam, wherein the illumination source is arranged such that a direction of propagation of the illumination light beam is essentially parallel to the optical axis.

9. The detector according to claim 1, wherein the detector comprises the at least one illumination source, wherein the illumination source and the optical axis are separated by a small baseline.

10. A detector system for determining a position of at least one object, the detector system comprising at least one detector according to claim 1, the detector system further comprising at least one beacon device adapted to direct at least one light beam towards the detector, wherein the beacon device is at least one of attachable to the object, holdable by the object and integratable into the object.

11. A human-machine interface for exchanging at least one item of information between a user and a machine, wherein the human-machine interface comprises at least one detector system according to claim 10, wherein the at least one beacon device is adapted to be at least one of directly or indirectly attached to the user and held by the user, wherein the human-machine interface is designed to determine at least one position of the user by means of the detector system, wherein the human-machine interface is designed to assign to the position at least one item of information.

12. An entertainment device for carrying out at least one entertainment function, wherein the entertainment device comprises at least one human-machine interface according to claim 11, wherein the entertainment device is designed to enable at least one item of information to be input by a player by means of the human-machine interface, wherein the entertainment device is designed to vary the entertainment function in accordance with the information.

13. A tracking system for tracking a position of at least one movable object, the tracking system comprising at least one detector system according to claim 10, the tracking system further comprising at least one track controller, wherein the track controller is adapted to track a series of positions of the object at specific points in time.

14. A scanning system for determining a depth profile of a scenery, the scanning system comprising at least one detector according to claim 1, the scanning system further comprising at least one illumination source adapted to scan the scenery with at least one light beam.

15. A camera for imaging at least one object, the camera comprising at least one detector according to claim 1.

16. A method, comprising employing the detector according to claim 1, for at least one selected from the group consisting of: a position measurement in traffic technology; an entertainment application; a security application; a surveillance application; a safety application; a human-machine interface application; a tracking application; a photography application; a logistics application; a machine vision application; a robotics application; a quality control application; and a manufacturing application.

17. A method for determining a position of at least one object by using at least one detector, the method comprising:
  illuminating at least one sensor element of the detector with at least one light beam propagating from the object to the detector, the detector having a matrix of optical sensors, the optical sensors each having a light-sensitive area, wherein each optical sensor generates at least one sensor signal in response to the illumination;
  evaluating the sensor signals, by
  a) determining at least one optical sensor having the highest sensor signal and forming at least one center signal;
  b) evaluating the sensor signals of the optical sensors of the matrix and forming at least one sum signal;
  c) determining at least one combined signal by combining the center signal and the sum signal; and
  d) determining at least one longitudinal coordinate z of the object by evaluating the combined signal.

18. The method according to claim 17, wherein the combined signal is a combined signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa.

* * * * *